(12) United States Patent
Scott et al.

(10) Patent No.: US 7,768,165 B2
(45) Date of Patent: Aug. 3, 2010

(54) CONTROLLER FOR AC GENERATOR

(75) Inventors: Harold C. Scott, Lafayette, CO (US);
Dave E. Williams, Loveland, CO (US);
Charles Y. Lafontaine, Berthoud, CO (US)

(73) Assignee: Magnetic Applications, Inc., Lafayette, CO (US)

( * ) Notice: Subject to any disclaimer, the term of this patent is extended or adjusted under 35 U.S.C. 154(b) by 0 days.

(21) Appl. No.: 12/025,645

(22) Filed: Feb. 4, 2008

(65) Prior Publication Data

US 2008/0211330 A1 Sep. 4, 2008

Related U.S. Application Data

(63) Continuation of application No. 11/347,777, filed on Feb. 2, 2006, now Pat. No. 7,327,123.

(51) Int. Cl.
*H02K 3/04* (2006.01)
(52) U.S. Cl. ........................ 310/71; 310/68 C
(58) Field of Classification Search ............ 310/71, 310/68 D, 260, 179, 68 C, 182, 197
See application file for complete search history.

(56) References Cited

U.S. PATENT DOCUMENTS

| | | | |
|---|---|---|---|
| 2,874,317 A * | 2/1959 | Couse | 310/71 |
| 3,564,388 A | 2/1971 | Nolf | |
| 3,757,230 A | 9/1973 | Keeney | |
| 4,455,598 A | 6/1984 | Andre et al. | |
| 4,695,776 A | 9/1987 | Dishner et al. | |
| 4,754,179 A * | 6/1988 | Capuano et al. | 310/71 |
| 4,885,493 A | 12/1989 | Gokhale | |
| 5,625,276 A | 4/1997 | Scott et al. | |
| 5,705,917 A | 1/1998 | Scott et al. | |
| 5,828,147 A | 10/1998 | Best et al. | |
| 5,886,504 A | 3/1999 | Scott et al. | |
| 5,900,722 A | 5/1999 | Scott et al. | |
| 5,929,611 A | 7/1999 | Scott et al. | |
| 6,018,200 A | 1/2000 | Anderson et al. | |
| 6,034,511 A | 3/2000 | Scott et al. | |
| 6,333,579 B1 * | 12/2001 | Hirano et al. | 310/194 |
| 6,369,473 B1 * | 4/2002 | Baumeister et al. | 310/71 |
| 6,441,522 B1 | 8/2002 | Scott et al. | |
| 6,784,575 B2 | 8/2004 | Okuda | |
| 7,122,923 B2 | 10/2006 | Lafontaine et al. | |
| 7,176,658 B2 | 2/2007 | Quazi et al. | |

FOREIGN PATENT DOCUMENTS

| | | |
|---|---|---|
| DE | 21 19 525 A1 | 2/1972 |
| DE | 100 48 491 A1 | 4/2002 |
| EP | 1 176 696 A2 | 1/2002 |
| EP | 1 184 960 A1 | 3/2002 |
| JP | 58 072358 A | 4/1983 |
| JP | 06 233483 A | 8/1994 |

\* cited by examiner

*Primary Examiner*—Dang D Le
(74) *Attorney, Agent, or Firm*—David E. Rogers; Lucius Lockwood; Squire, Sanders & Demspey L.L.P.

(57) ABSTRACT

A control system that can accommodate the wide variations in the output of a generator, such as a permanent magnet alternator, while providing an output with relatively uniform phase ripple. The control system includes a zero crossing detector and variable ramp generator for generating control signals to a switching rectifier to generate a regulated DC signal.

20 Claims, 59 Drawing Sheets

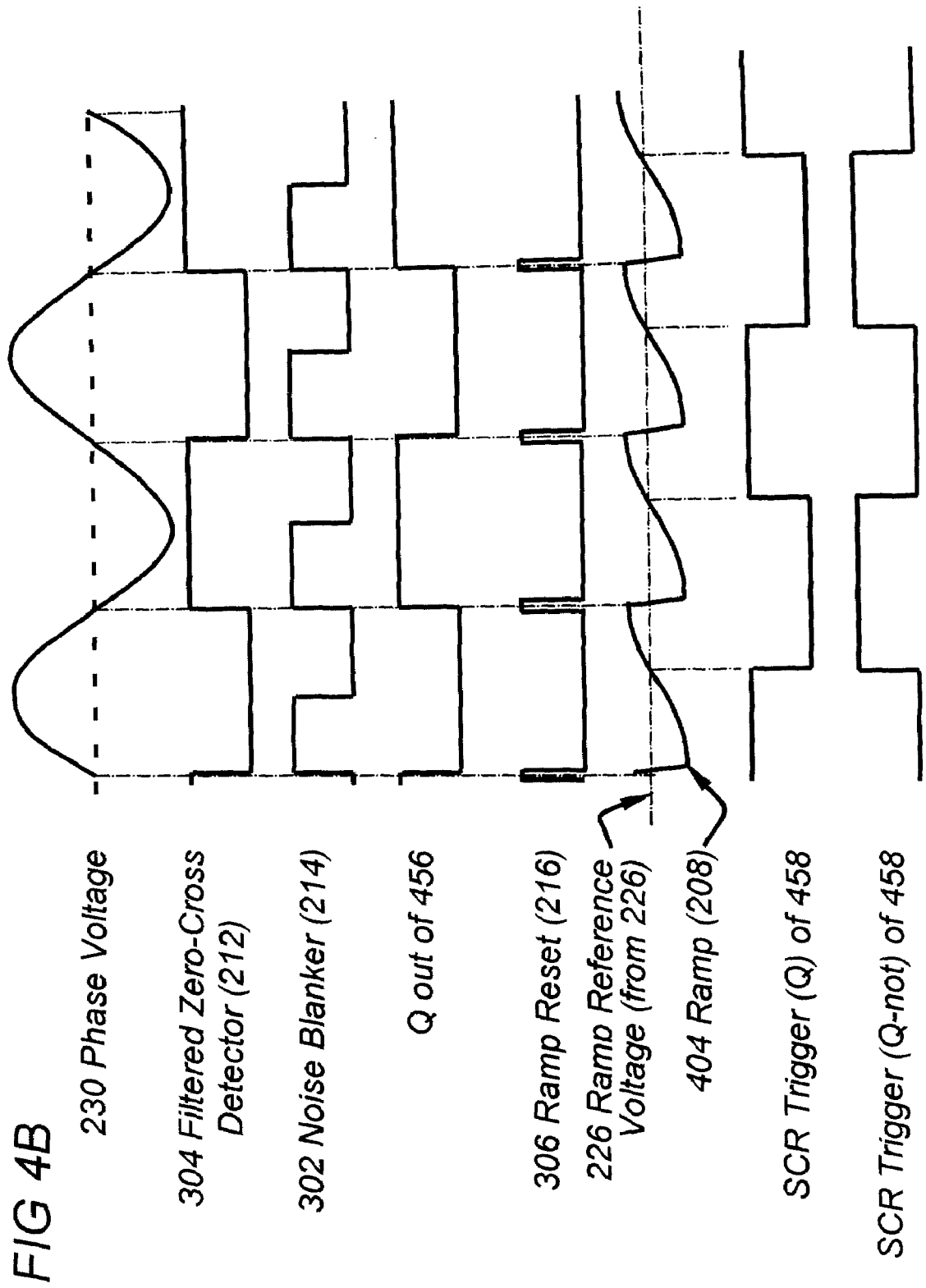

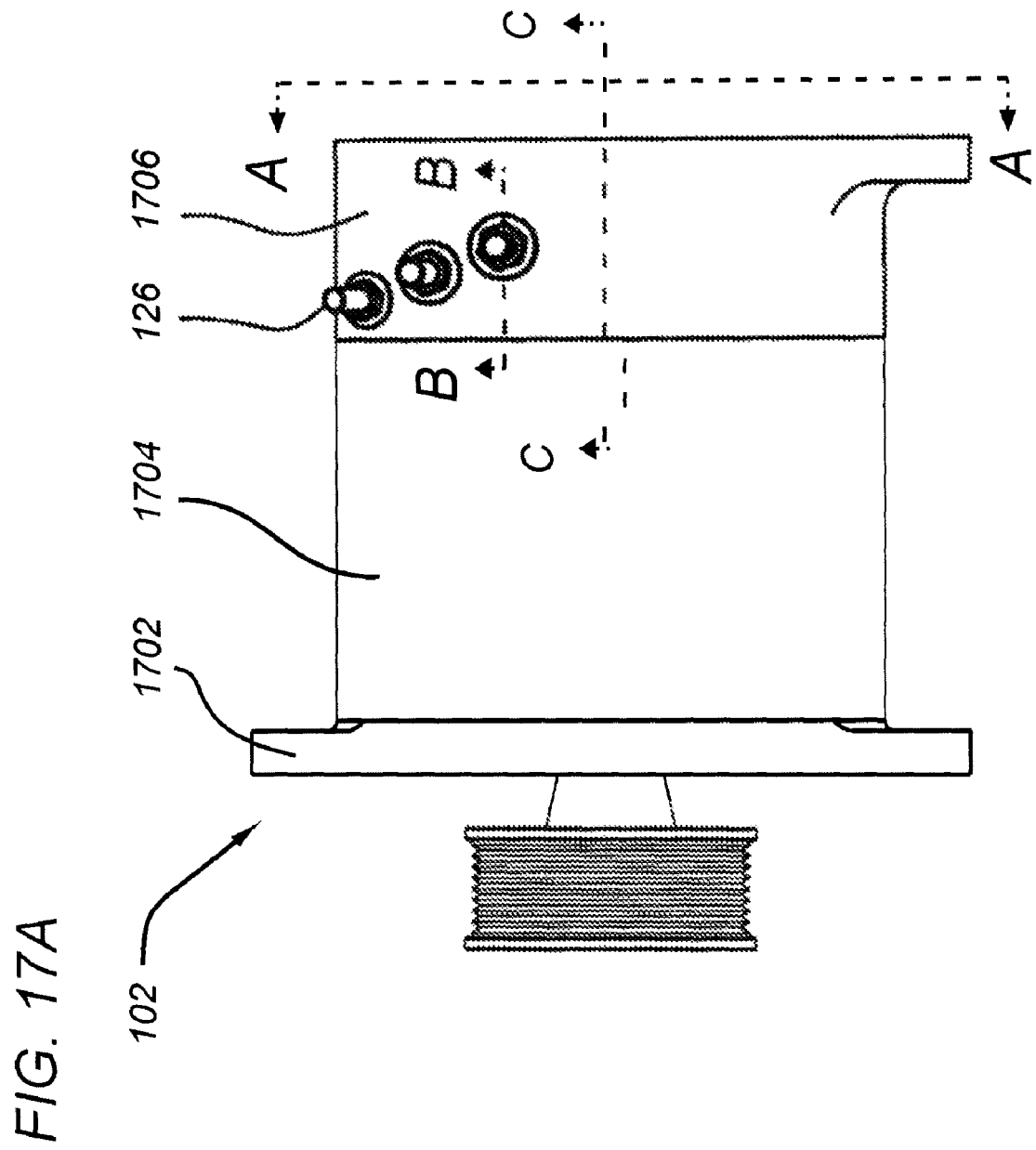

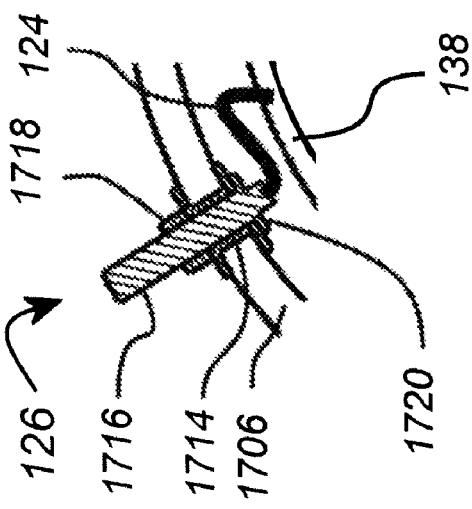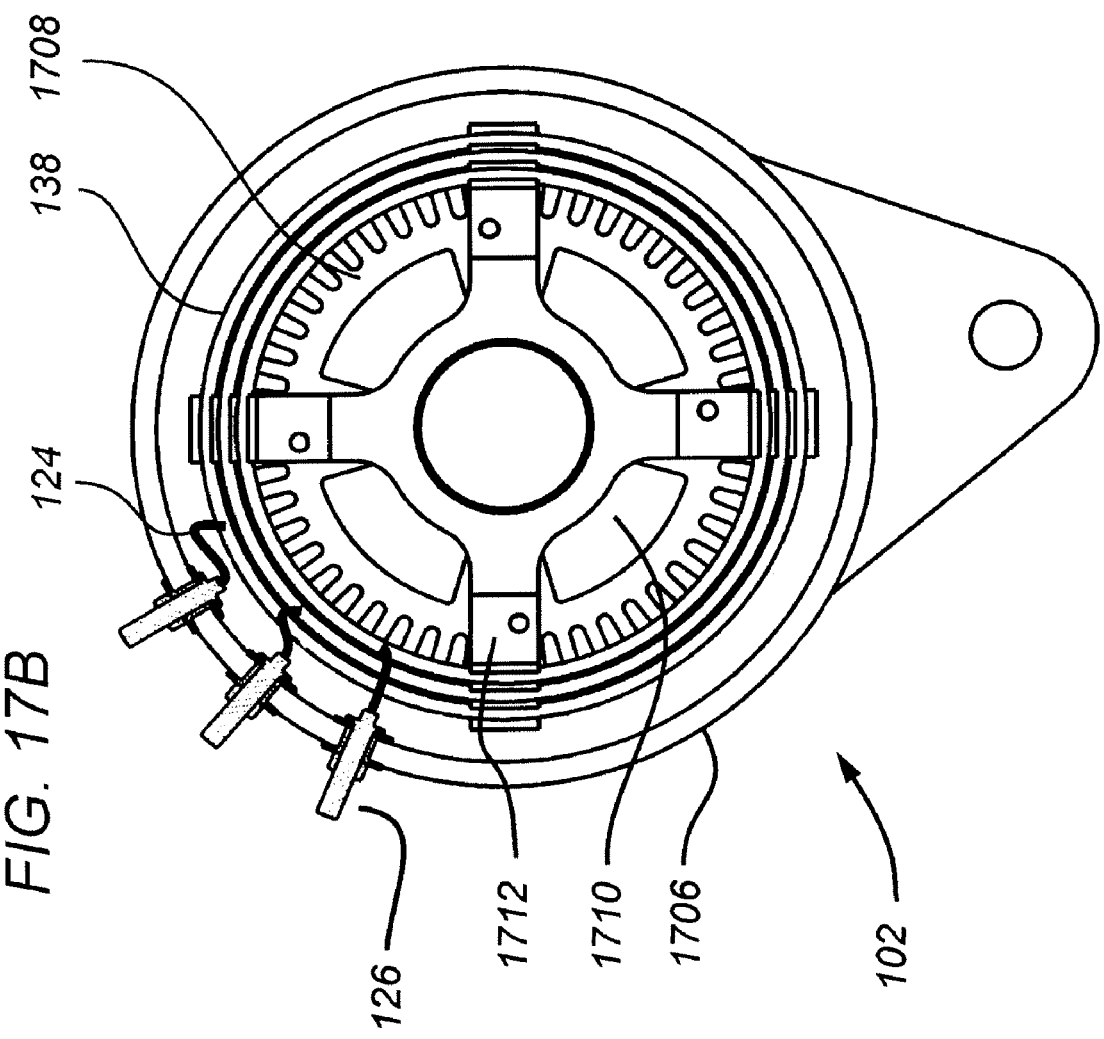

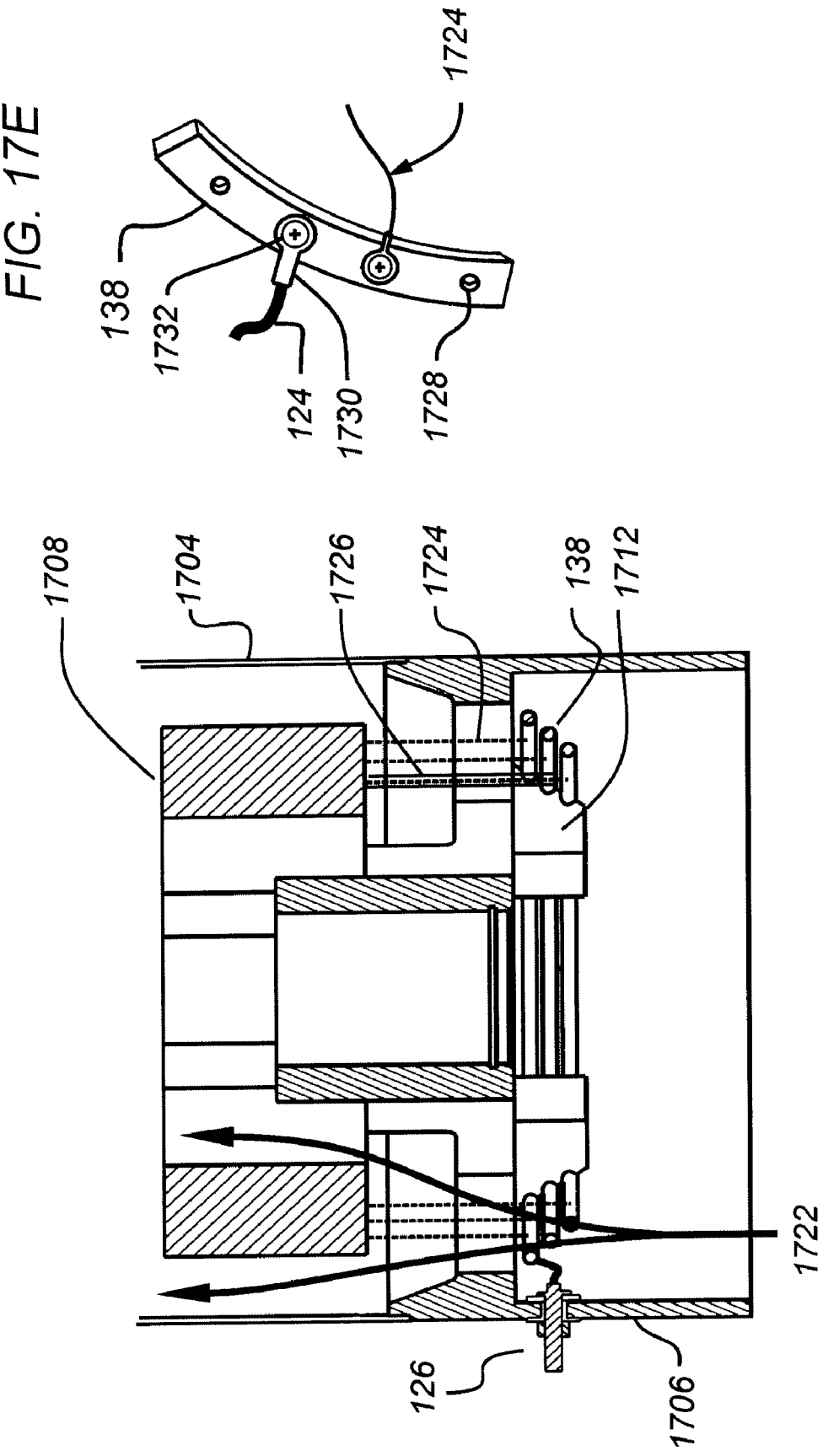

CONTROLLER FOR AC GENERATOR

CROSS REFERENCE TO RELATED APPLICATIONS

This application is a continuation of and claims full benefit of and priority to U.S. patent application Ser. No. 11/347,777, filed Feb. 2, 2006 now U.S. Pat. No. 7,327,123, the disclosure of which is hereby fully incorporated by reference for all purposes.

TECHNICAL FIELD OF THE INVENTION

The present invention relates to voltage and current control systems for machines for converting between mechanical and electrical energy, such as brushless AC generators, and in particular to a control system for a compact permanent magnet high power alternator, such as a compact permanent magnet high power alternator suitable for automotive use.

BACKGROUND OF THE INVENTION

An alternator typically comprises a rotor mounted on a rotating shaft and disposed concentrically relative to a stationary stator. The rotor is typically disposed within the stator. However, the stator may be alternatively positioned concentrically within the rotor. An external energy source, such as a motor or turbine, commonly drives the rotating element, directly or through an intermediate system such as a pulley belt. Both the stator and the rotor have a series of poles. Either the rotor or the stator generates a magnetic field, which interacts with windings on the poles of the other structure. As the magnetic field intercepts the windings, an electric field is generated, which is provided to a suitable load. The induced electric field (which is commonly known as a voltage source) is typically applied to a rectifier, sometimes regulated, and provided as a DC output power source. The induced current is typically applied to a rectifier, sometimes regulated, and provided as a DC output power source. In some instances, a regulated DC output signal is applied to a DC to AC inverter to provide an AC output.

Conventionally, alternators employed in motor vehicle applications typically comprise: a housing, mounted on the exterior of an engine; a stator having 3-phase windings housed in the housing, a belt-driven claw-pole type (e.g. Lundell) rotor rotatably supported in the housing within the stator. However, to increase power output the size of the conventional alternator must be significantly increased. Accordingly, space constraints in vehicles tend to make such alternators difficult to use in high output, e.g. 5 KW, applications, such as for powering air conditioning, refrigeration, or communications apparatus.

In addition, the claw-pole type rotors, carrying windings, are relatively heavy (often comprising as much as three quarters of the total weight of the alternator) and create substantial inertia. Such inertia, in effect, presents a load on the engine each time the engine is accelerated. This tends to decrease the efficiency of the engine, causing additional fuel consumption. In addition, such inertia can be problematical in applications such as electrical or hybrid vehicles. Hybrid vehicles utilize a gasoline engine to propel the vehicle at speeds above a predetermined threshold, e.g. 30 Kph (typically corresponding to a range of RPM where the gasoline engine is most efficient). Similarly, in a so-called "mild hybrid," a starter-generator is employed to provide an initial burst of propulsion when the driver depresses the accelerator pedal, facilitating shutting off the vehicle engine when the vehicle is stopped in traffic to save fuel and cut down on emissions. Such mild hybrid systems typically contemplate use of a high-voltage (e.g. 42 volts) electrical system. The alternator in such systems must be capable of recharging the battery to sufficient levels to drive the starter-generator to provide the initial burst of propulsion between successive stops, particularly in stop and go traffic. Thus, a relatively high power, low inertia alternator is needed.

In general, there is in need for additional electrical power for powering control and drive systems, air conditioning and appliances in vehicles. This is particularly true of vehicles for recreational, industrial transport applications such as refrigeration, construction applications, and military applications.

For example, there is a trend in the motor vehicle industry to employ intelligent electrical, rather than mechanical or hydraulic control and drive systems to decrease the power load on the vehicle engine and increased fuel economy. Such systems may be employed, for example, in connection with steering servos (which typically are active only a steering correction is required), shock absorbers (using feedback to adjust the stiffness of the shock absorbers to road and speed conditions), and air conditioning (operating the compressor at the minimum speed required to maintain constant temperature). The use of such electrical control and drive systems tends to increase the demand on the electrical power system of the vehicle.

Similarly, it is desirable that mobile refrigeration systems be electrically driven. For example, driving the refrigeration system at variable speeds (independently of the vehicle engine rpm) can increase efficiency. In addition, with electrically driven systems the hoses connecting the various components, e.g. the compressor (on the engine), condenser (disposed to be exposed to air), and evaporation unit (located in the cold compartment), can be replaced by an electrically driven hermetically sealed system analogous to a home refrigerator or air-conditioner. Accordingly, it is desirable that a vehicle electrical power system in such application be capable of providing the requisite power levels for an electrically driven unit.

There is also a particular need for a "remove and replace" high power alternator to retrofit existing vehicles. Typically only a limited amount of space is provided within the engine compartment of the vehicle to accommodate the alternator. Unless a replacement alternator fits within that available space, installation is, if possible, significantly complicated, typically requiring removal of major components such as radiators, bumpers, etc. and installation of extra brackets, belts and hardware. Accordingly, it is desirable that a replacement alternator fit within the original space provided, and interfaces with the original hardware.

In general, permanent magnet alternators are well known. Such alternators use permanent magnets to generate the requisite magnetic field. Permanent magnet generators tend to be much lighter and smaller than traditional wound field generators. Examples of permanent magnet alternators are described in U.S. Pat. No. 5,625,276 issued to Scott et al on Apr. 29, 1997; U.S. Pat. No. 5,705,917 issued to Scott et al on Jan. 6, 1998; U.S. Pat. No. 5,886,504 issued to Scott et al on Mar. 23, 1999; U.S. Pat. No. 5,92,611 issued to Scott et al on Jul. 27 1999; U.S. Pat. No. 6,034,511 issued to Scott et al on Mar. 7, 2000; and U.S. Pat. No. 6,441,522 issued to Scott on Aug. 27, 2002.

Particularly light and compact permanent magnet alternators can be implemented by employing an "external" permanent magnet rotor and an "internal" stator. The rotor comprises a hollow cylindrical casing with high-energy permanent magnets disposed on the interior surface of the cylinder. The stator is disposed concentrically within the rotor casing, and suitably comprises a soft magnetic core, and conductive windings. The core is generally cylindrical width an axially crenellated outer peripheral surface with a predetermined number of equally spaced teeth and slots. The conductive windings (formed of a suitably insulated electrical conductor, such as varnished copper motor wire), are wound through a respective slot, outwardly along the side face of the core around a predetermined number of teeth, then back through another slot. The portion of the windings extending outside of the crenellation slots along the side faces of the core are referred to herein as end turns. Rotation of the rotor about the stator causes magnetic flux from the rotor magnets to interact with and induce current in the stator windings. An example of such an alternator is described in, for example, the aforementioned U.S. Pat. No. 5,705,917 issued to Scott et al on Jan. 6, 1998 and U.S. Pat. No. 5,92,611 issued to Scott et al on Jul. 27 1999.

The power supplied by a permanent magnet generator varies significantly according to the speed of the rotor. In many applications, changes in the rotor speed are common due to, for example, engine speed variations in an automobile, or changes in load characteristics. Accordingly, an electronic control system is typically employed. An example of a permanent magnet alternator and control system therefore is described in the aforementioned U.S. Pat. No. 5,625,276 issued to Scott et al on Apr. 29, 1997. Examples of other control systems are described in U.S. Pat. No. 6,018,200 issued to Anderson, et al. on Jan. 25, 2000. Other examples of control systems are described in commonly owned co-pending U.S. patent application Ser. No. 10/860,393 by Quazi et al, entitled "Controller For Permanent Magnet Alternator" and filed on Jun. 6, 2004. The aforementioned Quazi et al application is hereby incorporated by reference as if set forth verbatim herein.

The need to accommodate a wide range of rotor speeds is particularly acute in motor vehicle applications. For example, large diesel truck engines typically operate from 600 RPM at idle, to 2600 RPM at highway speeds, with occasional bursts to 3000 RPM, when the engine is used to retard the speed of the truck. Thus the alternator system is subject to a 5:1 variation in RPM. Light duty diesels operate over a somewhat wider range, e.g. from 600 to 4,000 RPM. Alternators used with gasoline vehicle engines typically must accommodate a still wider range of RPM, e.g. from 600 to 6500 RPM. In addition, the alternator must accommodate variations in load, i.e., no load to full load. Thus the output voltage of a permanent magnet alternator used with gasoline vehicle engines can be subject to a 12:1 variation. Accordingly, if a conventional permanent magnet alternator is required to provide operating voltage (e.g. 12 volts) while at idle with a given load, it will provide multiples of the operating voltage, e.g. ten (10) times that voltage, at full engine RPM with that load, e.g. 120 volts. Where the voltage at idle is 120 V, e.g. for electric drive air conditioning, or communications apparatus, the voltage at full engine RPM would be, e.g. 1200 volts. Such voltage levels are difficult and, indeed, dangerous to handle. In addition, such extreme variations in the voltage and current may require more expensive components; components rated for the high voltages and currents produced at high engine RPM (e.g. highway speeds) are considerably more expensive, than components rated for more moderate voltages.

Various attempts to accommodate the wide range of output voltages from permanent magnet alternators have been made. For example, the aforementioned Scott et al U.S. Pat. No. 5,625,276, describes a controller that selectively activates individual windings to achieve a desired output. The windings may be connected in a fully parallel configuration to provide high current at relatively low voltage levels, or in series to provide high voltage capacity. As drive RPM increases, individual windings are, in effect, disconnected from the operative circuit to control output voltage and/or current. However, particularly in compact high power, high speed ratio applications such as motor vehicles, the switching transitions between windings have deleterious effects, especially at the high end of the RPM range.

Other attempts have involved controlling the RPM of the alternator, and thus its voltage, independently of the engine RPM. An example of such an attempt is described in U.S. Pat. No. 4,695,776, issued Sep. 22, 1987 to Dishner. These solutions tend to involve mechanical components that are large, require maintenance and are subject to wear.

Other attempts have involved diverting a portion of the magnetic flux generated in the alternator to modulate output voltage. An example of a system is described in U.S. Pat. No. 4,885,493 issued to Gokhale on Dec. 5, 1989. Flux diversion, however, typically requires additional mechanical components and can be slow to react.

Rectification and regulation can be effected as a single process using a switching bridge (e.g. SCR bridge) with phase angle control of duty cycle. The bridge includes respective control switching devices (e.g. SCRs) that are selectively actuated to provide conduction paths between the input and output of the bridge. In essence, each half cycle (irrespective of polarity) of the AC signal produces a pulse of a predetermined polarity (typically positive) at the output of the bridge. The duration and timing of the conduction perhaps controls the output of the bridge. Such switching bridges may be "half controlled", comprising a respective controlled switching device (e.g. SCR) and diode for each phase, or "full controlled", comprising for each phase two switching devices (e.g. SCRs), one for each polarity.

Conventionally, the switching devices in the bridge are actuated in accordance with "phase angle control of duty cycle" to provide a predetermined voltage output level. Trigger signals to the switching devices are generated by a controller that detects zero crossings in the respective phases of the AC signal and generates the trigger signal accordingly (typically after a delay nominally corresponding to a predetermined phase angle in the AC signal, and, concomitantly with a desired DC output level). More particularly, in a conventional system, when a zero crossing is detected in a particular phase, the controller delays by a time period corresponding to the desired duty cycle (which, in turn, corresponds to the desired output voltage level). The delay is typically engendered by a one-shot or conventional timing circuit. For example, a capacitor is charged with current when the voltage across the capacitor exceeds a reference voltage, a trigger to the SCR associated with the phase is generated, and the capacitor discharged. In response to the trigger signal, the SCR turns on (is rendered conductive) and remains on until the current through it goes to zero, at which point it is rendered nonconductive until the next trigger signal. The cycle repeated in response to the next zero crossing of the appropriate polarity.

In a half controlled system, phase angle control of the output duty cycle is effected by selective actuation of the controlled switching devices during their associated half cycle of the AC signal; the diode segments of the legs are rendered conductive during the entire associated (opposite polarity) half cycle of the phase. The range of output signals that can be generated from a given AC signal level (and thus range of input AC signals) is thus limited, as compared to a full controlled system.

When full control is provided, the SCRs are each associated with a particular half cycle (polarity) of an associated phase. A trigger signal is generated in response to (e.g. after the phase delay) the zero crossing beginning the associated half cycle of the phase. Accordingly, provisions must be made to differentiate between positive going and negative going zero crossings.

When a switching bridge (e.g. SCR bridge) and phase angle control of duty cycle is used in conjunction with an AC power source that varies in magnitude and changes alternating frequency very rapidly (as in the case of an motor vehicle alternator) the variations in voltage output and ripple contents can be particularly significant. This is particularly true in full controlled systems. The variations in ripple contents in the output of the bridge can produce unacceptable output ripple harmonics and require extensive filtering. For example, the outputs of many alternators are not a uniform sine wave. Non-uniformities in amplitude and duration often occur between half cycles, and between phases of the AC input signal to the bridge, and are reflected in the outputs of the portions (legs) of the bridge circuitry associated with the respective phases. Such distortions and non-uniformities in the alternator output can occur for any of a number of reasons, such as, for example, variations in the placement of the winding turns relative to each other and, in the case of permanent magnet alternators, relative to the magnets. Further variations in the outputs of the portions (legs) of the bridge associated with the respective phases (due to, e.g. tolerances, temperature, etc) in component values between the circuitry associated with the various phases, cyclic change in frequency due to engine cylinder firing, variations in the magnetic air gap, variations of the saturation of the stator teeth as the magnet progresses etc.

In addition, the output of the generator often includes spurious components (e.g. spikes) that can be mistaken for zero crossings by the detector circuitry.

Thus, there is a need for a relatively inexpensive and efficient control system using relatively rugged semiconductors (such as SCRs) that can accommodate wide variations in the frequency and amplitude of an AC source (e.g. alternator), while minimizing output ripple harmonics and filtering requirements.

In some applications there may be relatively long lengths of electrical cable connecting the output of the converter to the load. For example, the cabling between the converter and battery (load) can be sufficient to cause a voltage drop between the converter and battery There are also a number of other factors that can affect the operation of alternator systems in the. For example, the operation of alternator systems can be significantly affected, and sometimes disabled, by the temperature of the system components. There is a need for an alternator control including mechanisms for detecting temperatures harmful to the operation of the alternator system.

In alternator systems used to charge batteries, battery temperature has a direct impact on the optimal battery charging voltage and battery sulfation is a major contributor to shortened battery life. There is a need for alternator charging systems (particularly in motor vehicle applications) that can dynamically adjust output for optimized charging voltage and dynamically handle battery sulfation.

There is a need for an alternator charging system including a mechanism for intelligent control, (e.g. microprocessor), providing for example: monitoring electrical system performance; providing electrical system protection; and field adjustment of system operating parameters.

The stator of a conventional high current motor vehicle alternator is constructed with conductors of large cross sectional area effectively connected in series. Several problems can exist with this winding method. For example: because of the low number of turns (in some instances only a single turn) per pole phase coil, it is difficult or impossible to make a small change in design output voltage by changing the number of turns of the phase pole coil; the large cross sectional area of the conductors make the stator difficult to wind; and a short circuit between coils will typically burn out the entire stator and may stall the alternator, resulting in possible damage to the drive system or overloading the vehicle engine.

In general, permanent magnet alternators incorporating a predetermined number of independent groups of windings, wound through slots about predetermined numbers of teeth where the power provided by each group is relatively unaffected by the status of the other groups are known. For example, such an alternator is described, together with a controller therefor, in U.S. Pat. No. 5,900,722 issued to Scott et al. on May 4, 1999. In the alternator described in U.S. Pat. No. 5,900,722, the number of groups of windings was equal to an integer fraction of the number of poles, and the controller circuit selectively completed current paths to the individual groups of windings to achieve a desired output.

However, there remains a need for a compact high power alternator wherein a desired output voltage can be achieved by changing the number of terms of the phase pole coil, that is relatively easy to wind, and minimizes the consequence of short circuits, while at the same time facilitating cooling. There is also a need for a converter that can accommodate such an alternator.

SUMMARY OF THE INVENTION

In accordance with various aspects of the present invention, a relatively inexpensive, control system is provided that can accommodate the wide variations in the output of a generator, such as a permanent magnet alternator, while providing an output with relatively uniform phase ripple.

In accordance with one aspect of the present invention, the trigger signal to a switching device (e.g. SCR) is initiated in accordance with the time integral of the voltage (e.g. volt-seconds) of the corresponding AC phase half cycle. For example, the trigger signal is generated when a ramp signal representative of the volt-seconds in the associated AC signal phase reaches a predetermined level. In the preferred embodiment, the ramp is generated by charging a capacitor with a signal representative of the voltage from the alternator itself.

In accordance with another aspect of the present invention, the trigger signal to a switching device (e.g. SCR) is initiated only in response to zero crossings occurring within a predetermined window of time related to (e.g. tracking) the frequency of the AC signal.

In accordance with another aspect of the present invention, an automatic gain system is employed to compensate for component value differences between the respective channels.

In accordance with another aspect of the present invention the control can compensate for losses present in long cable runs between converter and battery or other similar loses. Compensation can be effected either by sensing voltage remotely from the converter, e.g. in the vicinity of the battery, or locally within the converter.

In accordance with another aspect of the present invention a battery charging voltage can be optimized with respect to battery temperature.

In accordance with another aspect of the present invention a mechanism is provided to reduce battery plate sulfation.

In accordance with other aspects of the present invention mechanisms are provided to monitor various system parameters and to optimize various system parameters in the field.

In accordance with another aspect of the present invention various system protection methods have been implemented.

In accordance with another aspect of the present invention the stator winding is wound with a predetermined number of pole phase coils, preferably equal to the number of magnetic poles. Each pole phase coil is wound with enough turns to generate the required output voltage of the alternator and a fraction of the output current equal to 1 divided by the number of magnetic poles. These individual pole phase coils are then connected in parallel.

In accordance with another aspect of the present invention, a respective conducting phase ring corresponding to each output phase is installed within the alternator with each coil corresponding to the associated phase electrically connected to the conducting phase rings to facilitate cooling and grouping and transmission of output phases to the control In accordance with another aspect of the present invention the conducting phase rings are held in place by a non-conducting support structure.

In accordance with another aspect of the present invention the conducting phase rings are disposed to provide an efficient cooling by exposure to the cooling fluids e.g. air, passing over the conducting phase rings.

BRIEF DESCRIPTION OF THE DRAWING

The present invention will hereinafter be described in conjunction with the figures of the appended drawing, wherein like designations denote like elements (unless otherwise specified).

FIG. 4B is a diagram of the relative timing of waveforms of the various signals involved in generation of the SCR trigger signals in the controller of FIG. 2A.

FIGS. 17A-17e are collectively referred to as FIG. 17.

FIG. 17A is a side view of the exterior of an alternator in accordance with various aspects of the present invention.

FIG. 17B is a sectional view along A-A of the alternator of FIG. 17A.

FIG. 17C is sectional view of a terminal in the alternator of FIG. 17A.

FIG. 17D is a simplified sectional view along B-B of the alternator of FIG. 17A showing the relative placement of the conducting phase rings within the alternator.

FIG. 17E is a diagram showing possible variations of a conducting phase ring.

DETAILED DESCRIPTION OF THE PREFERRED EMBODIMENT

Figure 1:
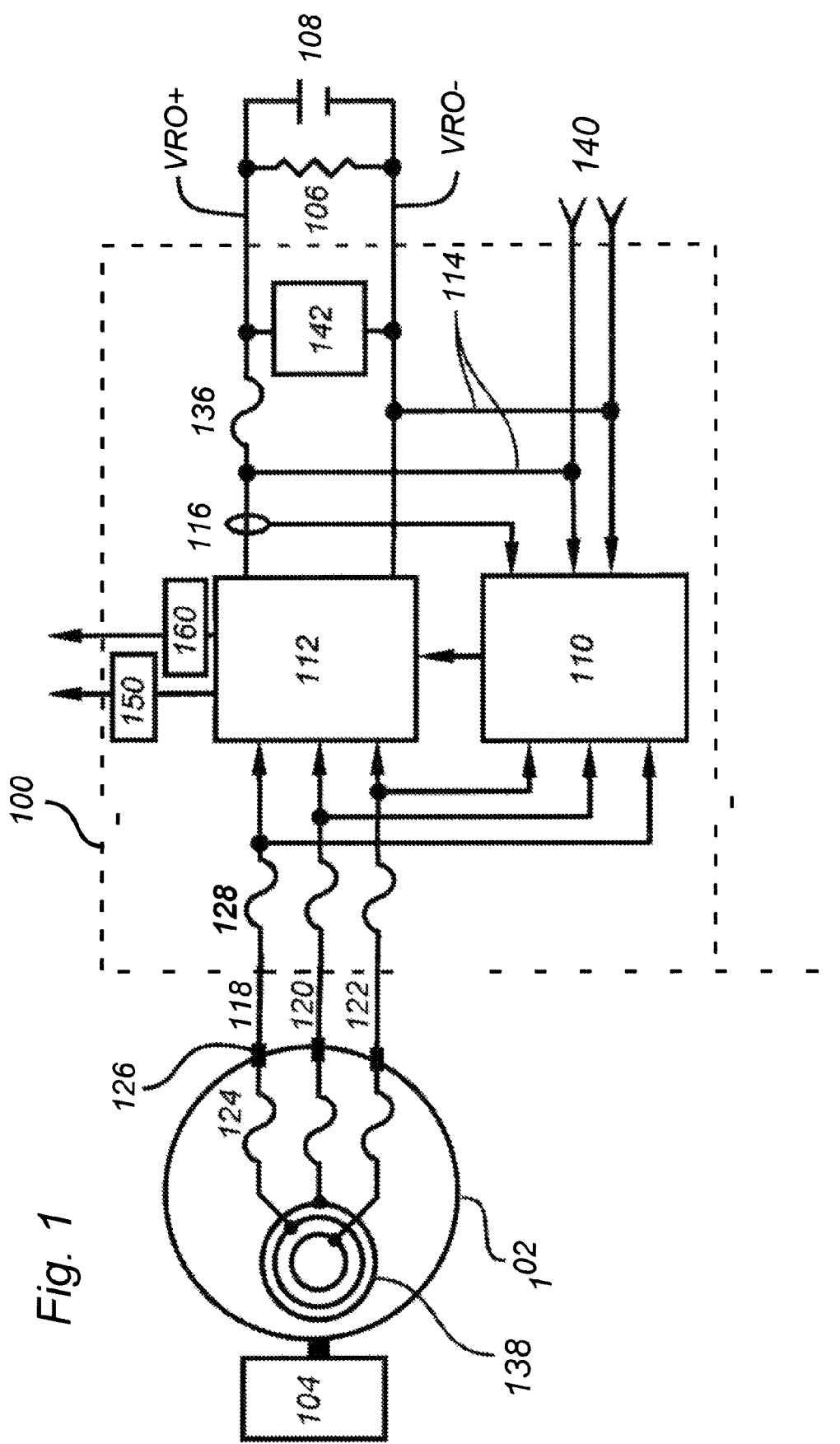
FIG. 1 is a block schematic of a system for converting between mechanical and electrical energy.

Referring now to FIG. 1, a system 100 for converting between mechanical and electrical energy in accordance with various aspects of the present invention comprises a controller 110 and a switching bridge 112. System 100 suitably cooperates with a source of AC power, such as an alternator 102 and a source of mechanical energy (e.g. drive) 104, e.g. an engine or turbine, a load 106, such as a motor and, if desired, in energy storage device 108, such as a battery, capacitor, or flywheel. If desired, an inverter (sometimes categorized as comprising part of load 106) can also be provided to generate an AC signal at a constant predetermined frequency and amplitude (e.g. 60 Hz, 120V).

In general, alternator 102 generates AC power in response to mechanical input from energy source 104. Alternator 102 preferably provides multi-phase (e.g. three-phase, six-phase, etc.) AC output signals, e.g. phase A (118), phase B (120), and phase C (122). Those output signals are typically unregulated and may vary significantly in accordance with drive RPM (source 104).

The AC phase signals from alternator 102 are applied to system 100, preferably through input fuses 128. System 100 rectifies the AC signal from alternator 102, i.e. converts it into a DC signal and regulates the voltage of that signal at a predetermined level, e.g. 28V. Switching bridge 112 selectively, in response to control signals from controller 110, provides conduction paths between the various phases of the AC signal from alternator 102 and a load 106. Exemplary switching bridges 112 are shown in FIG. 10 (a classical fully controlled SCR bridge) and FIG. 11 (an array of independent bridges). Controller 110 selectively generates control signals to switching bridge 112 to produce a regulated output signal at a predetermined voltage. As will be more fully explained later, controller 110 samples the regulated output either locally at input 114, or remotely at input 140 and adjusts the signals to bridge 112 to maintain the proper output. Additionally, the output current is sensed at input 116 to further modify the control signals to bridge 112.

The regulated DC signal Voltage Regulated Output (VRO) is then applied, suitably through an output fuse 136, to load 106 and energy storage device 108. Load 106 may be any device that uses power, such as, e.g. lights, motors, heaters, electrical equipment, power converters, e.g. inverters or DC-to-DC converters. Energy storage device 108 filters or smoothes the output of control system 110 (although, in various embodiments, controller 110 may itself incorporate or otherwise provide adequate filtering).

Additionally, as will be more fully explained later, other outputs, 150, and 160, are also provided. Also crowbar circuit 142 is provided for system protection.

Alternator 102 may be any suitable device that generates AC power in response to mechanical input, such as a brushless AC generator or a permanent magnet alternator, and preferably an alternator of the type described in commonly owned co-pending U.S. patent application Ser. No. 10/889,980 by Charles Y. Lafontaine and Harold C. Scott, entitled "Compact High Power Alternator" and filed on Jul. 12, 2004. The aforementioned Lafontaine et al application is hereby incorporated by reference as if set forth verbatim herein. As will be further described, in the preferred embodiment, alternator 102 is of the compact high power alternator type, but includes for each pole, a respective group of windings (including at least one winding corresponding to each phase) with all of the windings corresponding to a given phase connected in parallel. Preferably, the parallel connection between coils corresponding to the same phase is effective through a corresponding conducting phase ring 138, and includes fusible links 124, disposed between the conducting phase rings 138, and the output terminals 126 of the alternator. Conducting phase rings are a means to efficiently collect the output of each individual coil to its respective conducting phase ring, which is in turn attached to its respective output terminal. As the total number of poles increases so too do the number of individual coils. The conventional method of gathering coils involves soldering the motor wire to conventionally insulated motor lead wire. As the rated output of the alternator increases, a corresponding increase in the load carrying capacity of the motor lead wire is also required. The only means available to meet the increasing load demand on the lead motor wire is to increase the cumulative gauge of the wire by increasing the gauge of a single wire or by using multiple wires in parallel. The net effect is increasingly larger and larger cross sectional areas of motor lead wire. When considering the total number of coils and their respective end turns along with the lead wire and its associated insulation, the resulting stator assembly with conductor and motor lead wire tied together insulate the end turns, detrimental to cooling. The resulting assembly also restricts the only available airflow over the end turns further reducing cooling. A preferred embodiment of alternator 102 will be described in conjunction with FIG. 17.

Briefly, alternator 102 suitably comprises a rotor mounted on a rotating shaft and disposed concentrically relative to a stationary stator. The stator suitably includes respective phase windings, A, B and C connected together at one end (neutral), in a star configuration. In operation, the rotator is driven by external energy source 104, either directly or through an intermediate system such as a pulley belt. In motor vehicle applications, alternator 102 is typically mounted under hood, and belt driven from the vehicle engine. Relative motion between rotor and stator causes voltage to be induced in the windings. Alternator 102 is preferably designed such that it generates a predetermined minimum voltage at idle or a minimum RPM under full load conditions. As noted above, in motor vehicle applications, drive RPM can vary widely, e.g. from 600 RPM at idle, to 3000 RPM for large diesel trucks 600 to 4,000 RPM for light duty diesels, and from 600 to 6500 RPM gasoline vehicle engines. In addition, the alternator must accommodate variations in load, i.e., no load to full load. Thus the output voltage of a permanent magnet alternator 102 when used with a gasoline vehicle engine can be subject to a 12:1 variation. Accordingly, if a conventional permanent magnet alternator is required to provide operating voltage (e.g. 18 volts) while at idle speeds with a given load, it will provide multiples of the operating voltage, e.g. twelve (12) times that voltage, at full engine RPM with that load, e.g. 216 volts.

Figure 2A:
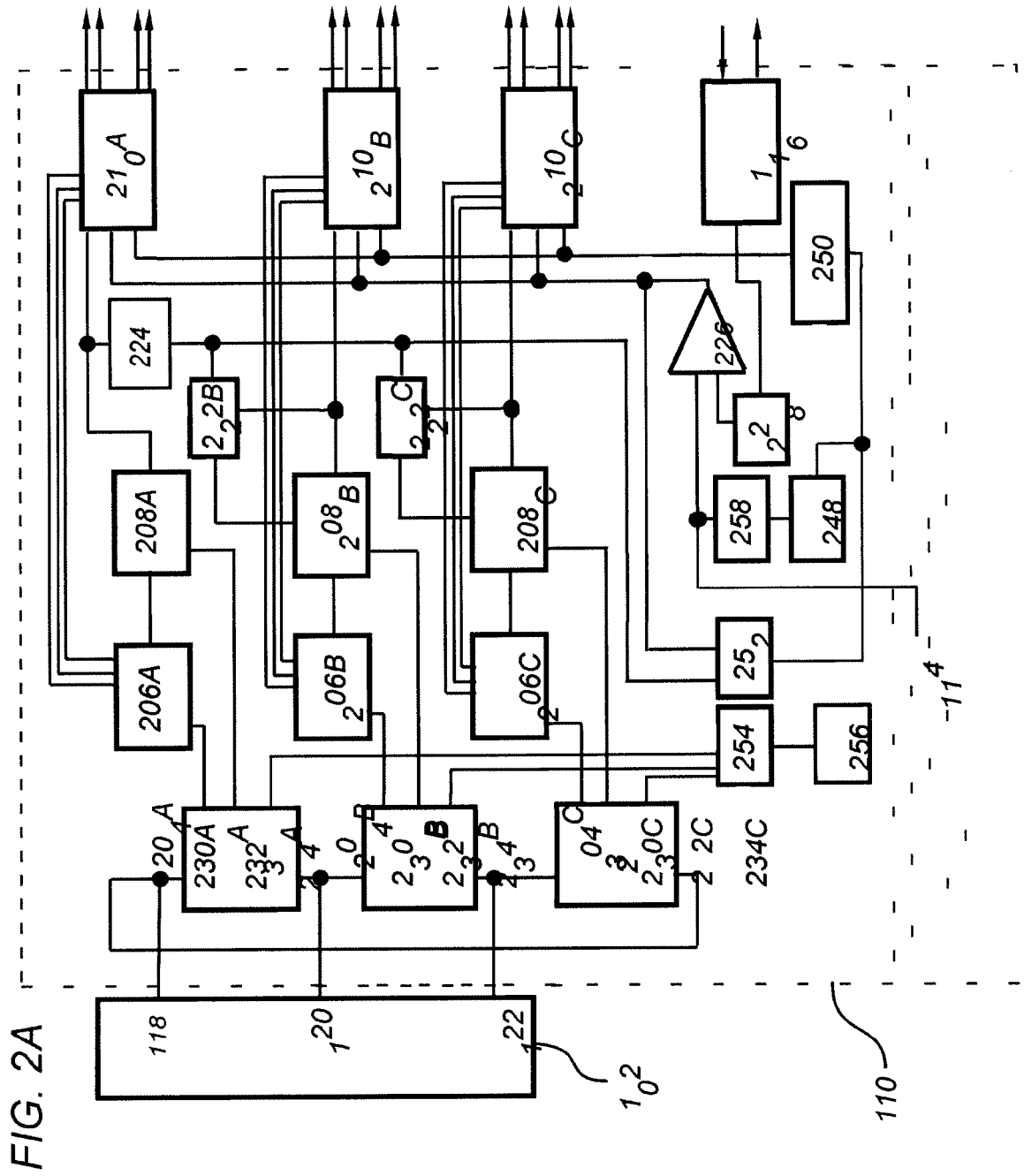
FIG. 2A is a block schematic of a controller in accordance with various aspects of the present invention.
Figure 2B:
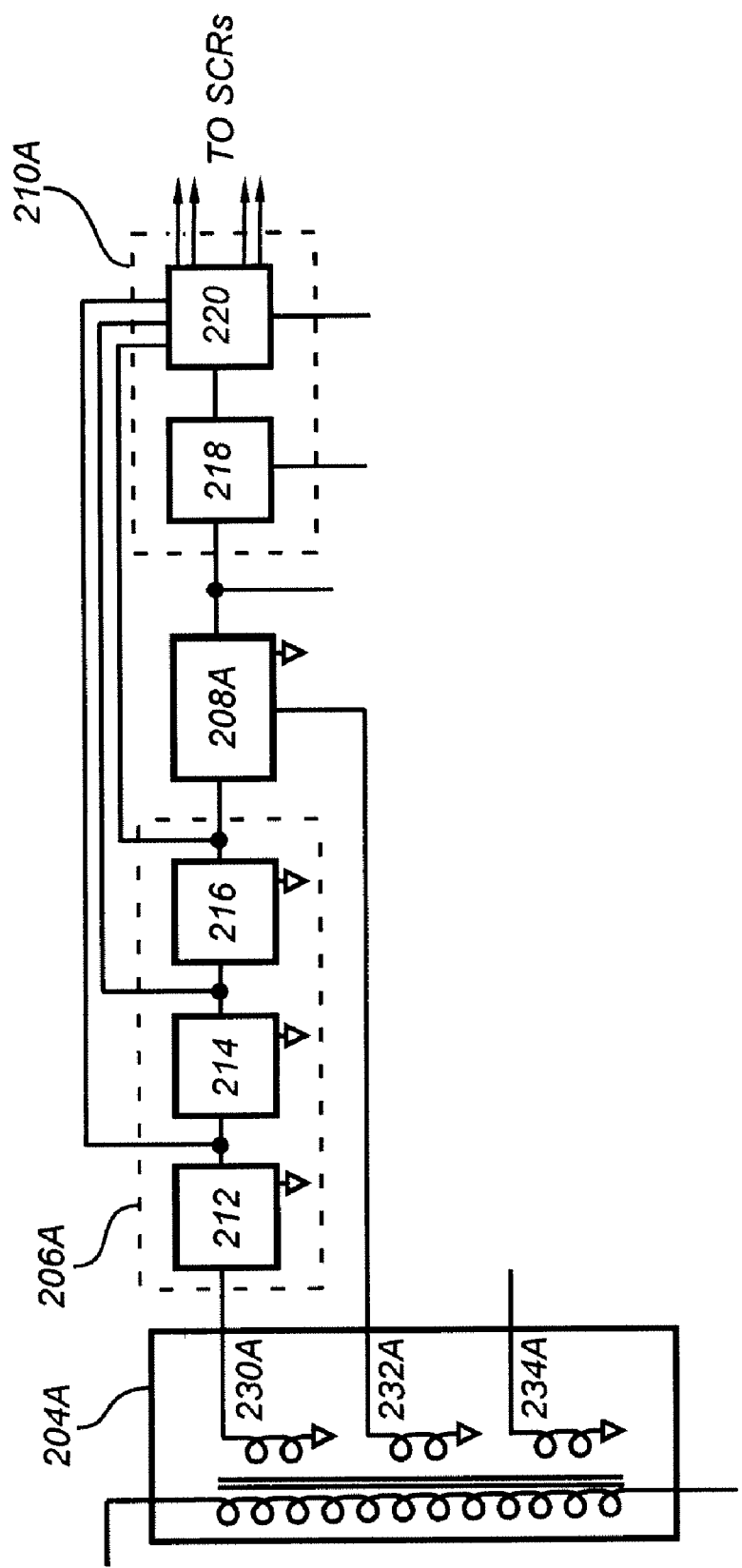
FIG. 2B (collectively, together with FIG. 2A, referred to as FIG. 2) is a block schematic of a single channel within controller 2A in accordance with various aspects of the present invention.

Referring now to FIGS. 2A, and 2B, controller 110 suitably comprises a circuitry channel for each phase of the output signal provided by alternator 102. Each circuitry channel comprises: a respective phase isolation transformer 204 (e.g. transformers 204A, 204B, and 204C, respectively, for phases A(118), B(120) and C(122) of a three-phase AC signal); a respective zero-crossing detector 206 (e.g. 206A, 206B, and 206C, respectively, for phases A(118), B(120) and C(122); a respective variable ramp generator 208 (e.g. 208A, 208B, and 208C, respectively, for phases A(118), B(120) and C(122); and a respective trigger generator 210 (e.g. 210A, 210B, and 210C, respectively, for phases A(118), B(120), and C(122)). Referring to FIG. 2B, zero-crossing detectors 206 suitably each comprise a filtered comparator 212, a variable blanker 214, and a reset pulse generator 216. Trigger generators 210 suitably each comprise a comparator 218, and appropriate digital routing logic 220.

Figure 4A:
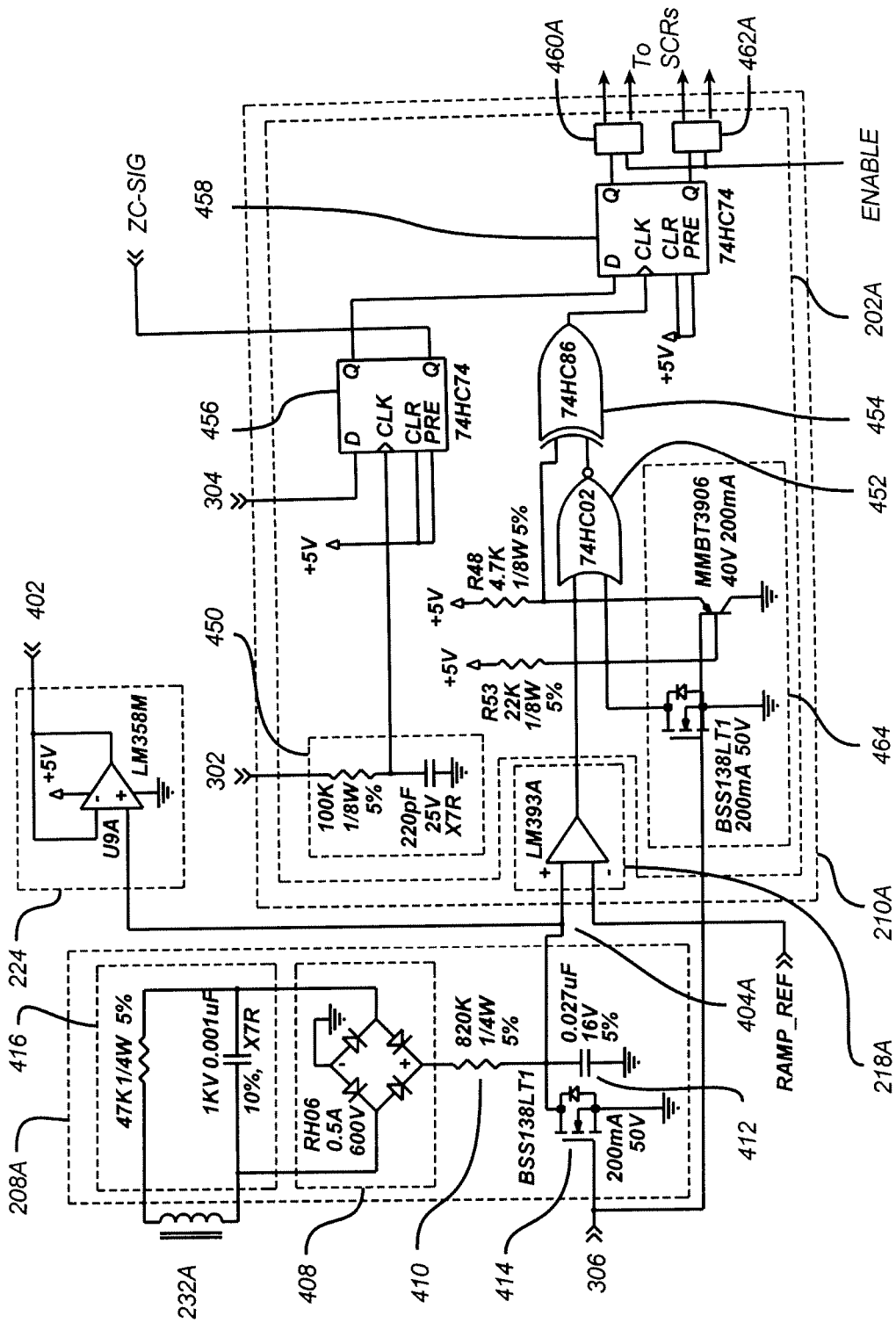
FIG. 4A is a schematic of a variable ramp generator, trigger generator, and buffer suitable for use in the controller of FIG. 2A.

Referring to FIG. 2, one of the phases (e.g. phase A (118), see also FIG. 4) is designated as a reference phase and includes a suitable buffer amplifier 224 receptive of the output of variable ramp generator 208. In accordance with one aspect of the present invention, the respective circuitry channels associated with other phases (e.g. phases B (120) and C (122), see also FIG. 5) each include an automatic gain control (AGC) amplifier 222 (e.g. 222B for phase B (120); 222C for phase C (122)). AGC amplifiers 222 cooperate with the variable ramp generator 208 of the associated circuitry channel, are referenced (through buffer 224) to the output of the variable ramp generator 208 of the reference channel (e.g. variable ramp generator 208A), the average voltage value of the ramps generated by variable ramp generators 208 (e.g. 208A, 208B, and 208C) are made equal by AGC Amplifiers 222(e.g. 222B, and 222C).

Controller 110 suitably further comprises: circuitry, e.g. error amplifier 226 and variable reference voltage generator 228, for generating a reference signal indicative of the desired firing angle to trigger generators 210 (e.g. 210A, 210B, 210C) against which the output of the associated variable ramp generator 208 (e.g. 208A, 208B, 208C) is compared; a conventional microprocessor or microcontroller 248 (e.g. a PIC18F242) for, in cooperation with various other elements of system 100, generating signals indicative of, or to react to, various operating conditions, (e.g. controlling various fans in response to system temperatures, limiting current or shutting the system down due to over-temperature conditions, shutting the system down due to over or under voltage conditions, etc.); an opto enable circuit 250, to selectively enable and inhibit application of trigger signals to switching bridge 112; a No-Fire circuit 252 for generating signals indicative of certain designated conditions during which application of the trigger signals to switching bridge 112 are inhibited; a system start circuit 254 for inhibiting operation in the absence of signals from all phases; a suitable logic power supply 256; and an over voltage detect circuit 258.

Referring now to FIG. 2B, in general, each of isolation transformers 204 has a primary winding driven by the associated phase-to-phase voltage and, multiple, isolated secondaries (230A, 230B, and 230C). Zero crossing detectors 206 each examines one of the secondaries (e.g. 230A) of the associated transformer 204 and determines when the voltage waveform crosses zero.

As previously noted, zero-crossing detectors 206 suitably each comprise a filtered comparator 212, a variable blanker 214, and a reset pulse generator 216. Filtered comparator 212 determines when the voltage is above or below a reference point, e.g. 0 volts to 3.5 volts, preferably 2.5 volts. The changeover point is deemed to be a potential zero crossing. Indicia of the polarity of the signal are provided to the associated trigger generator 210. Variable Blanker 214 provides a blanking pulse equal to a predetermined portion, e.g. between 30% and 70% and preferably 50%, of the zero crossing-to-zero crossing period so that spurious zero cross signals that might be caused by noise following the actual zero crossing, do not trigger the reset pulse generator 216. Variable ramp generators 208 each generate a ramp with a shape characteristic representing the volt-seconds appearing at the secondaries (232A, 232B, 232C) of the associated transformer. The ramp is compared to a ramp reference voltage (RAMP_REF), from error amplifier 226. Coincidence at comparator 218 asserts a signal to digital routing circuit 220 which generates a trigger signal that turns on the appropriate switching device in bridge 112. The ramp is reset by the associated reset pulse generator 216.

More specifically, each of phase isolation transformers 204 (e.g. transformers 204A, 204B, 204C) suitably include a primary winding and multiple (e.g. 3) secondary windings, (230, 232 and 234) and generate several isolated, scaled, voltage waveforms which embody the characteristics of the associated phase voltage at its respective primary winding. The primary winding is driven by the alternator phases A (118)-B (120), B (120)-C (122), or C (122)-A (118). The secondary windings provide signals to the associated zero crossing detector 206 and ramp generator 208 and to system start circuit 254. Phase isolation transformers 204 are suitably commercial transformers capable of providing sufficient isolation for the particular application, such as, in the preferred embodiment, Tamura 3FS-248 transformers.

A signal indicative of the waveform of the associated phase from one of the secondary windings (e.g. A (230A), B (230B), or C(230C)) of each transformer 204 is applied to the associated zero-crossing detector 206 (e.g. 206A, 206B, and 206C). The zero-crossing detector 206 detects the occurrence and polarity of voltage zero crossings in the signal and generates waveform polarity information and ramp reset signals. The output signals of each zero-crossing detector 206 (e.g. 206A, 206B, and 206C) is provided to the associated variable ramp generator 208 (e.g. 208A, 208B, and 208C) and trigger generator 210 (e.g. 210A, 210B, and 210C). The outputs of the trigger generators, if enabled by the optocoupler enable circuit 250, are applied to fire the SCRs. The optocoupler enable circuit will not enable the trigger generator if the INHIBIT signal is asserted by either the microcontroller 248 or No-Fire circuit 252.

Figure 3:
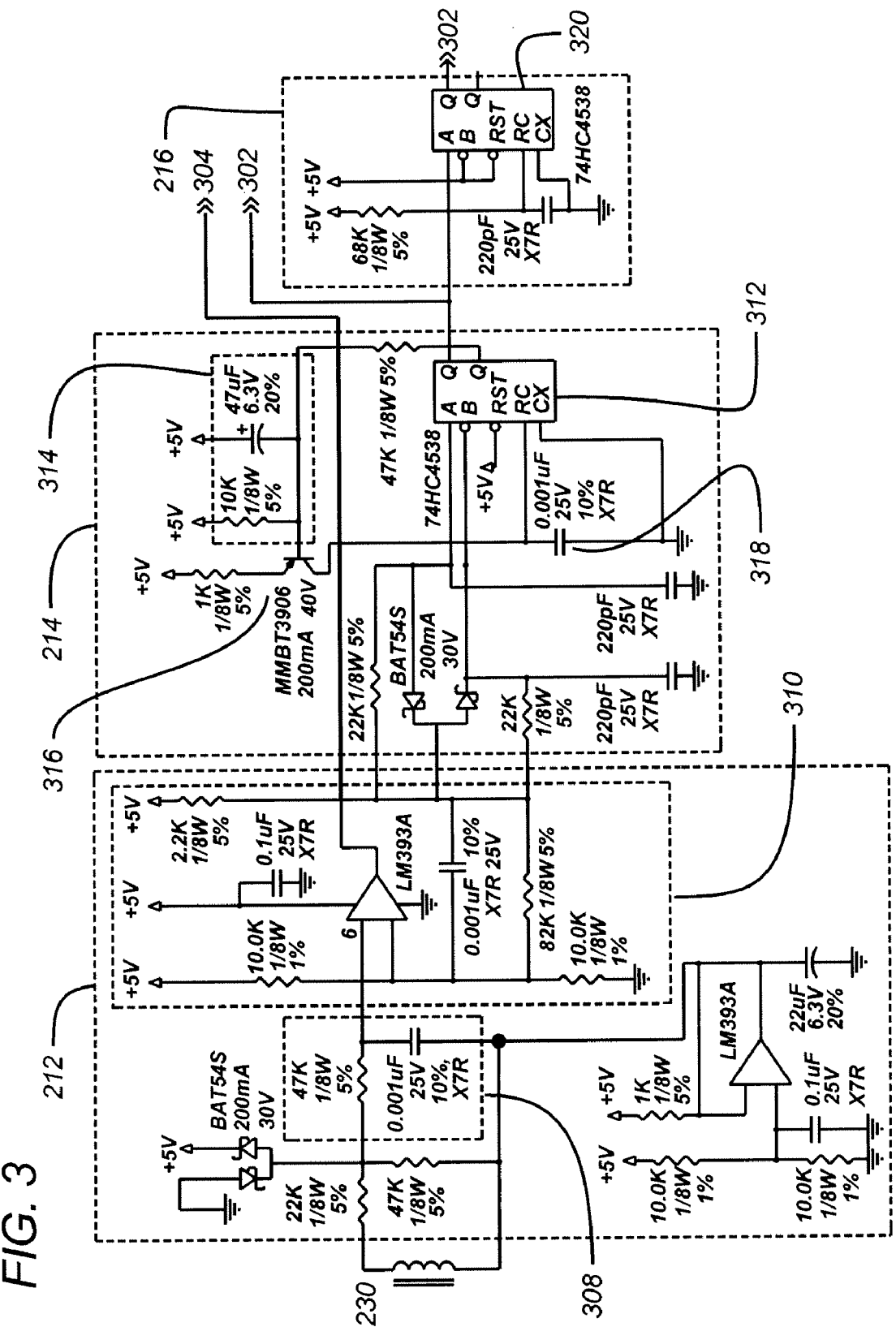
FIG. 3 is a schematic of a zero crossing detector suitable for use in the controller of FIG. 2.

As previously noted, zero-crossing detectors 206 suitably each comprise a filtered comparator 212, a variable blanker 214, and a reset pulse generator 216. Referring now to FIG. 3, filtered comparator 212 suitably comprises a low pass pre-filter 308, and a comparator 310 (preferably with a slight DC hysterisis between 0.1 and 0.3 volts preferably 0.28 volts). Filter 308 effectively removes high-frequency spikes from the AC phase signal from transformer 204. Comparator 310 generates a signal indicative of the polarity of the AC phase signal; transitions in the output of comparator 310 indicate a zero-crossing. The output of comparator 310 (indicative of the polarity of and zero crossings in the associated AC phase) is applied to the associated variable blanker 214 and provided, at nominal connection point 304, for application to the associated trigger generator 210.

Variable blanker 214 (in cooperation with trigger generator 210) effectively prevents spurious transitions in the comparator output that might otherwise cause an SCR trigger signal to be generated from doing so. Transitions occurring within a predetermined portion of the comparator half cycle (e.g. within a predetermined number of phase degrees after a zero-crossing) are prevented from generating an SCR trigger signal. Still referring to FIG. 3, variable blanker 214 suitably comprises a monostable multi-vibrator (one shot) 312, a filter 314 and a variable current source 316. One shot 312 is triggered by both positive going and negative going transitions in the output of comparator 310. The duration of the pulse generated by one shot 312 is a predetermined portion (e.g. suitably in the range of 30% to 70%, and preferably 50%) of the time between triggers (transitions in the comparator output), i.e., the duration of the half cycle of the output of comparator 310.

In the preferred embodiment, the duration of the one shot output pulse is controlled by the time required to charge a timing capacitor (e.g. 318). The timing capacitor is typically discharged when one shot 312 is triggered, and the output of one shot 312 is maintained at a predetermined level (e.g. the Q output of one shot 312 is held high) until capacitor 318 recharges to a predetermined level (at which point the Q output goes low). In conventional applications, a timing capacitor is typically charged through a resistor, and the duration of the one shot output pulse is constant. In the preferred embodiment of the present invention, however, the timing capacitor is charged through current source 316 driven by a signal proportional to the duty cycle of the one shot output (and hence the frequency of the comparator output) so that a time required to charge the timing capacitor is inversely proportional to the duty cycle of the one shot output. More specifically, the inverted output (Q bar of one shot 312) is applied to filter 314 which generates a DC signal proportional to the duty cycle of the one shot output to current source 316. Thus if the duty cycle (percentage of the comparator output half cycle) of Q output pulse decreases, the current provided to the timing capacitor will decrease. With decreased charging current, more time is required to charge the capacitor to the predetermined level, and thus increasing the duration of the one shot output pulse. Conversely, if the duty cycle of the one shot output signal increases, the current to the timing capacitor is increased, hastening the charge of the timing capacitor. The values of the components of filter 314 are chosen such that the duty cycle of the one shot output is equal to the predetermined value at a given comparator output frequency. The net result is that the duty cycle of the one shot output signal will self adjust to the predetermined value regardless of the rate of trigger inputs. The output of one shot 312 is provided to reset pulse generator 216, and, at connection point 302, for application to the associated trigger generator 210.

Reset pulse generator 216, in response to transitions of a predetermined polarity (e.g. rising edge), generates a short uniform duration pulse suitable for application to a switching element (e.g. a transistor 414, FIG. 4) in ramp generator 208 to reset the ramp (e.g. discharge capacitor 412, FIG. 4). Pulse generator 216 suitably comprises a one shot 320, as shown in FIG. 3, providing the pulse at nominal connection point 306 for application to the associated ramp generator 208, and associated trigger generator 210. Since one shot 320 is responsive only to the rising edge of the variable blanker pulse from one shot 312, the reset pulse can be generated only once within the period defined by the variable blanker.

Variable ramp generators 208 (e.g. 208A, 208B, 208C) generate a voltage ramp indicative of the time integral of the associated phase voltage (volt-seconds). The ramp is reset at phase zero crossings. More particularly, variable ramp generators 208 each generate a volt/second ramp in response to signal from a second secondary winding (e.g. 232A) of the associated isolation transformer 204. Ramp generators 208 are reset (and begin a new ramp) upon zero crossings in the associated phase, as indicated by a reset signal from the associated zero-crossing detector 206 (reset pulse generator 216). The instantaneous output voltage of ramp generator 208 is thus indicative of the volt seconds of the associated phase half cycle. Variable ramp generators 208 provide the volt/second ramp to the associated trigger generator 210 (210A, 210B, 210C). As will be further discussed, the associated trigger generator 210, compares the ramp voltage to a reference voltage, and, unless disabled by optocoupler enable circuit 250, generates a SCR trigger signal accordingly (e.g. when the ramp voltage is equal to the reference voltage).

In the case of the channel associated with designated reference phase (e.g. phase A), the ramp is also applied through buffer amplifier 224 to the respective AGC Amps 222 (222B, 222C) associated with the other channels. As will be more fully discussed, to facilitate automatic gain control certain components (e.g. resistors 410, FIG. 4) of the ramp generator 208 associated with the designated reference phase (e.g. 208A) are preferably of values relative to the values of analogous components associated with the other phases such that the output ramp of the ramp generator 208 associated with the reference phase is greater than the ramps generated by the other channels. An exemplary ramp generator 208 suitable for use in association with the designated reference phase (e.g. ramp generator 208A) is shown in FIG. 4. An exemplary ramp generator 208 suitable for use in association with the other phases (e.g. ramp generators 208B, 208C) is shown in FIG. 5.

Figure 5:
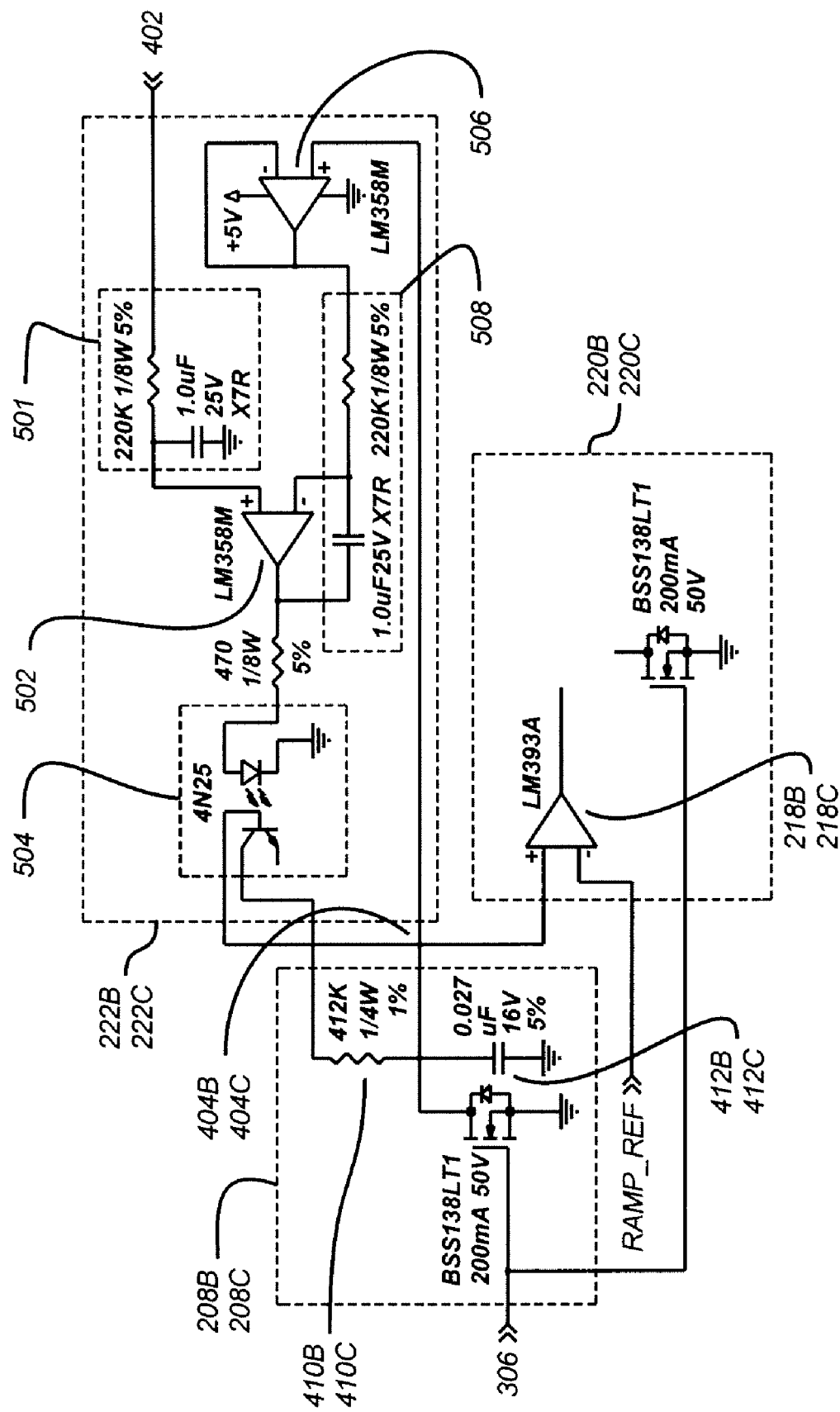
FIG. 5 is a schematic of a variable ramp generator, trigger generator, and automatic gain control circuit suitable for use in the controller of FIG. 2A.

Referring to FIGS. 4 and 5, ramp generators 208 suitably comprise a rectifier bridge 408, a resistance (e.g. resistor or resistance network) 410 cooperating with a capacitor 412, and a switching device 414 (e.g. a transistor). Rectifier bridge 408 generates a DC signal (indicative of the voltage magnitude of the associated AC phase) which is applied through resistance 410 to charge capacitor 412. Switching device 414 is disposed to provide a controllable discharge path for capacitor 412 (e.g. shunted across capacitor 412). Switching device 414 is rendered conductive in response to the reset pulse (generated at zero crossings) from reset pulse generator 216 applied to nominal connection point 306 to discharge capacitor 412. Capacitor 412 is thus charged by a current indicative of the AC phase voltage beginning at the zero crossing initiating the instantaneous half cycle, so that the voltage across capacitor 412 is indicative of the cumulative volt-seconds of the AC phase during the half cycle.

Generating the ramp as a function of the voltage of the alternator itself (e.g. the volt seconds of the waveform) accommodates a wide range of alternator RPM. The time integral of the voltage (volt seconds) generated by a given winding of the alternator during a half cycle is constant at any RPM. As alternator RPM (and hence frequency of the signals provided by transformer 204) increases, the period the half cycle decreases, but the voltage of the signal increases such that volt-seconds of the half cycle remain constant. Thus the ramp is the same peak value (total volt seconds) for each half cycle at any rpm.

Ramp generators 208 preferably, also include a compensating filter 416, corresponding to pre-filter 308 in filtered comparator 212. Pre-filter 308 is preferably, as previously mentioned, employed in filtered comparator 212 to eliminate spurious high frequency transients in the output of the associated phase isolation transformer 204. Pre-filter 308 tends to interject a phase shift into the signal from which the zero crossings, (and reset pulse) are generated. It is desirable that reasonable fidelity be maintained between the generation of the ramp (e.g. ramp interval) and the reset pulses. Accordingly, filter 416 is provided to generate an analogous phase shift in the signal from which the ramp is derived.

Referring again to FIG. 2, trigger generators 210 (e.g. 210A, 210B, 210C) compare the ramp indicative of the volt-seconds of the associated phase (from the associated ramp generator 208) applied at nominal connection point 404 to a control voltage indicative of the desired firing angle e.g. RAMP_REF, (i.e., a phase angle in the AC signal corresponding to a desired duty cycle, and, concomitantly, a desired DC output level). A SCR trigger signal is generated at voltage coincidence, and, unless disabled by the optocoupler enable circuit 250, routed to the appropriate SCR. An exemplary trigger generator 210 is shown in FIG. 4. Trigger generators 210 suitably comprise a comparator 218, and appropriate digital routing logic 220. Comparator 218 generates a signal indicative of when the volt-second ramp from ramp generator 208 (provided at nominal connection point 404) exceeds a reference signal (RAMP_REF) (provided, in the preferred embodiment, by error amp 226 in cooperation with reference voltage generator 228) indicative of the desired firing angle. Digital routing logic 220, suitably comprises an RC network 450, respective D-type (e.g. 74HC74) flip-flops, 456 and 458 forced clock circuitry 464, a nor gate, 452 and exclusive or gate, 454 and respective opto-couplers 460 and 462. Responsive to:

the output of comparator 218 (indicative of when the volt-second ramp from ramp generator 208 exceeds the reference signal (RAMP_REF);

the output of filtered comparator 212 (indicative of the polarity of the instantaneous half cycle) provided at nominal connection 304;

the output of variable blanker 214, (indicative of the predetermined portion of the half cycle during which transitions in the AC phase are deemed spurious and ignored) provided at nominal connection point 302; and the reset pulse (indicative of zero crossing transitions in the AC phase) provided at nominal connection point 306; and the ENABLE signal from opto enable circuit 250 digital routing circuitry 220, when activated, generates a trigger signal to the positive or negative SCR associated with the phase at voltage coincidence between the volt-second ramp and the reference signal (RAMP_REF). During normal operation the ramp signal (at nominal connection point 404) will exceed reference signal RAMP_REF, such that comparator 218A generates an output signal, which is passed through gates 452 and 454 to clock in data from flip flop 456 into flip flop 458. The Q BAR output of flip flop 456 is provided to the microcontroller as signal ZC_SIG. The output of flip flop 458 is applied to buffered optocouplers 460 and 462 (shown in more detail in FIG. 7). When the output of flip flop 458 changes state, the optocouplers are (if enabled) activated, sending a signal to the associated SCRs to fire. Optocouplers 460 and 462 are enabled by opto enable circuit 250 in the absence of an INHIBIT signal being asserted by either the microcontroller or No-Fire circuit 252. Polarity information held by flip flop 456 is derived from the output of comparator 310 (in zero cross detector 206) provided at nominal connection point 304 and is clocked by the variable blanker signal at point 302 (suitably delayed by RC network 450). In the event that signal 404 never exceeds RAMP_REF, no clock signal will be generated. In the event no clocking signal is generated, at the time of zero cross (signal 306 RAMP RESET) transistor pair 464 initiates a forced clock to flip flop 458 The waveforms of the various signals involved in generation of the SCR trigger signals are shown in the timing diagram of FIG. 4A.

AGC Amps 222B, and 222C compare the average voltage from the ramp generator 208 associated with the designated reference phase (e.g. 208A) with the average voltage from the associated ramp generator (e.g. 208B or 208C) and adjust the gain of the associated ramp generator (208B or 208C) so that the output ramp amplitude matches that of 208A. An exemplary AGC Amp 218 suitable for use in association with the designated reference phase (e.g. ramp generators 208B, 208C) is illustrated in FIG. 5.

As previously noted, variations in the outputs of the portions (legs) of the bridge associated with the respective phases tend to occur due to variations in component values between the circuitry associated with the various phases, due to e.g. tolerances, temperature differences, winding voltage variation etc. The use of AGC amplifiers 222 provides compensation for such differences. With reference to FIG. 5, AGC amplifiers 222 preferably comprise: a differential amplifier 502; a variable resistance device 504, such as, for example, a 4N25 optically coupled isolator; respective filters 501 and 508, and a buffer 506 (analogous to buffer 224 in FIG. 4). Differential amplifier 502 is receptive of signals indicative of the time integral (average) of the volt-second ramp from the channel associated with designated reference phase (e.g. the output of ramp generator 208A) and of the time integral (average) of the output ramp from the associated channel (e.g. the output of ramp generator 208B or 208C). More specifically, the signal indicative of the reference phase ramp provided by buffer 224 (FIG. 4) at nominal connection point 402 is applied to filter 501. Filter 501 generates a DC signal representing the time integral (average) of the reference phase volt-second ramp, which is applied to one (e.g. the positive) input of differential amplifier 502. The volt-second ramp from the associated channel (e.g. the output of ramp generator 208B or 208C) at nominal connection point 404 is passed through a buffer 506 and applied to filter 508. Filter 508 generates a DC signal representing the time integral of the associated phase volt-second ramp, which is applied to the other (e.g. the inverting) input of differential amplifier 502. Use of the integral of the volt-second ramps permits comparison notwithstanding the phase angle difference between phases (e.g. 120°). The difference between the integrals of the respective volt-second ramps, generated by amplifier 502 is employed to control the resistance of variable resistance 504. Variable resistance 504 is connected such that this adjustment changes the effective resistance of resistance 410 controlling the time constant of capacitor 412 in the associated ramp generator 208 (208B or 208C) so that the time integral of the associated phase volt-second ramp (e.g. from 208B or 208C) is identical to the time integral (average) of the reference phase volt-second ramp (e.g. from 208A). Thus the effects of variations between analogous components associated with the respective phases are minimized.

As previously noted, trigger generators 210 (e.g. 210A, 210B, 210C) generate a trigger signal to the appropriate SCR when the volt-second ramp indicative of the associated phase coincides with a control voltage indicative of the desired firing angle. The control signal can be fixed (constant), or variable, as in, for example, a feedback loop tending to maintain a predetermined regulated output voltage. In the preferred embodiment, the reference signal is established as part of a control loop. By comparing a fraction of the output voltage with the reference voltage from variable reference voltage 228, error amplifier 222 provides a control voltage which ultimately varies the SCR trigger latency and thus adjusts the output voltage.

Figure 6:
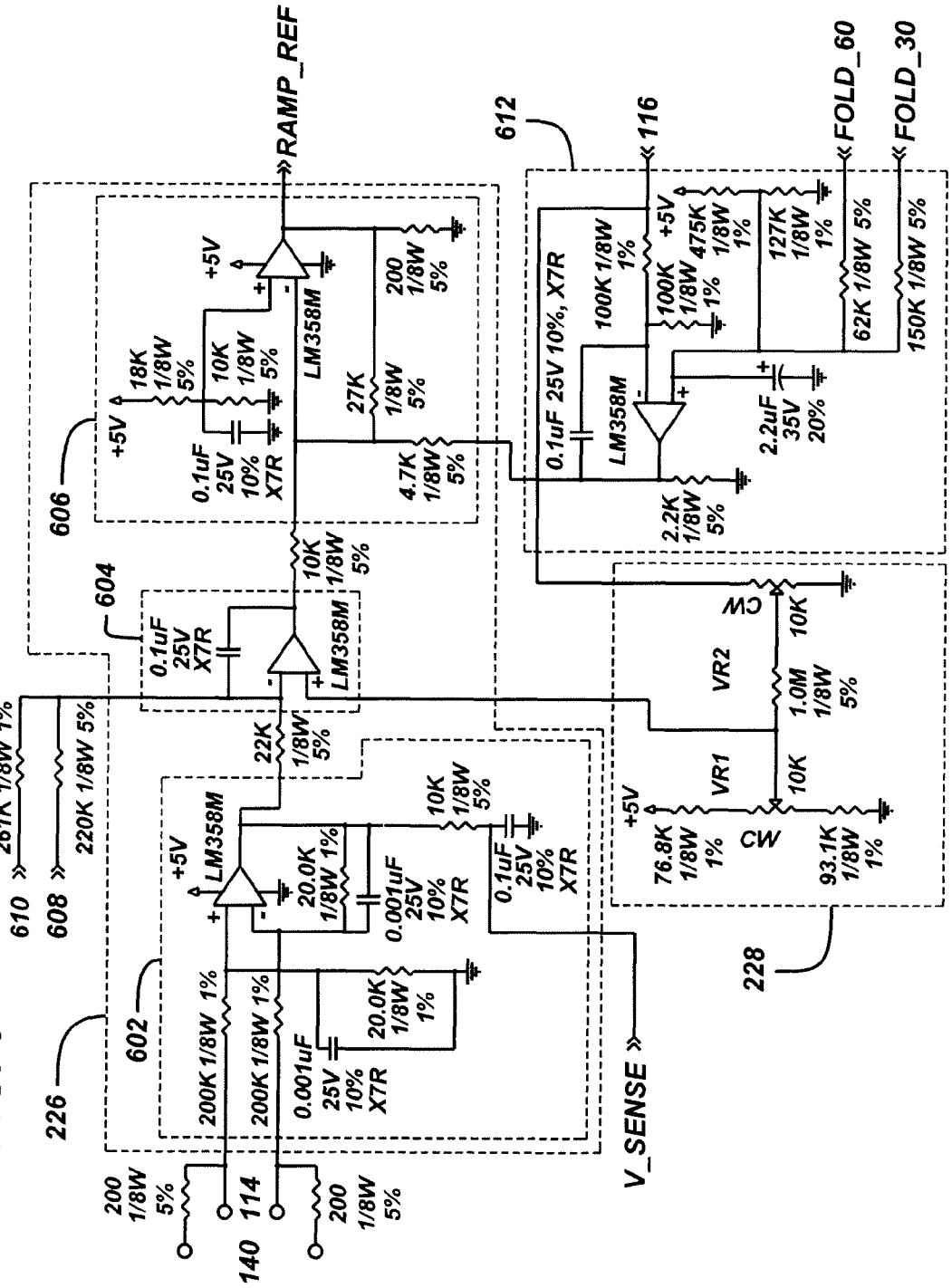
FIG. 6 is a schematic of an error amp and variable reference voltage source suitable for use in the controller of FIG. 2A.

Referring to FIGS. 1, 2, and 6, the voltage across load 106 is fed back through suitable connections to the voltage feedback input (local 114 or remote 140 which will be explained more fully later) to error amp 226. Error amp 226 generates control signal RAMP_REF in accordance with deviation of the feedback signal from a reference voltage indicative of the desired output voltage. Error amp 226 preferably comprises a suitable scaling amplifier 602, a differential amplifier 604 and a suitable inverter/level shifter 606. The local feedback voltage (114) provided by internal connections inside the controller, or remote feedback voltage (140) is appropriately scaled by amplifier 602, and the scaled voltage applied as one input to differential amplifier 604. Additionally, this signal is provided to the microcontroller as V_SENSE. Differential amplifier 604 generates a signal indicative of deviations in the scaled feedback signal from a reference voltage (provided in the preferred embodiment by a variable reference voltage source 228) indicative of the desired output voltage. The difference signal is inverted and level shifted as appropriate by inverter/level shifter 606, and applied as the control signal RAMP_REF to trigger generators 210. As will be more fully explained later, the RAMP_REF signal is also modulated by an elevated charge signal applied at 610, a battery temperature signal applied at 608, and a current control summing amplifier 612 which is responsive to current signal 116, and current foldback signals FOLD_30 and FOLD_60.

Variable reference voltage source 228 provides the reference voltage. The reference voltage can be fixed (constant) or, as in the preferred embodiment, dynamically modulated in accordance with an environmental parameter. For example, in applications where relatively long lengths of electrical cable connecting the output of the converter to the load can be sufficient to cause a significant voltage drop, the reference voltage can be modulated to account for such voltage drop. As current to the load increases (and the cabling voltage drop increases), the voltage regulation point is adjusted upward to maintain the desired regulated voltage at the load.

In certain applications suitable cabling may be installed between the desired regulation point, (e.g. battery terminals) and the remote sense input (140). However, in other applications (particularly retrofit applications) installation of suitable voltage sense cabling may not be practical. To accommodate such adjustments in applications were remote sense is impractical, a current sensor (e.g. hall effect device, shunt or similar device) 116, and variable reference voltage source 228 comprising parallel potentiometers VR1 and VR2 are employed. Potentiometers VR1 and VR2 are initially adjusted in a no load (zero current) condition to provide a reference voltage indicative of the desired output voltage (e.g. the wiper of potentiometer VR1 is set to produce the desired reference voltage with potentiometer VR2 wiper set to ground). The system load is then increased and VR2 is adjusted to bring the voltage at the load (or battery) back to the desired nominal voltage. Thereafter, in operation, the current feedback signal from sensor 116 applied to potentiometer VR2 effectively modulates the reference voltage to compensate for resistive drops in the cable so that the voltage across load 106 is substantially constant irrespective of current flow and voltage drop in the cable. Alternatively, remote sense input 140 may be utilized to ensure the voltage at a regulation sense point (e.g. battery or sensitive load applications) is maintained, negating inherent system loses e.g. long cable lengths. In order to utilize remote sense, suitable cabling should be installed to make connections between the regulation point (e.g. battery terminals) and the remote sense input (140). Due to the resistance at the input of local sense 114, the remote sense signal applied at input 140 will automatically override the local sense input at 114. When using remote sense, the wiper of potentiometer VR2 is set to ground. Thereafter, the system will regulate the VRO to maintain the desired voltage at the sense point (e.g. battery terminals) regardless of any losses between the output and the sense point.

It is desirable to adjust the voltage output setpoint (VRO), to accommodate changes in battery temperature. As shown in FIG. 6, the output of a temperature sensor nominally provided to input connection point 608 for generating a signal indicative of battery temperature may be included. The output of the battery temperature sensor applied to nominal connection point 608 is summed with the output of the input and scaling amplifier, 602. The battery temperature therefore controls a feedback signal which adjusts the amplitude of the RAMP_REF signal thereby modulating the output of switching bridge 112 (VRO) in accordance with battery temperature (e.g. approximately 10 mV reduction in charging voltage for every degree C rise for a lead-acid battery). This will cause the battery charging voltage to be optimized according to the battery temperature.

It is further desirable to periodically raise the system charging voltage, VRO in order to desulfate the battery plates. To accomplish this, microcontroller 248 periodically asserts a signal (provided at nominal connection point 610) to reference amplifier 604, resulting in RAMP_REF being lowered, thereby raising the desired output voltage (VRO).

It is desirable to protect the system circuitry from over current conditions to prevent system component failure. Again referring to FIG. 6, a conventional summing amplifier 612 is provided to sum the output of the current sense monitor 116, with current limit signals from microcontroller 248. Microcontroller 248 suitably generates signals indicative of a desired current limiting function, i.e. to limit the output current by a selected a percentage, e.g. either 30% or 60%, in response to over temperature conditions. Microcontroller 248 will assert a logic level low signal to the appropriately scaled input of summing amplifier 612 (e.g. either the 30%, FOLD_30, or 60%, FOLD_60, reduction input). The output of summing amplifier 612 is in turn summed with the input to inverter/level shift amplifier 606 thereby modulating the RAMP_REF signal in order to reduce the VRO setpoint during over-current or current fold-back conditions.

In non-12 volt systems, (e.g. a 24 volt system) it may be desirable to provide a source of 12 volt power for auxiliary systems. In some 24 volt automotive applications the alternator provides a 12 volt signal which controls an alternator warning indicator typically by powering a relay connected to a warning lamp. Accordingly, referring briefly to FIGS. 1 and 14, a circuit 150 may be included in the system 100 to provide a 12 volt source suitable for powering the relay or indicator to provide an indication of system operation (e.g. system operating normally). Circuit 150 is activated by RELAY_ENABLE from microcontroller 248.

Figure 14:
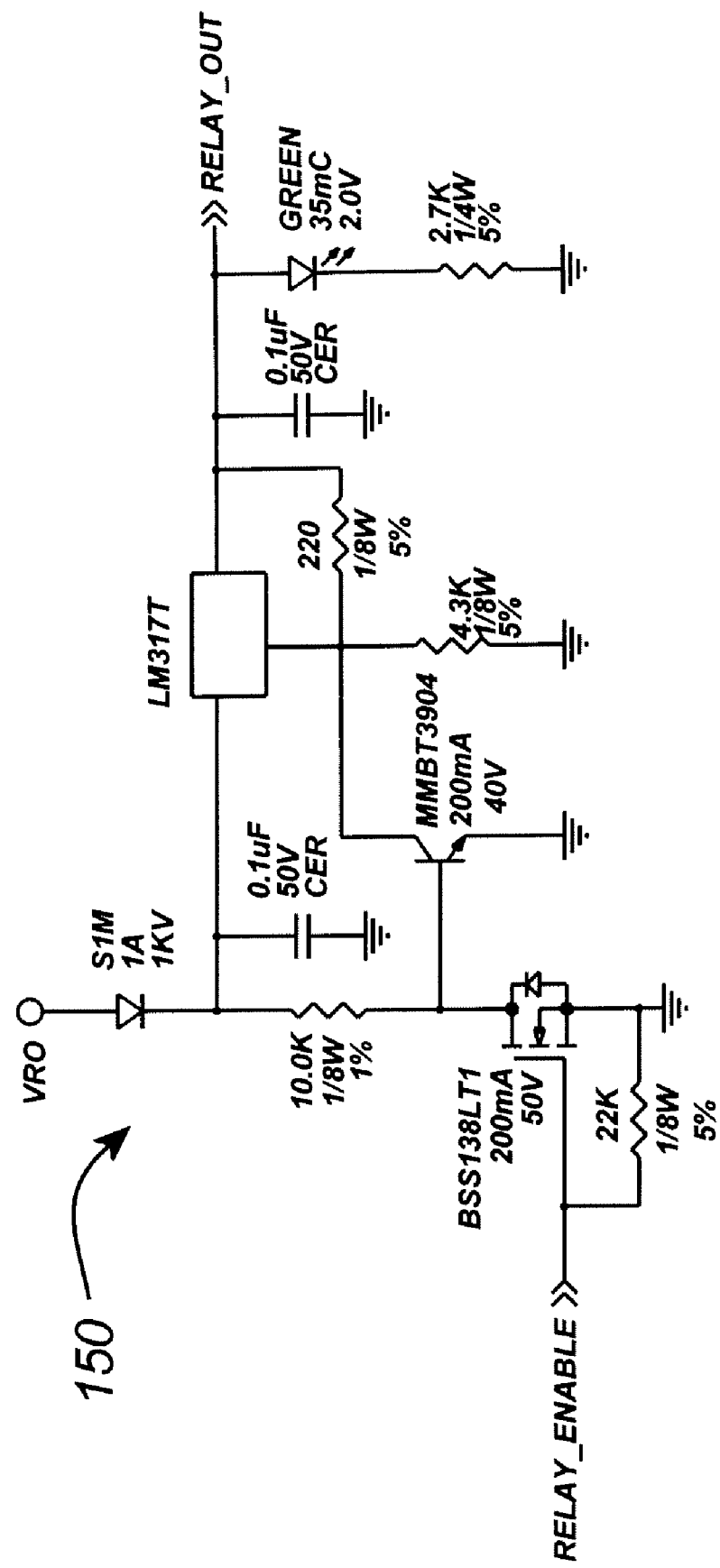
FIG. 14 is a schematic of a relay indicator circuit suitable for use in the controller of FIG. 2A.
Figure 15:
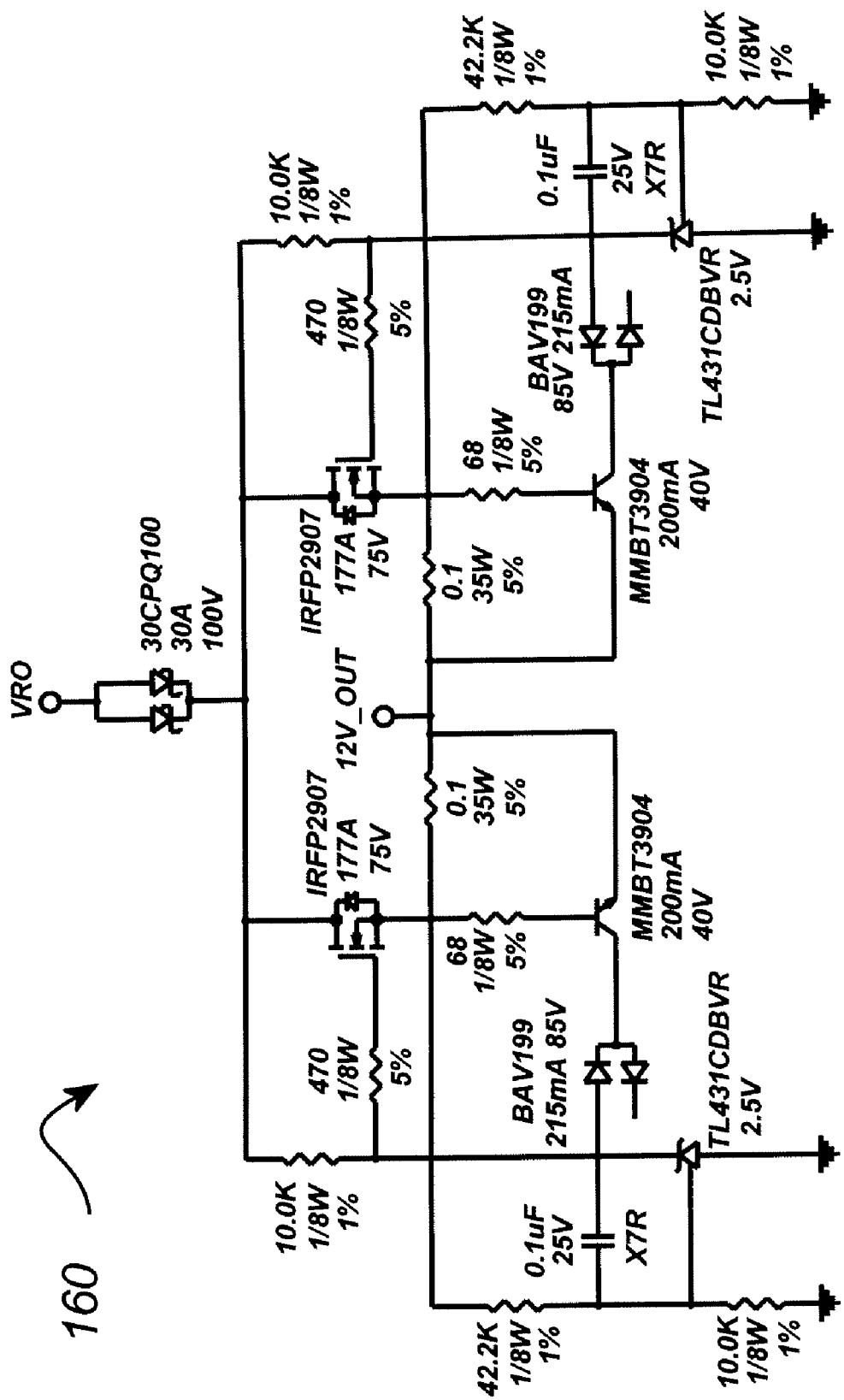
FIG. 15 is a schematic of an auxiliary 12V supply circuit suitable for use by the controller of FIG. 2A.

In some applications, it may be desirable to provide 12 volt power sufficient to operate 12 volt subsystems within system 100, in lieu of or in addition to the circuit of FIG. 14. Referring now to FIGS. 1 and 15, a circuit 160 may be included in system 100 to provide a 12 volt source sufficient to derive up to 10 amperes of current from the output (VRO) of switching bridge 112. Power supply 160 is enabled by the SYSTEM_START signal from system start circuit 254. Alternatively, in motor vehicle applications, a signal from the vehicle ignition switch may be used to enable circuit 160.

Neither, either, or both of sources 150 and 160 may be included in system 100 as application requirements dictate or may be replaced by a source of a different voltage.

Figure 7:
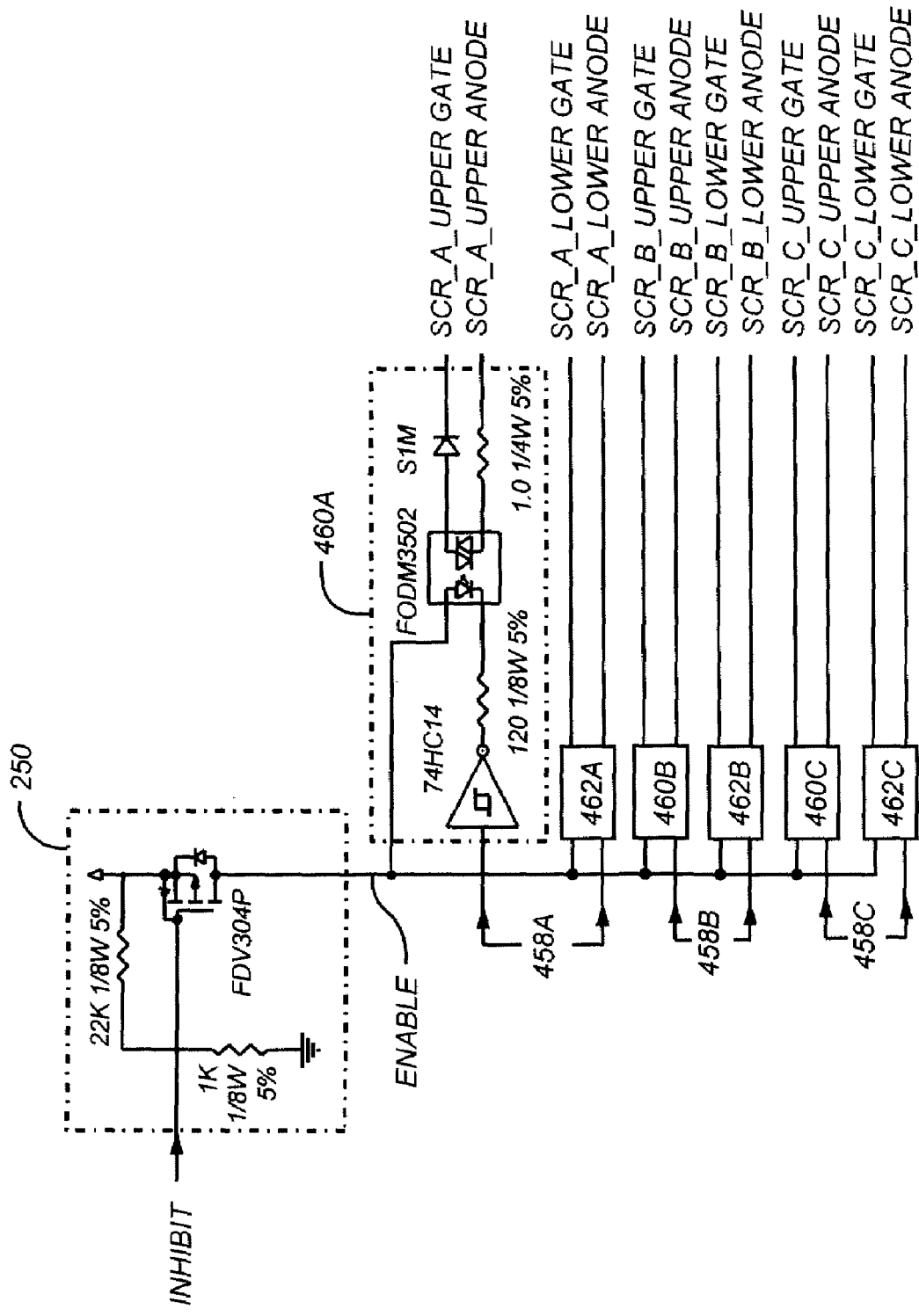
FIG. 7 is a schematic of a system enable circuit and buffered optocoupler suitable for use in the controller of FIG. 2A.

It is desirable to provide various failsafe systems to prevent potential damage to components in anomalous operating conditions. As shown in FIG. 2, controller 110 suitably includes various subsystems (e.g. microcontroller 248, system start circuit 254, over voltage circuit 258, etc.) to effectively disable controller 110 under certain conditions, such as when an input from alternator is not detected, control voltage RAMP_REF from error amp 226 approaches or exceeds the volt-second ramp value of the designated reference phase (from e.g. variable ramp generator 208A and buffer 224 at nominal connection point 402), or temperature limits are exceeded. Such conditions are indicated by generation of an INHIBIT signal by either microcontroller 248 or No-Fire circuit 252. Referring to FIGS. 2A, 4, and 7, opto enable circuit 250 suitably comprises a conventional switch for applying enabling voltage to optocouplers 460 and 462 in the absence of application of an INHIBIT signal from microcontroller 248, or No-Fire circuit 252 which allows the controller to operate normally. At the onset of an INHIBIT signal, circuitry 250 removes the optocoupler ENABLE signal.

Figure 8:
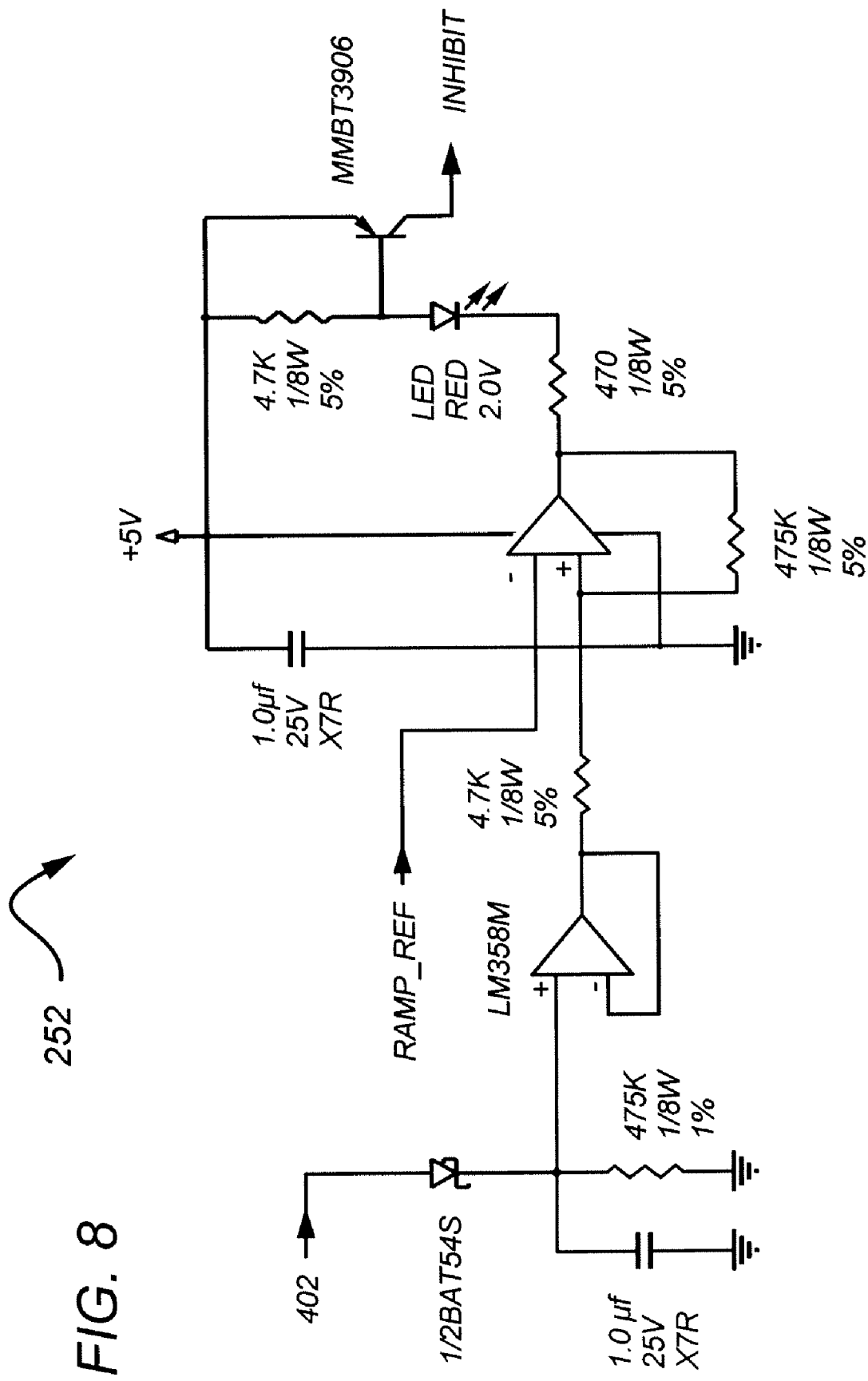
FIG. 8 is a schematic of a No-Fire detect circuit suitable for use in the controller of FIG. 2A.

An exemplary No-Fire circuit 252 is shown in FIG. 8. No-Fire circuit 252 compares reference signal RAMP_REF to the output of buffer 224, indicative of the voltage-second ramp generated by the designated reference phase channel (provided at nominal connection point 402). A RAMP_REF signal exceeding the buffered ramp signal at point 402 indicates that error amp 226 is responding to very light or no load condition. When reference signal RAMP_REF exceeds the output of buffer 224 (at point 402) then No-Fire circuit 252 asserts the INHIBIT signal. This prevents firing of the SCRs until the RAMP_REF signal lowers to a point below the output of buffer 224 (at point 402) at which point the SCRs begin to fire again.

Figure 9B:
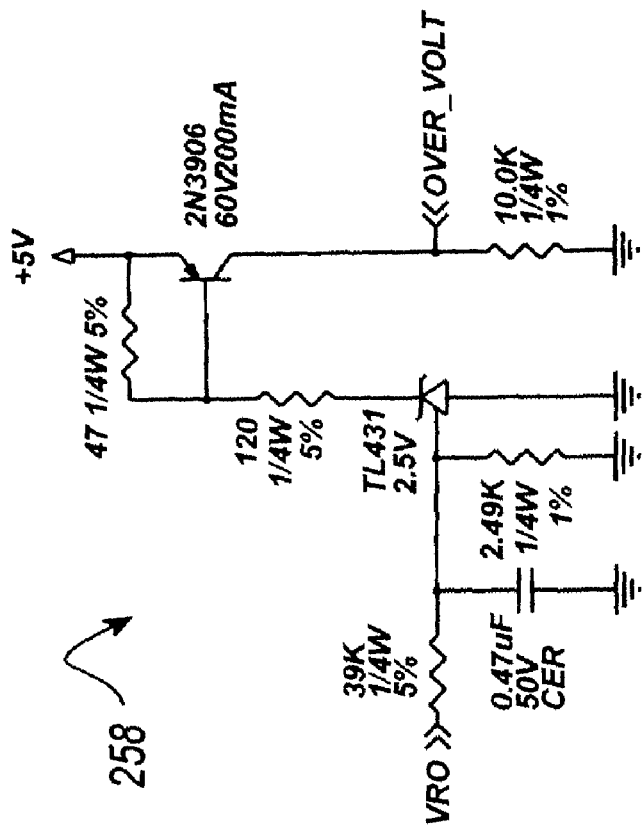
FIG. 9A and 9B (collectively referred to as FIG. 9) are schematics of exemplary condition sensing circuits suitable for use in the controller of FIG. 2A.

An exemplary over voltage detect circuit 258 is shown in FIG. 9B. Over voltage detect circuit 258 monitors the output (VRO) of switching bridge 112 and produces the OVER_VOLT signal when VRO exceeds a predetermined voltage value (e.g. VRO+15%). The OVER_VOLT signal is passed to microcontroller 248 which in turn responds by asserting the INHIBIT signal.

Figure 9A:
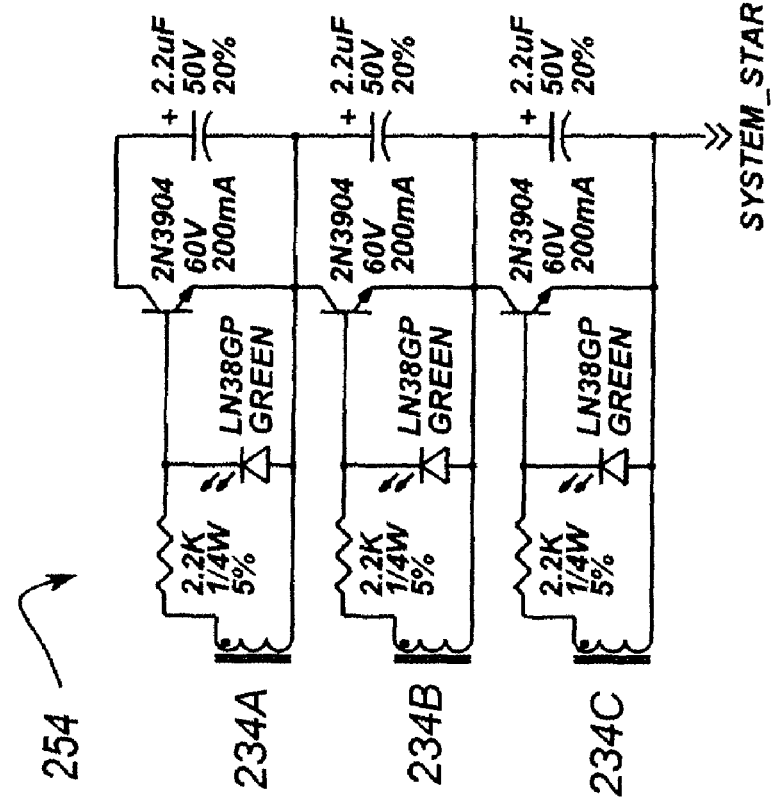

In the preferred embodiment, system start circuit 254 prevents system operation in situations where all phases of the AC input from alternator 102 are not present. Referring to FIGS. 2A and 9A, system start circuit 254 receives signals indicative of the outputs of the respective phases from a third secondary winding (e.g. 234A, 234B, 234C, respectively) from each of isolation transformers 204A, 204B, and 204C and generates a control signal, SYSTEM_START, only when all phases are present. Activation of the 5V logic power supply 256 (FIG. 15) is contingent on all 3 isolation transforms 204A 204B and 204C supplying their respective nominal outputs indicating the presence of all three phases from alternator 102. In the event that any phase should fail, the system will shut down.

Figure 13:
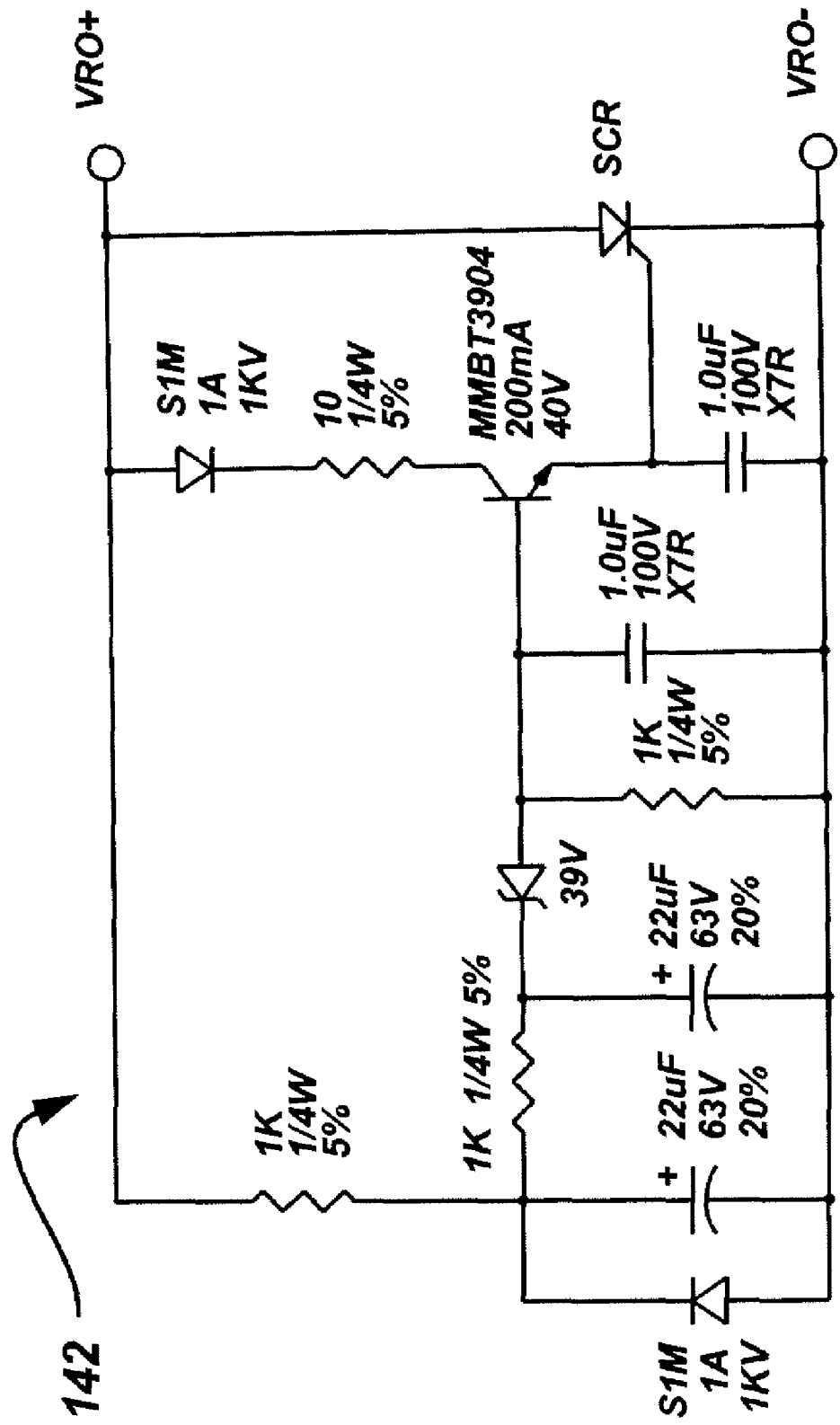
FIG. 13 is a schematic of a crowbar circuit suitable for use in the controller of FIG. 2A.

To protect against over current conditions (e.g. electrical short) fusible links 124, are provided in the phase wiring of alternator 102, input fuses 128 and output fuse 136 are provided in control system 100. (e.g. 350 amp fusible links, 350 amp input phase fuses and 400 amp output fuse for a 350 amp system). In addition, to protect electrical system components from over voltage conditions, a shorting crowbar circuit 142 (FIGS. 1 and 13) is provided at the voltage regulated output (VRO) of switching bridge 112. Crowbar circuit 142 shorts the output of system 100 in the event of catastrophic over voltage (e.g. 130% of VRO). In another embodiment, the crowbar circuit may be used to turn on all switching bridge 112 SCRs thereby shorting the output of the alternator. An exemplary crowbar circuit 142 is shown in FIG. 13.

Other sensor circuitry providing signals indicative of other operating parameters may also be provided to generate inputs to microcontroller 248 as parameters relevant to generation of the INHIBIT signal. For example, referring to FIG. 16, signals from sensor circuitry (not shown) providing signals indicative of various system parameters such as, for example, the temperature of alternator 102, the temperature of a heatsink on which various components are mounted, the temperature and current into, or out of, the battery, the rail voltage (VRO, the DC voltage to load 106 by sampling the output of the input and scaling amplifier 602, e.g. V_SENSE, FIG. 6), the output current signal 116 and a buffered signal from a zero-cross detector (e.g. ZC_SIG, FIG. 4) indicative of the alternator RPM, are applied as inputs to microcontroller 248. Responsive to those inputs, microcontroller 248 executes a program to generate:

- indicia of various operational parameters, and control signals for various fans (not shown) (e.g. an alternator cooling fan, a control system cooling fan) including variable speed fans which may be utilized for enhanced longevity
- A signal to periodically elevate the output of switching bridge 112 (VRO) to a level sufficient to reduce sulfation in the battery by driving sulfur from the battery plates back into solution in the electrolyte. This elevated charging voltage may be asserted in accordance with calculations of battery capacity based on battery temperature, voltage, and rate of discharge while the system is quiescent (e.g. engine off). For example, the battery voltage at any given temperature may be compared with a look-up table of nominal voltages for the type battery used (e.g. Pb-Pb or Pb-Ca). Additionally, the rate of voltage drop for any given current drain on the battery may be calculated to provide an indication of battery capacity. The elevated charging voltage signal may then be asserted at nominal connection point 610 the next time the system is started.
- In addition, based on the above battery capacity calculations, a warning indicator, (e.g. dashboard lamp) may be activated to indicate to the operator that the battery is nearing end-of-life, in order to prevent failure in the field. Another indicator may be activated as a warning that the battery charge is nearing depletion to the point of being unable to start the engine.
- Other warning indicators may alert the operator of excessive system temperatures, (e.g. alternator temperature, control system temperature) in order that the operator may reduce system loads to prevent system shutdown.
- Signals to reduce the current output first by 30% (FOLD_30), then by 60% (FOLD_60), and finally to shut the system down, (INHIBIT), are provided in response to elevated system temperatures.
- The INHIBIT signal for application to opto enable circuit 250 to remove the ENABLE signal to opto-couplers 460 and 462 (FIGS. 4 and 7) in digital routing circuits 220, such that SCR firing is disabled when the microcontroller 248 detects a system fault.

Figure 12A:
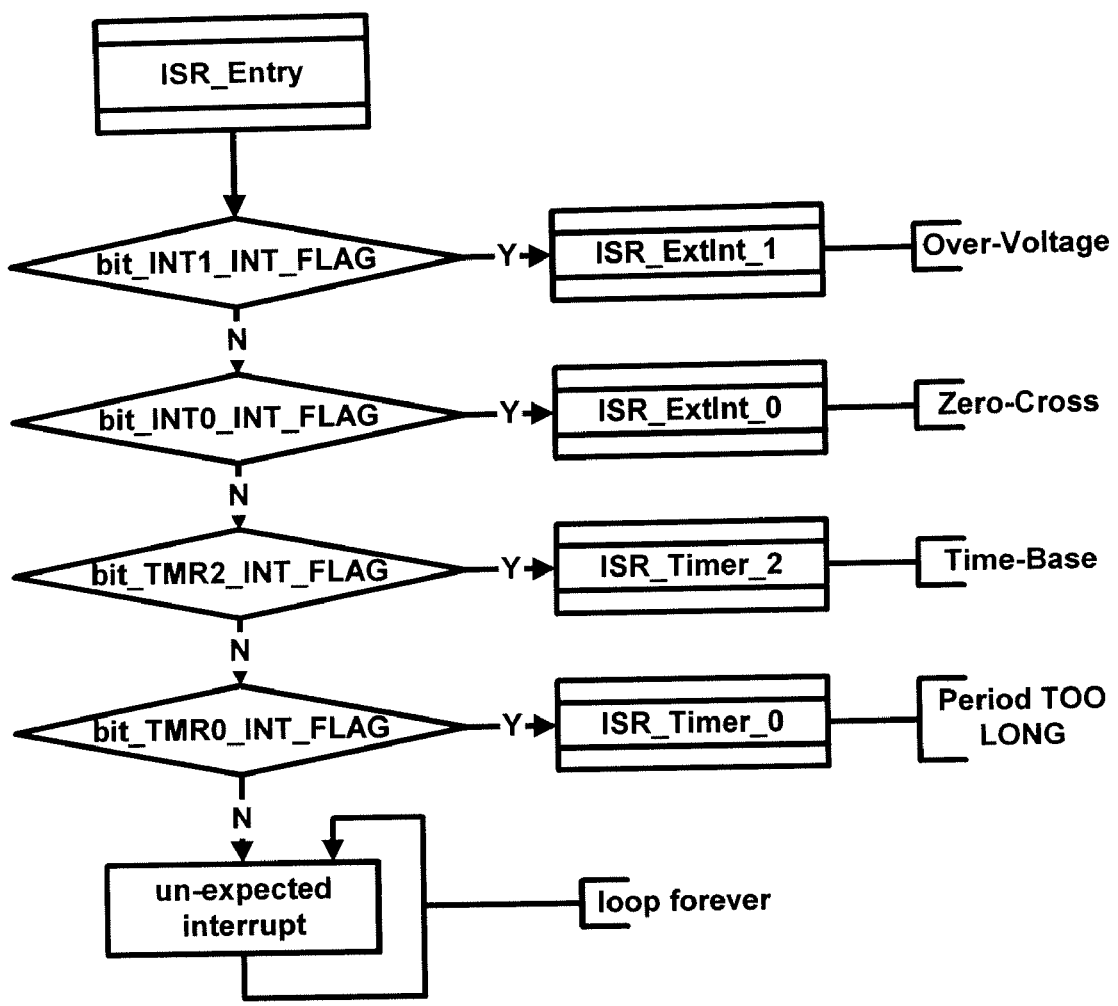
FIGS. 12A-12Z, and FIGS. 12AA-12AG (collectively referred to as FIG. 12) are schematic flowcharts of a microcontroller program for effecting operation of the controller of FIG. 2A.
Figure 12B:
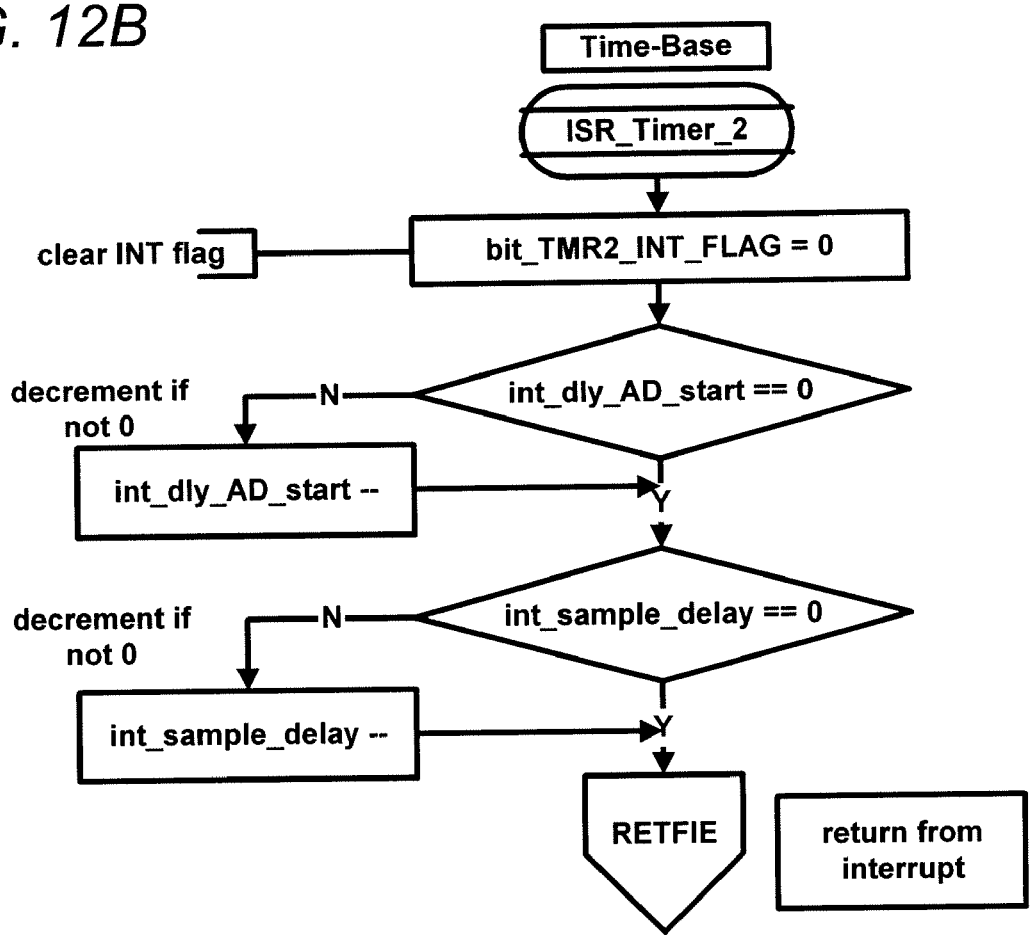
Figure 12C:
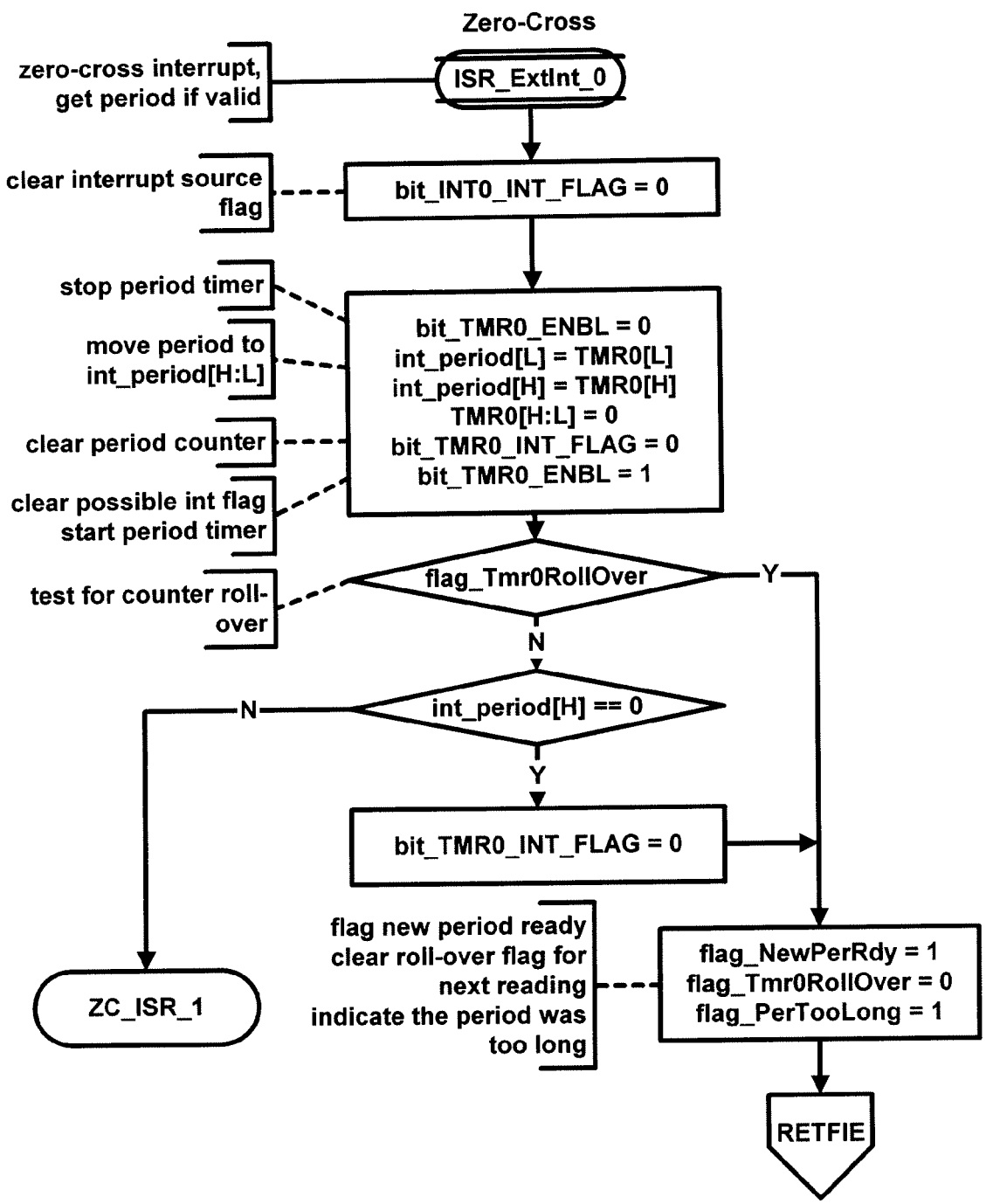
Figure 12D:
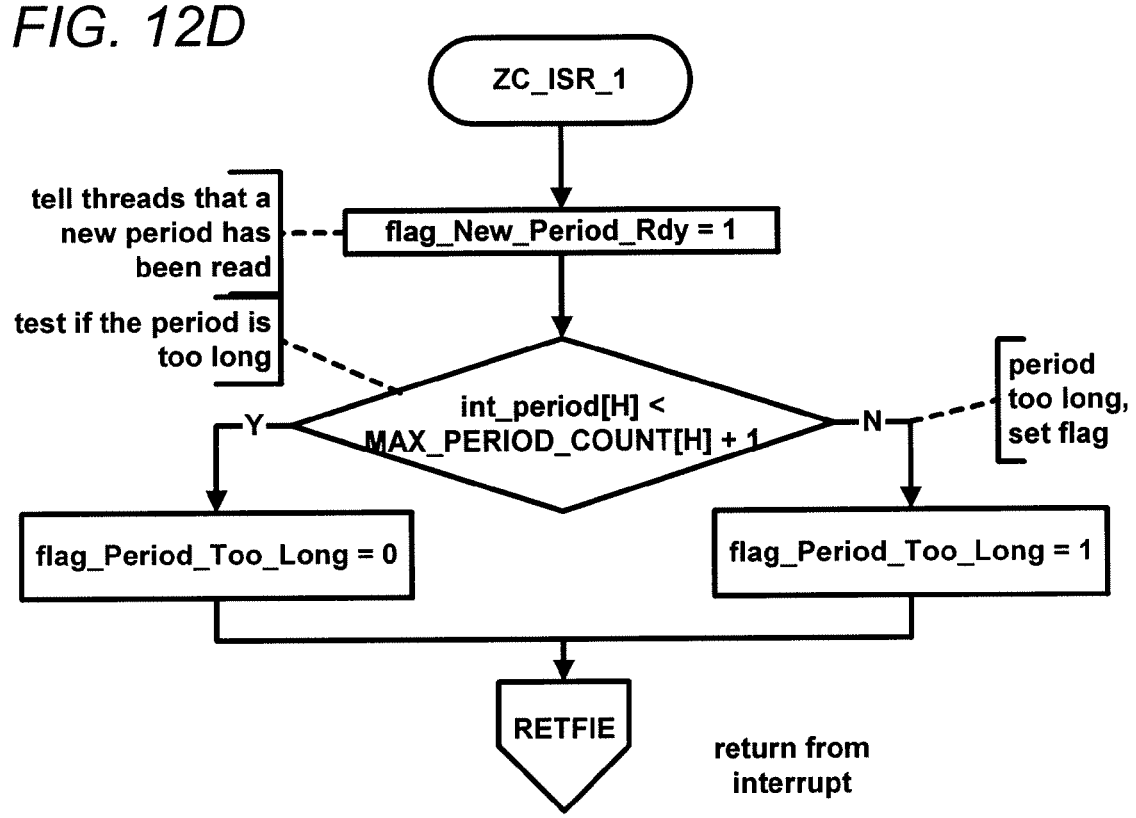
Figure 12E:
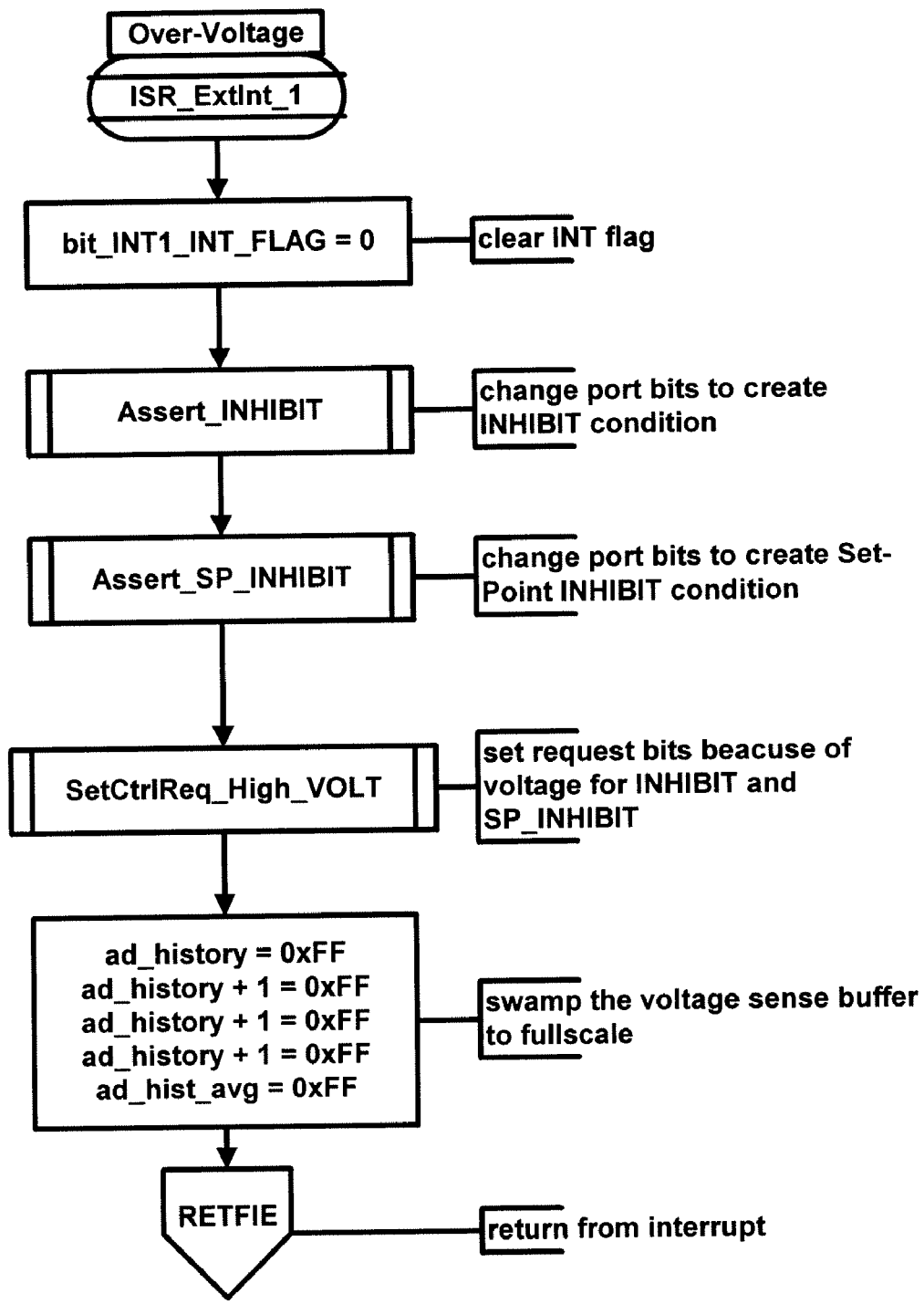
Figure 12F:
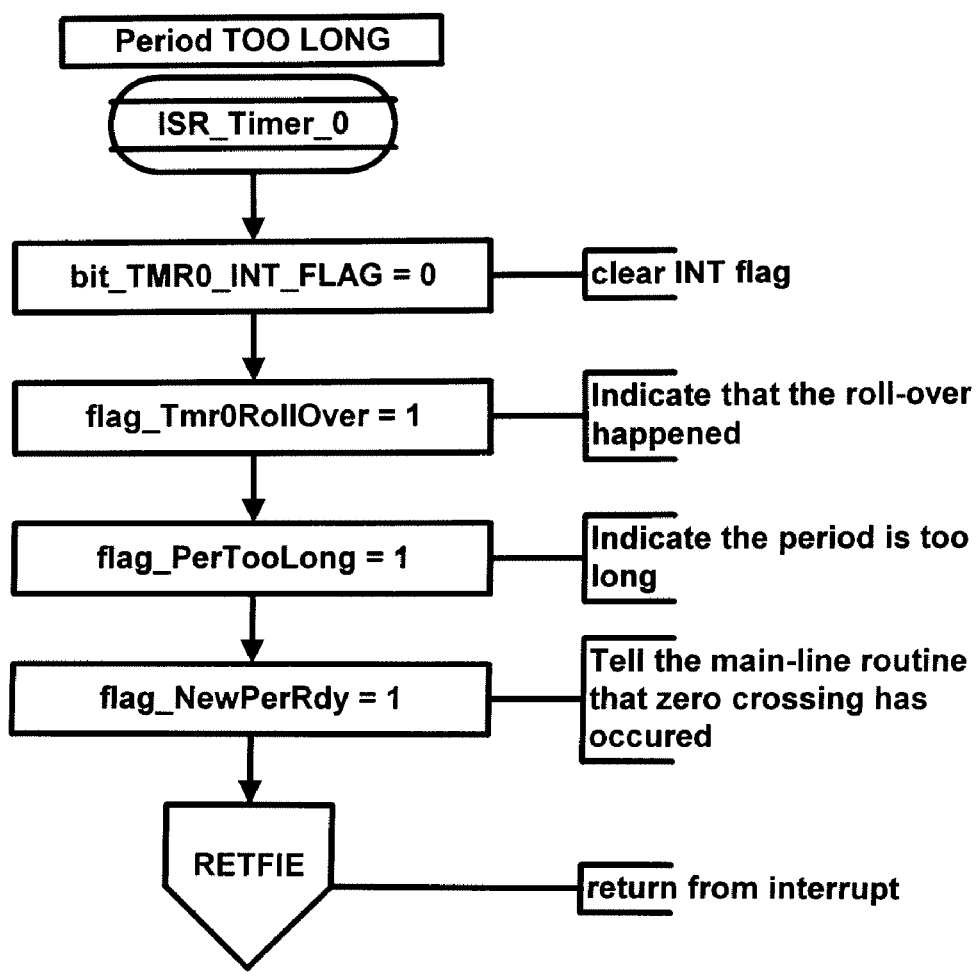
Figure 12G:
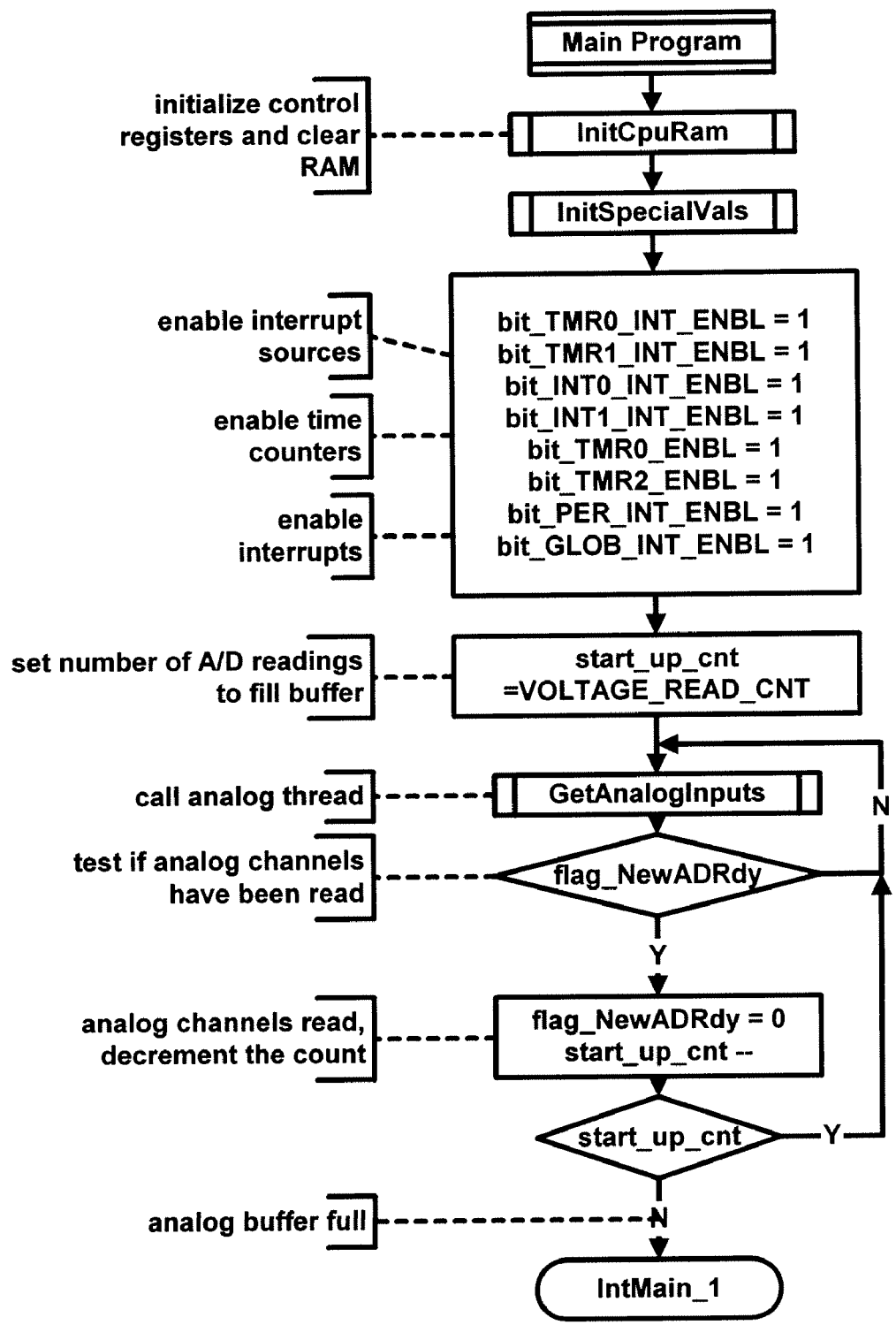
Figure 12H:
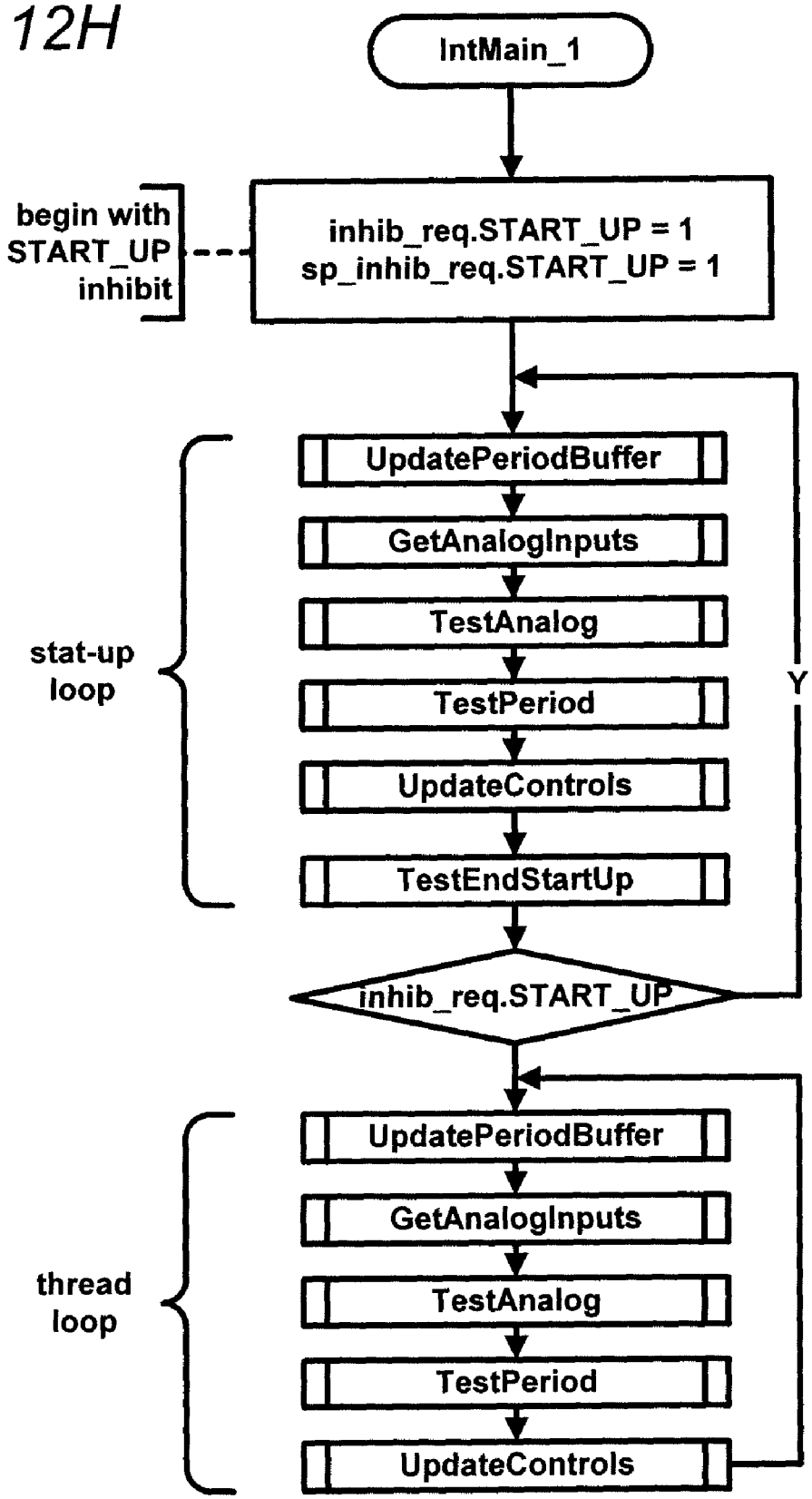
Figure 12I:
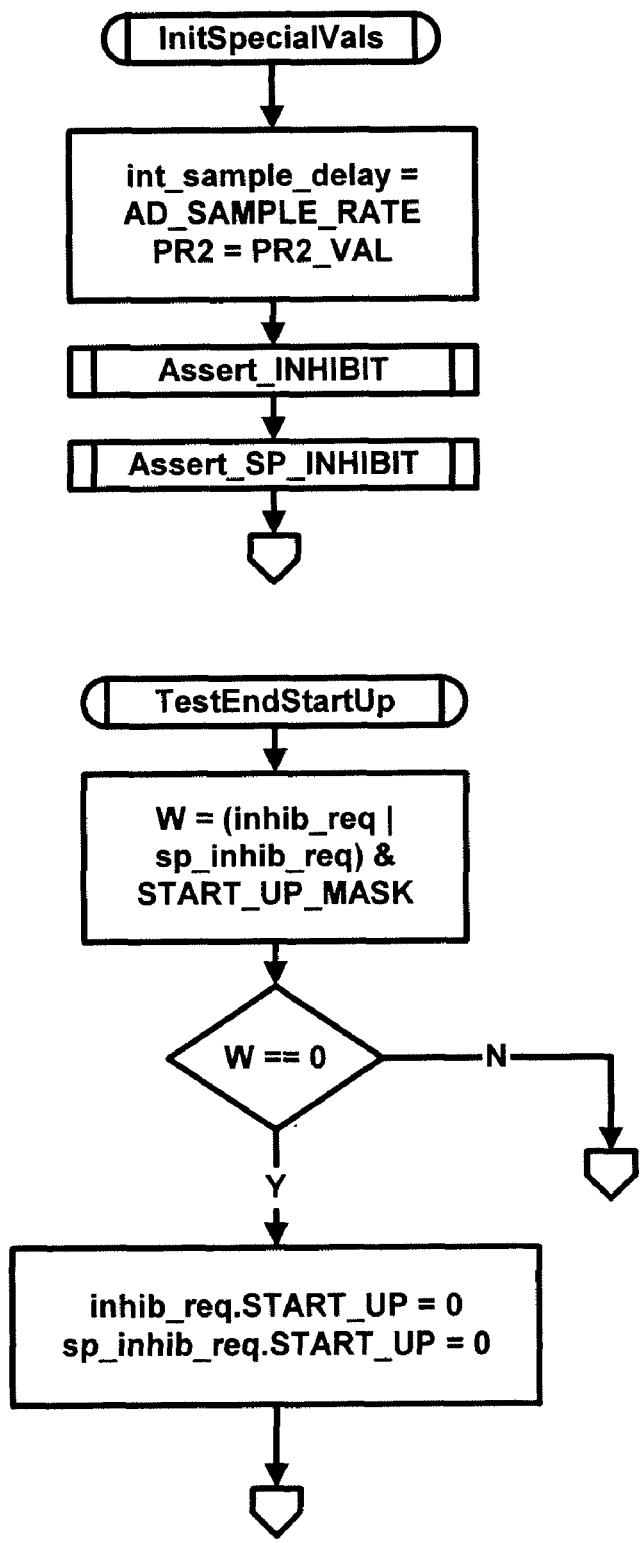
Figure 12J:
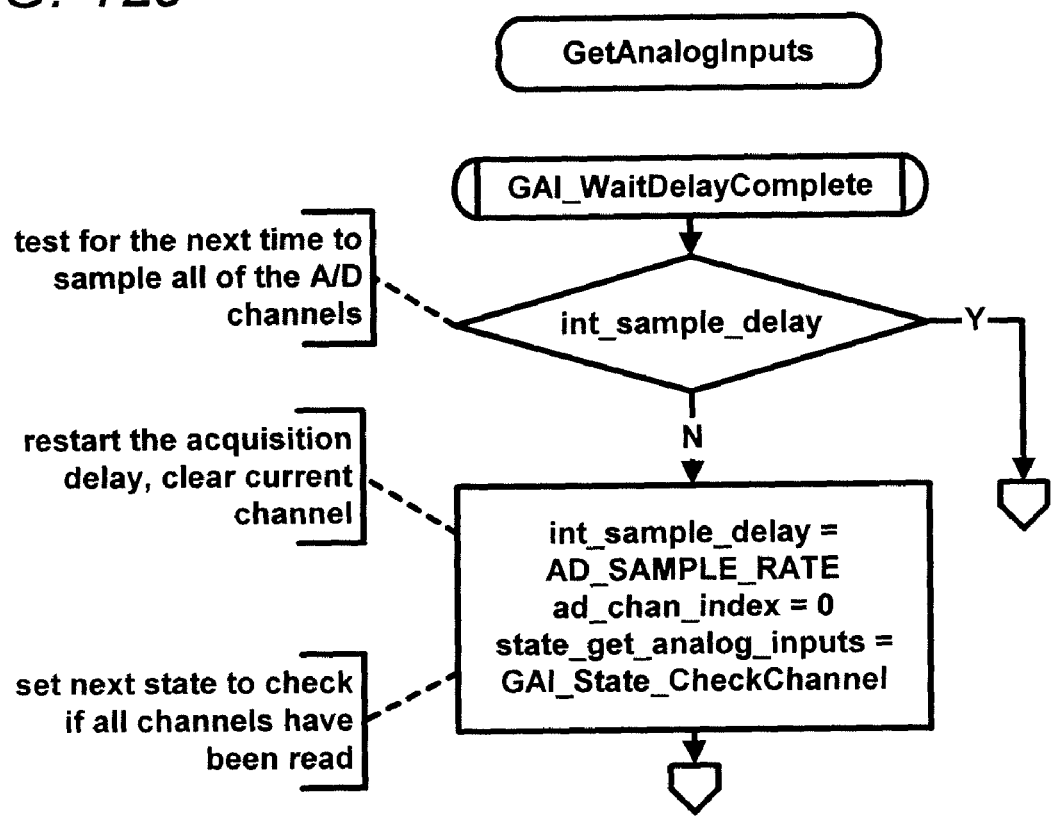
Figure 12K:
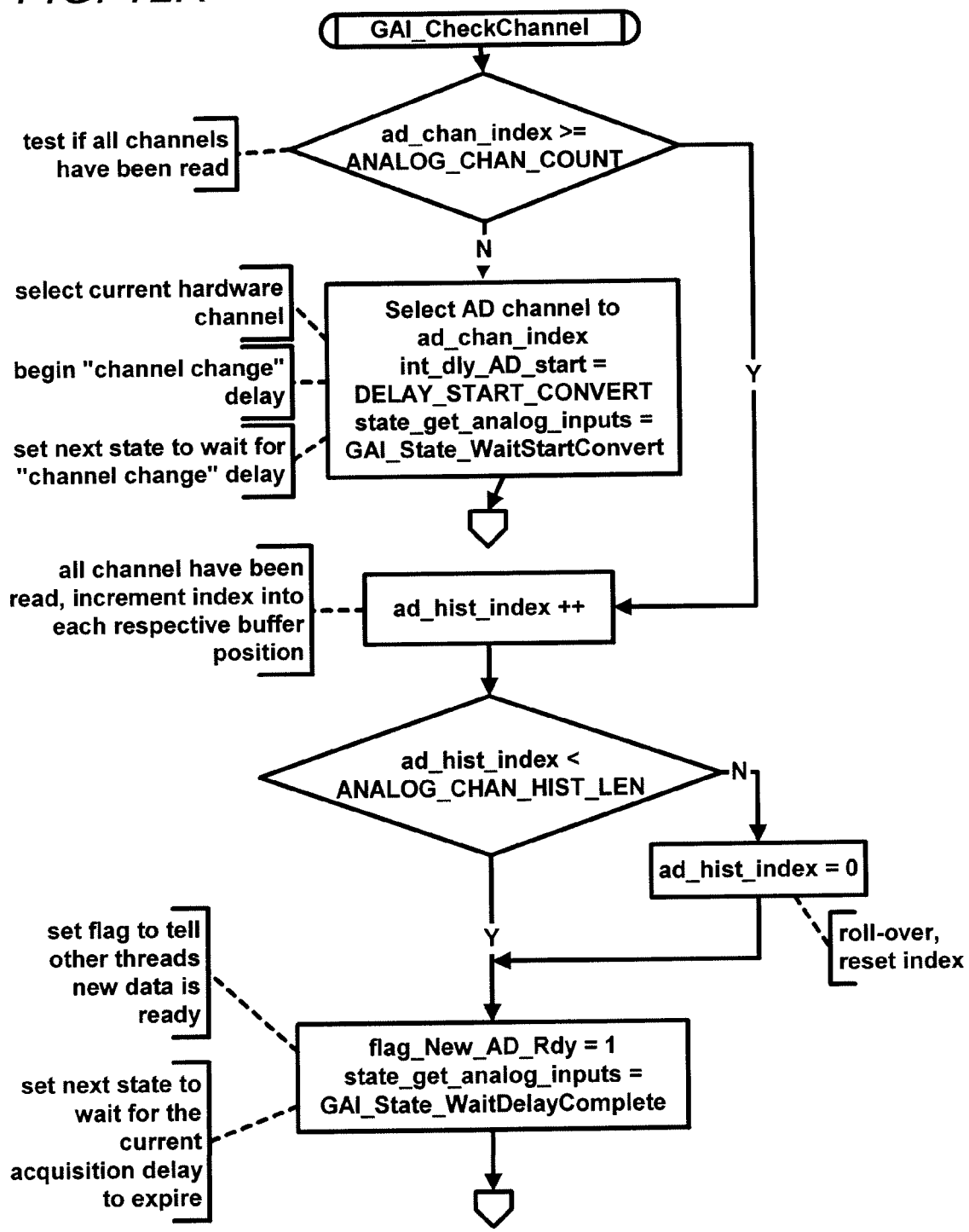
Figure 12L:
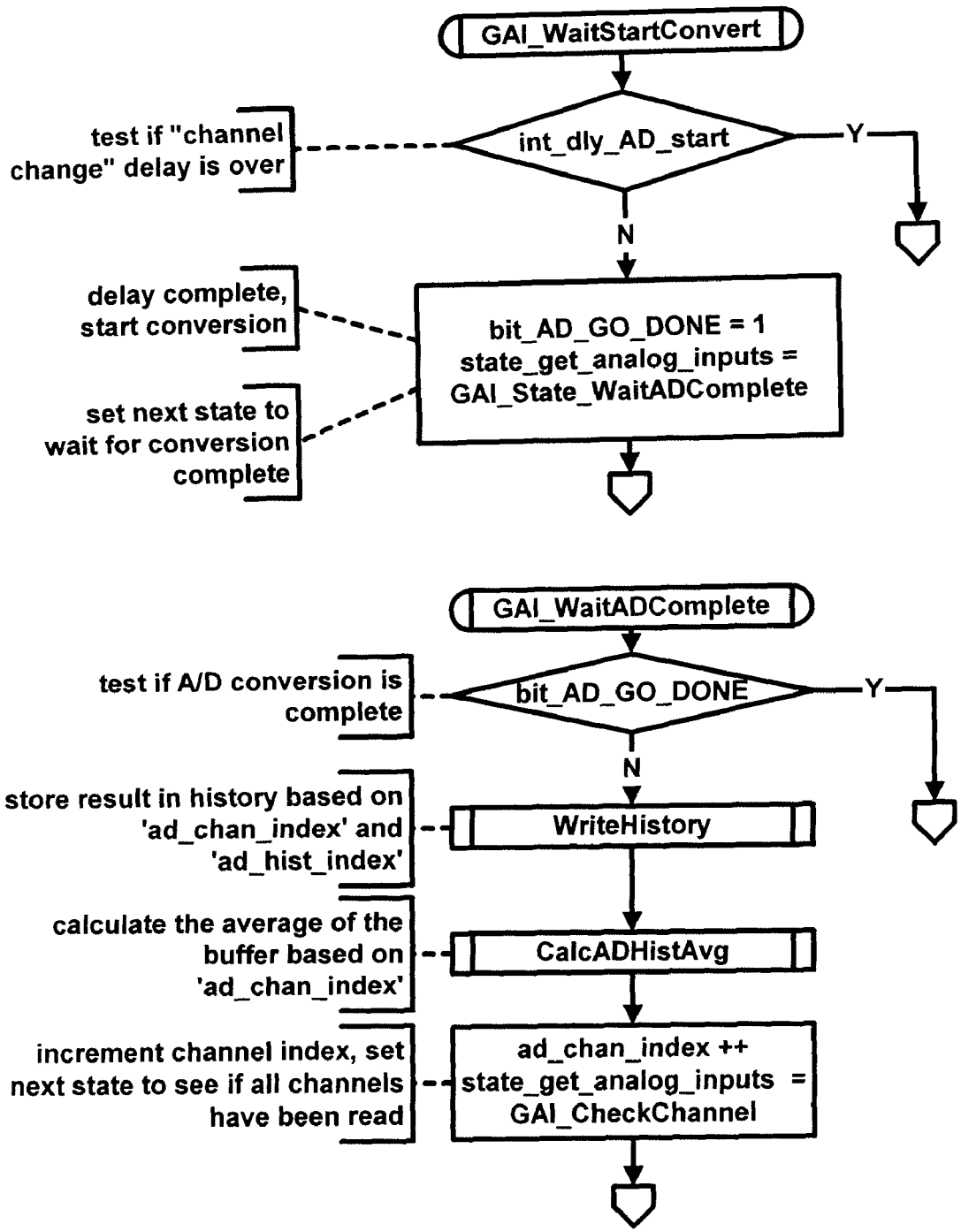
Figure 12M:
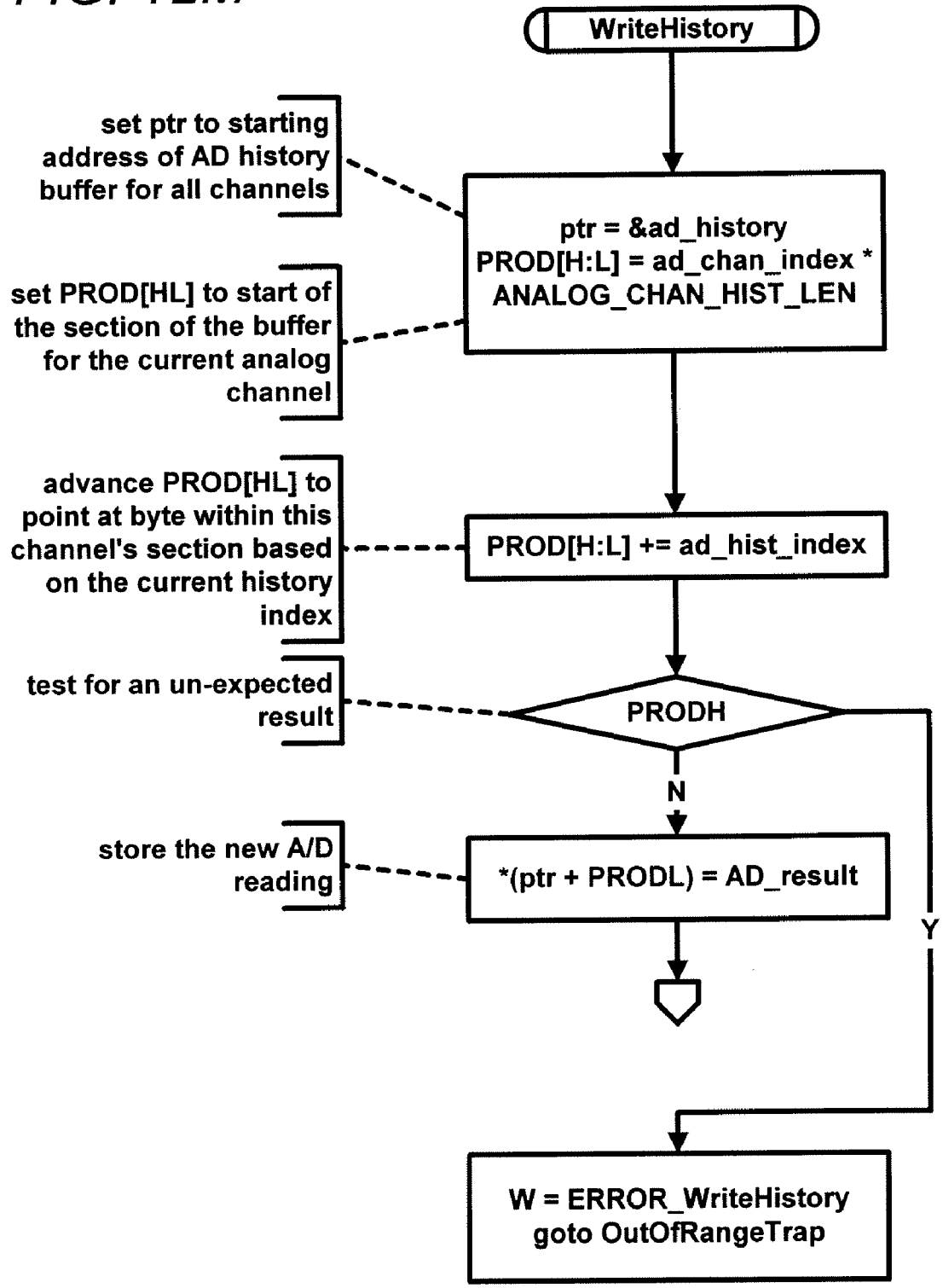
Figure 12N:
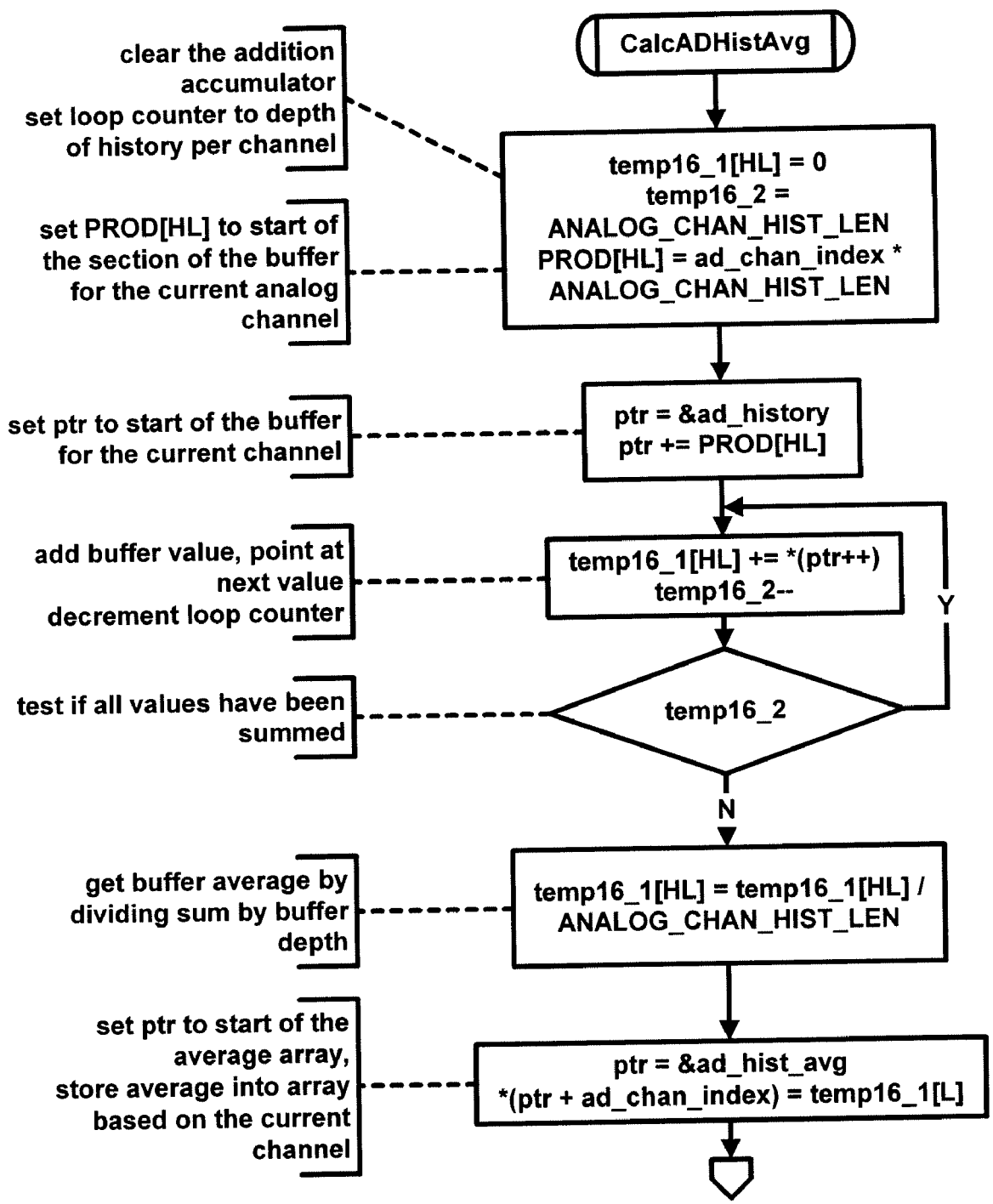
Figure 12O:
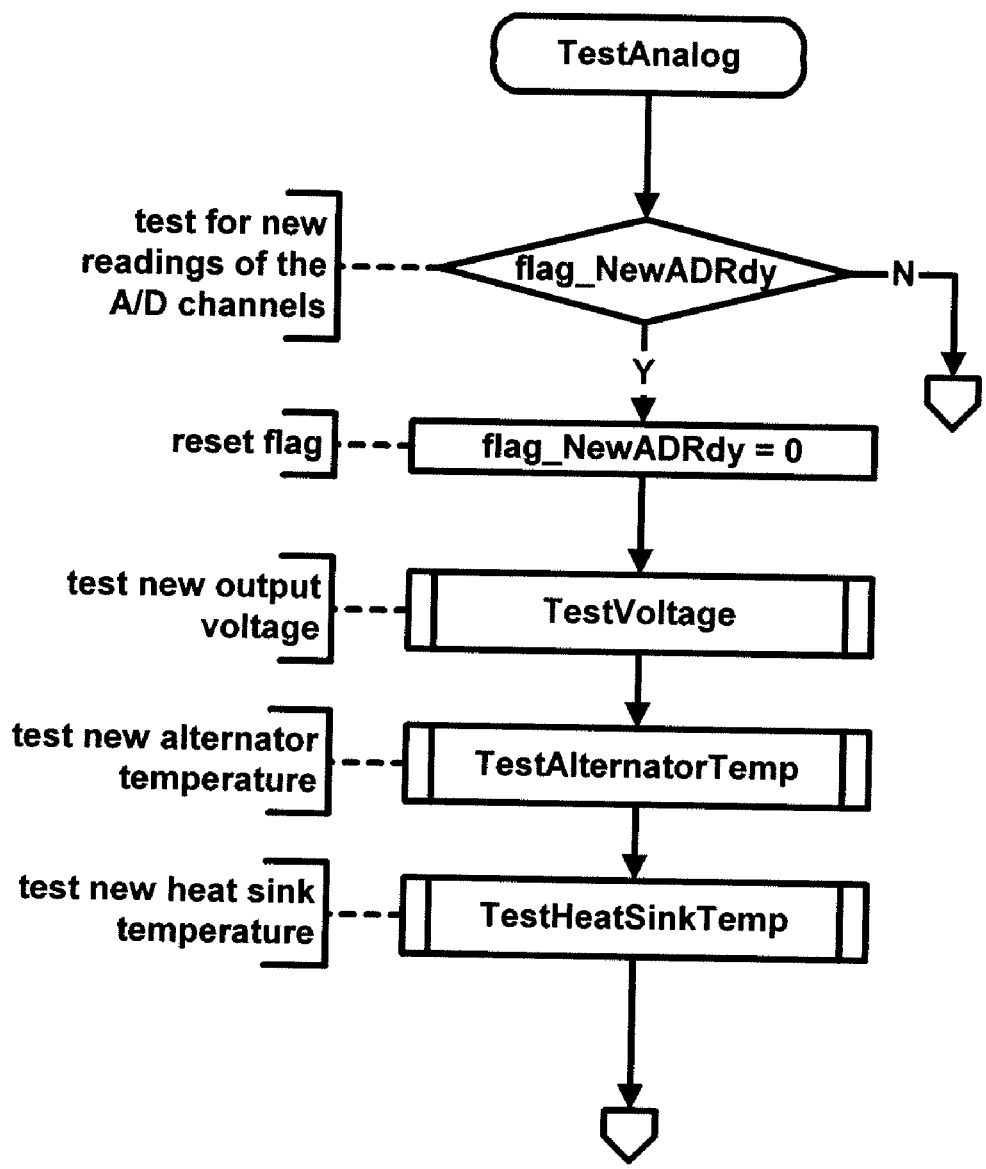
Figure 12P:
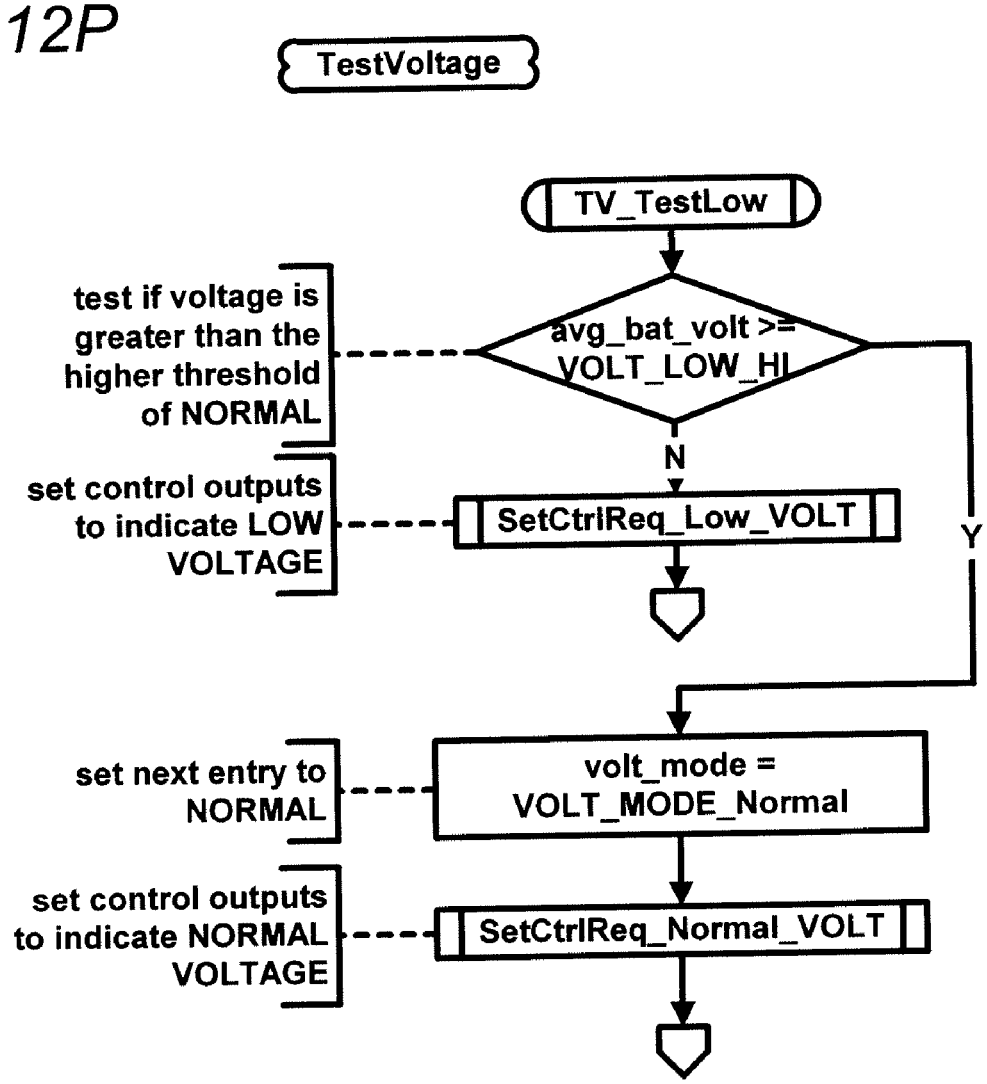
Figure 12Q:
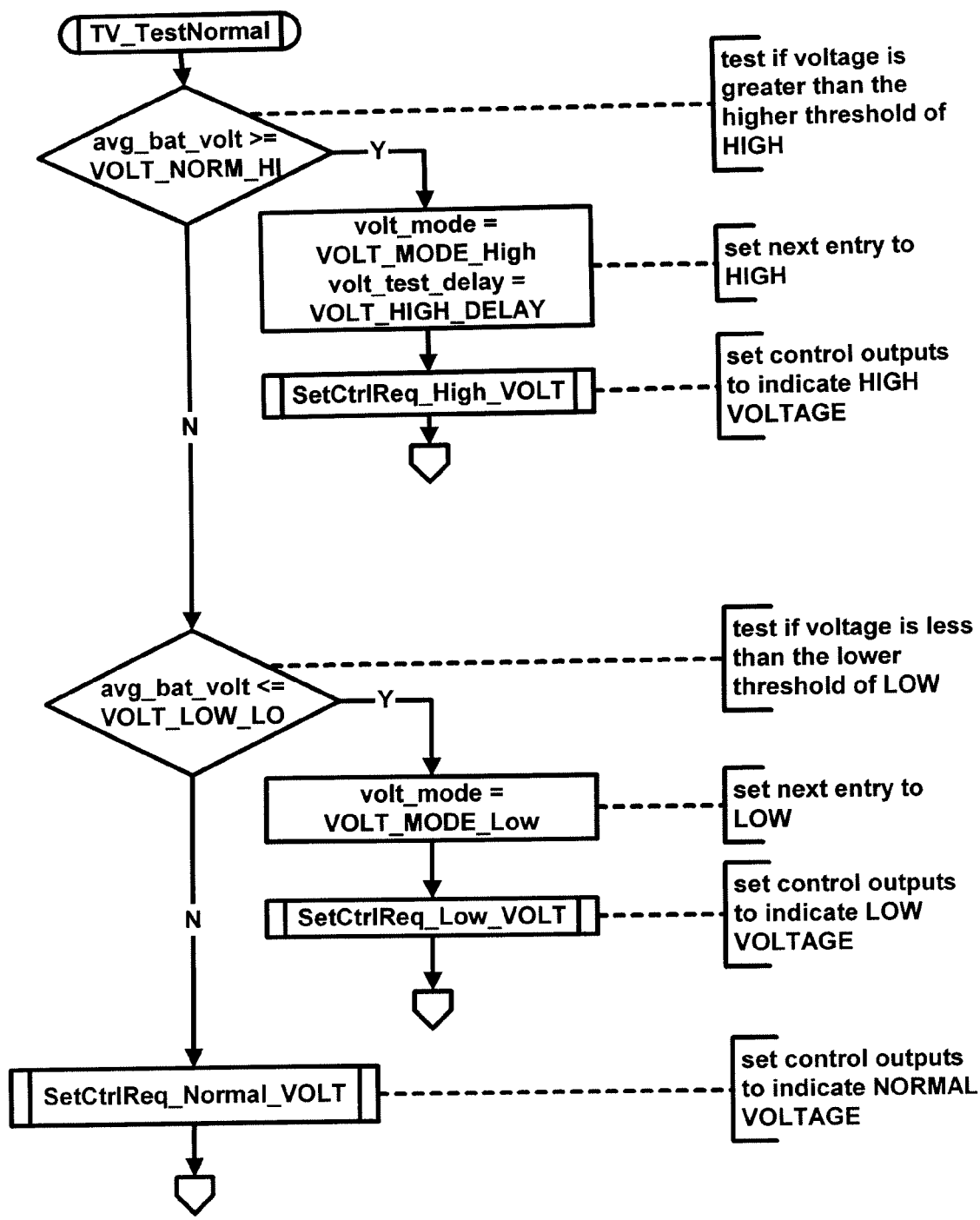
Figure 12R:
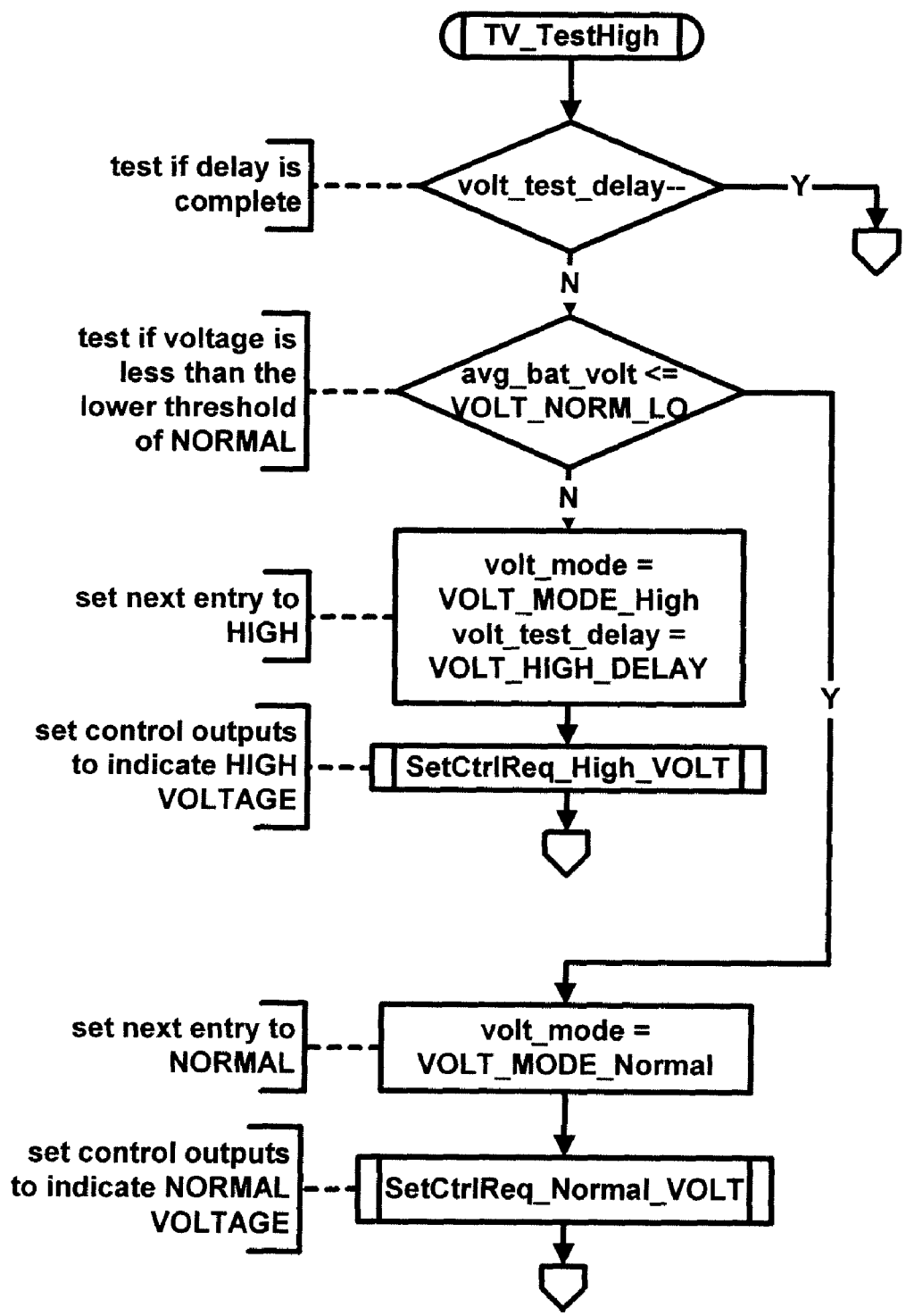
Figure 12S:
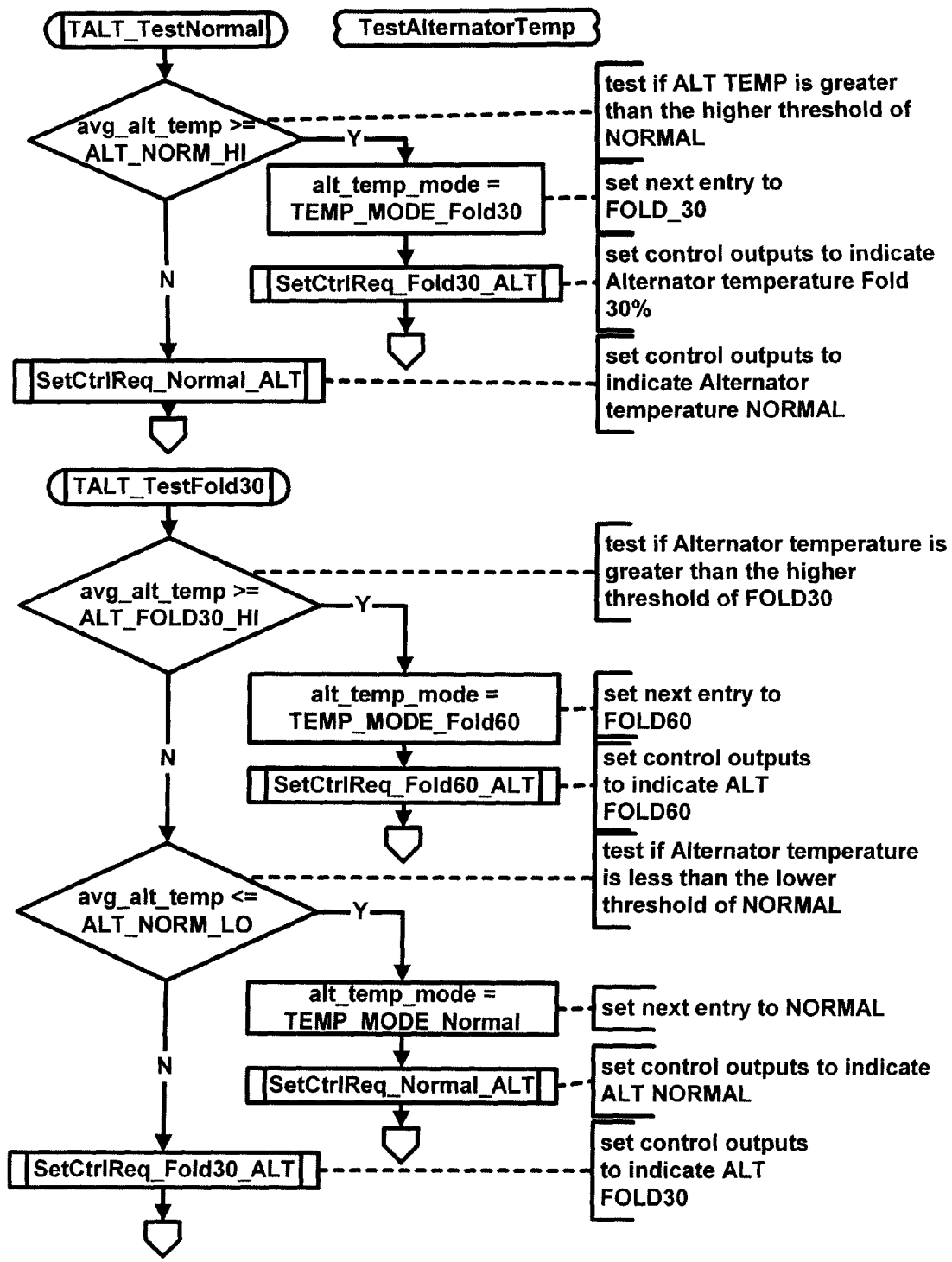
Figure 12T:
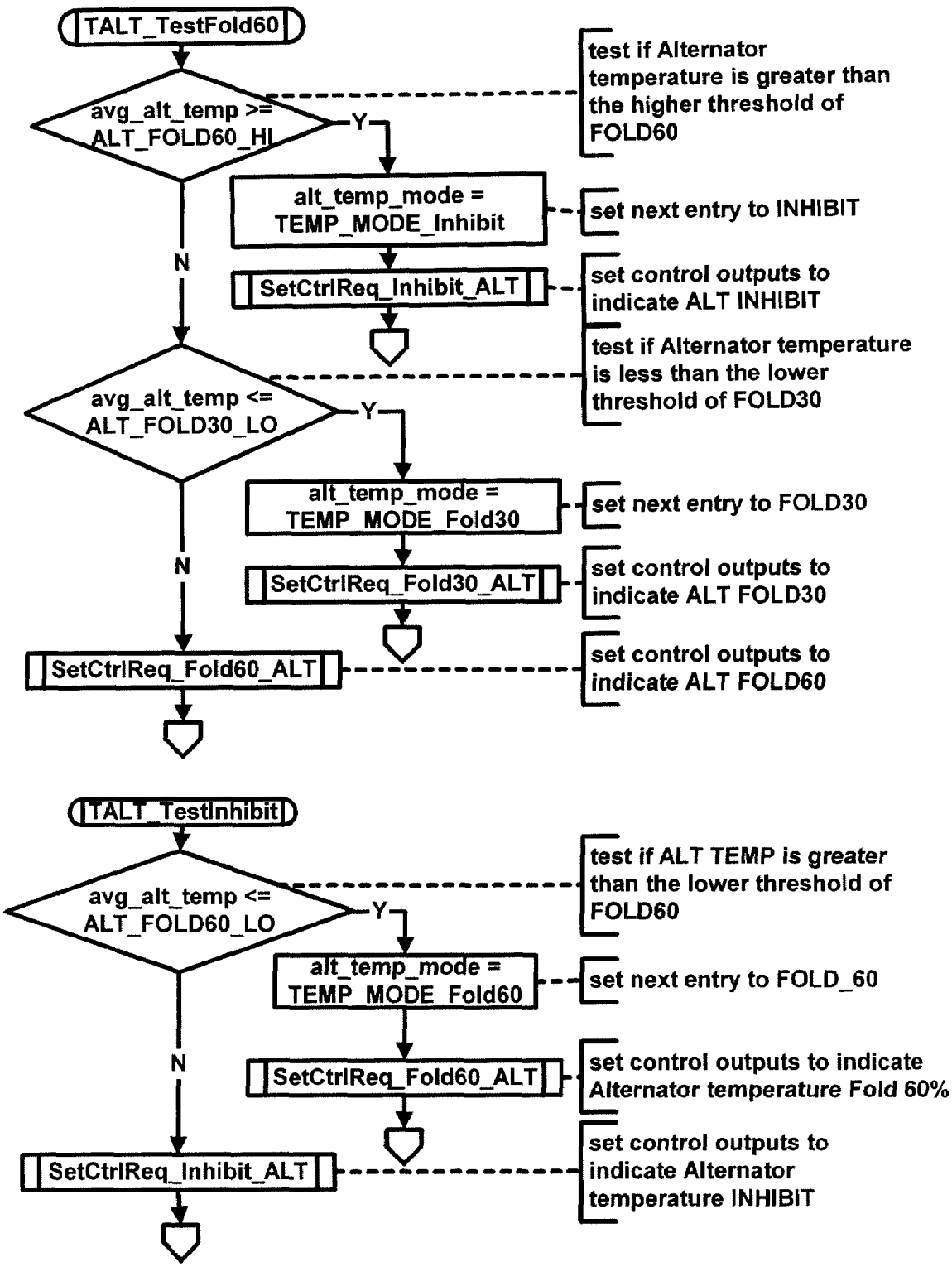
Figure 12U:
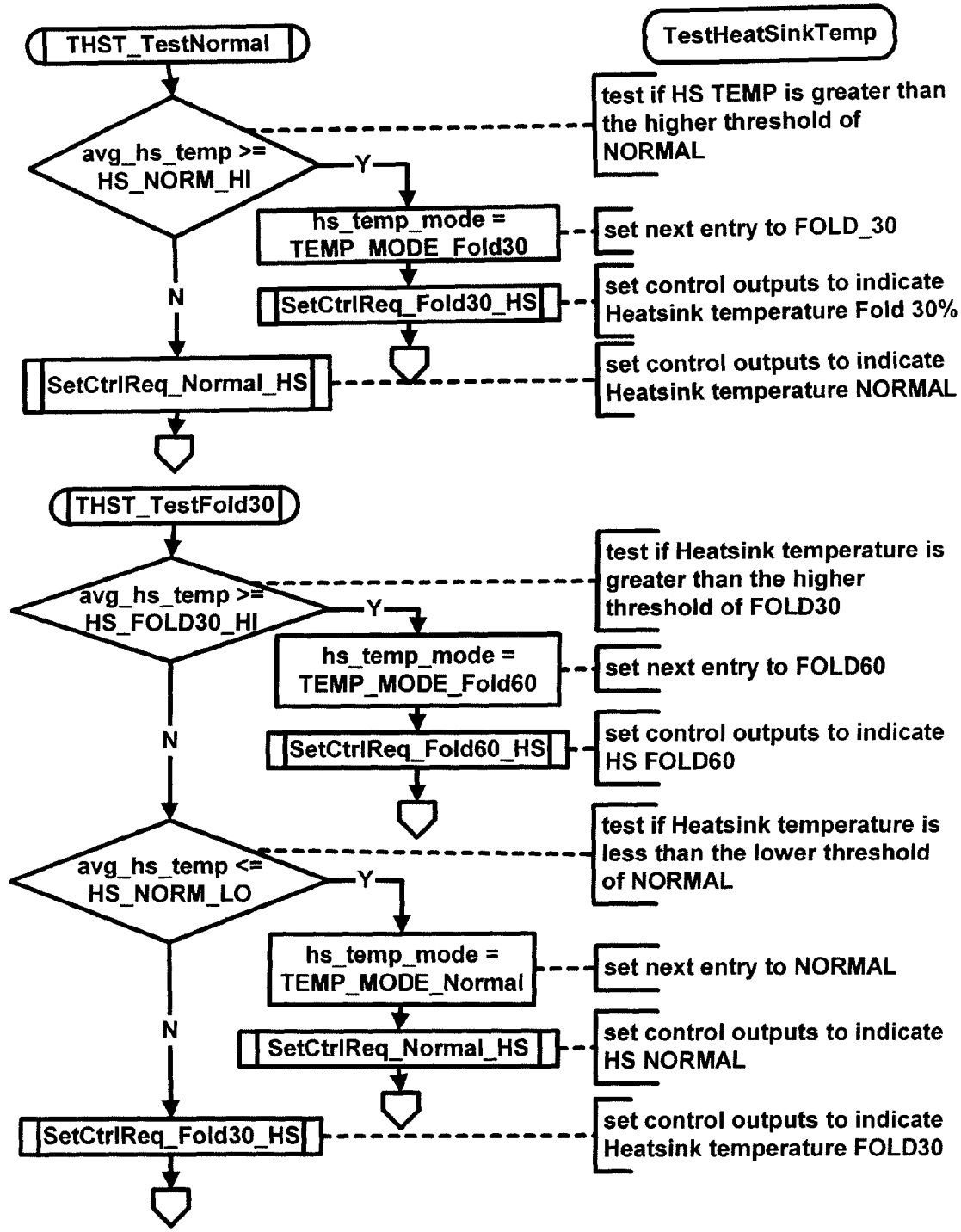
Figure 12V:
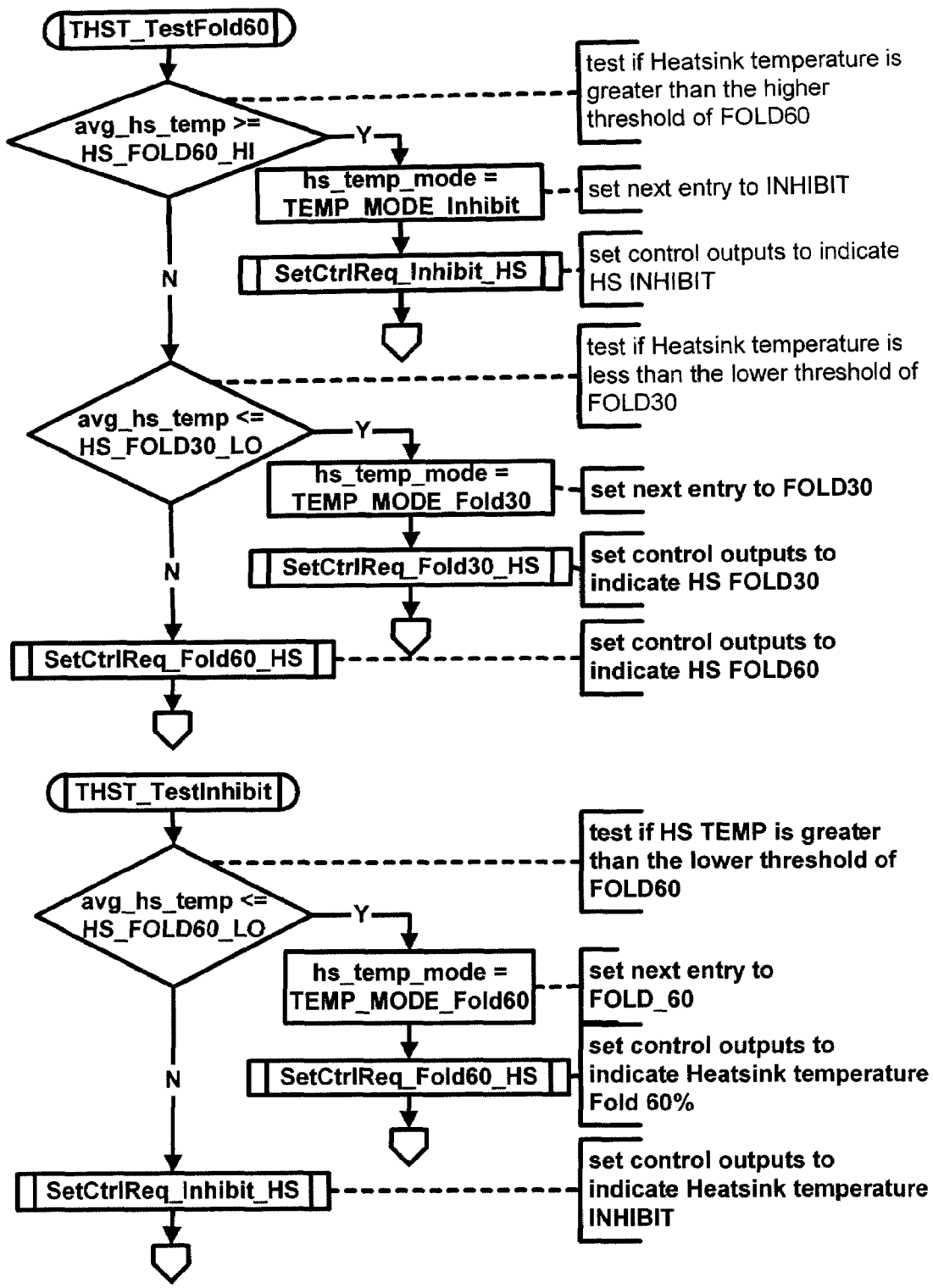
Figure 12W:
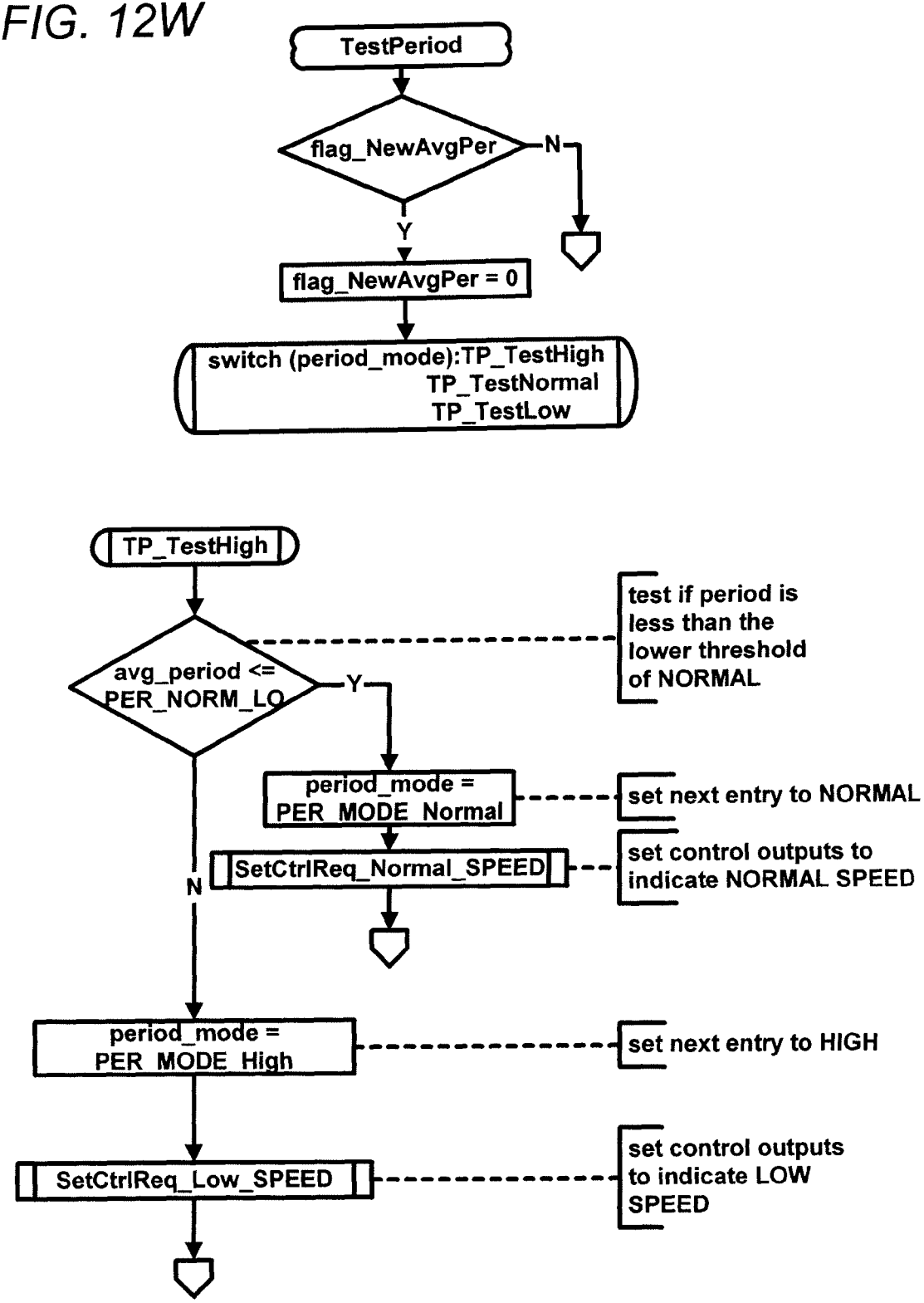
Figure 12X:
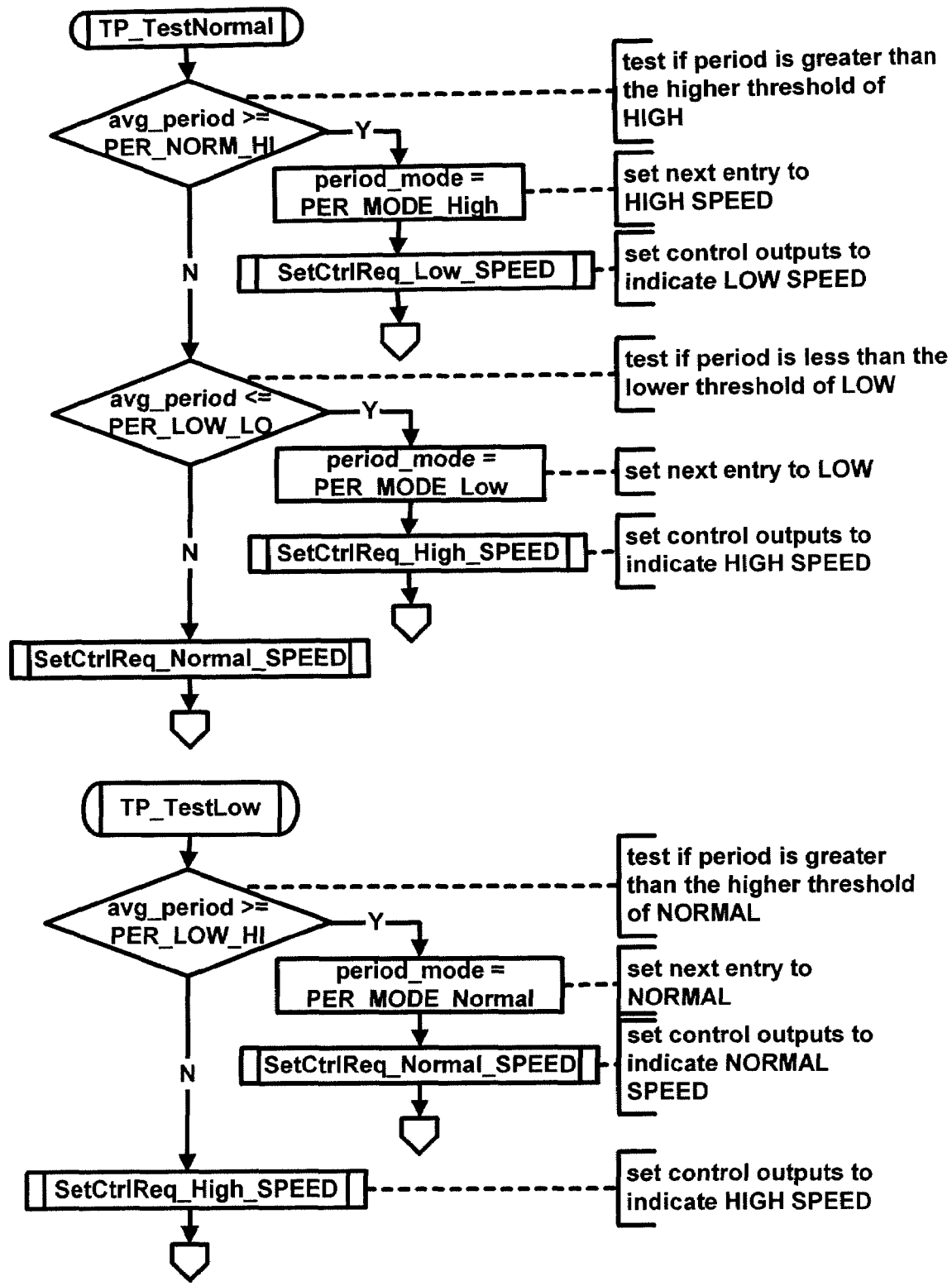
Figure 12Y:
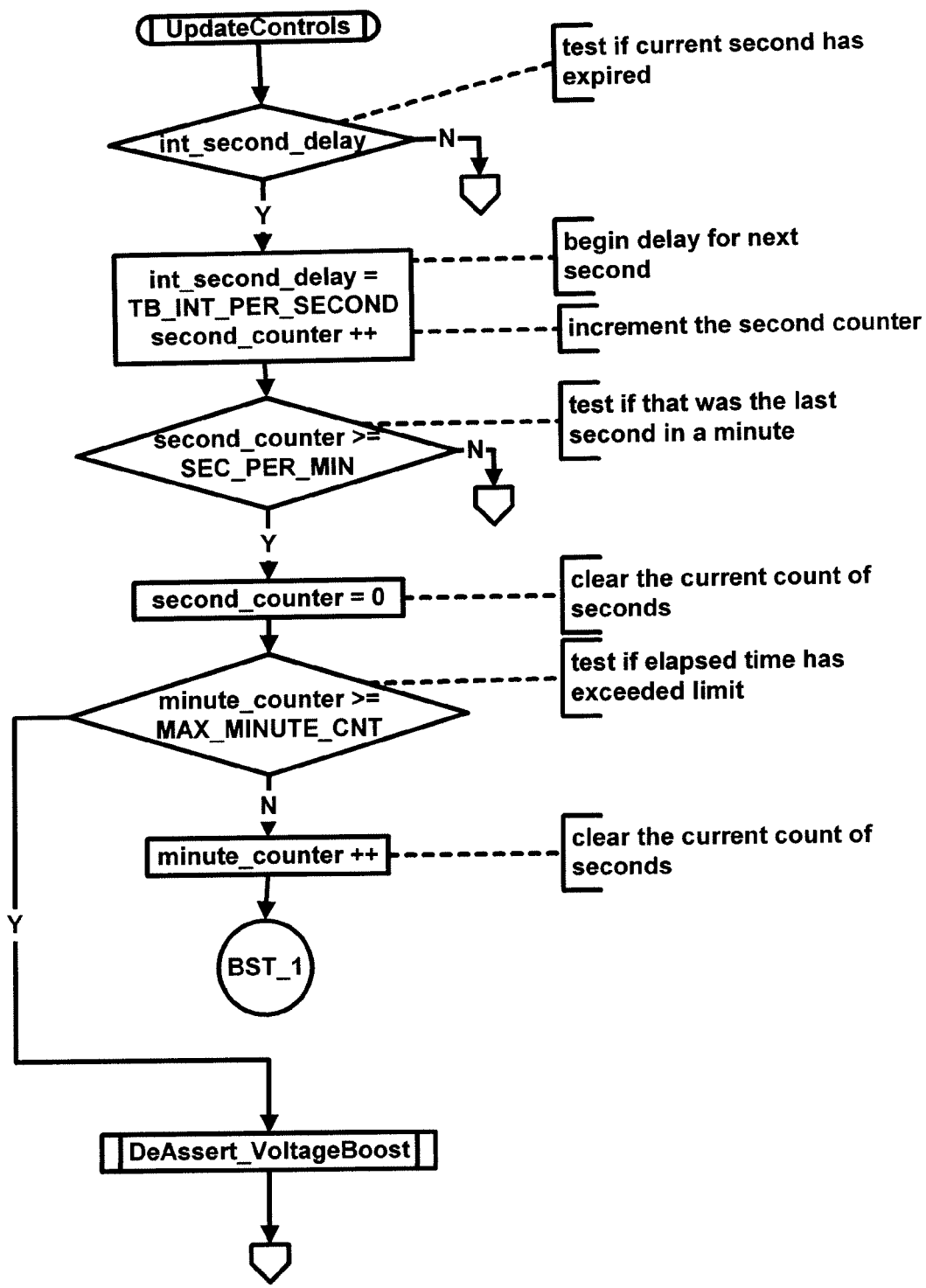
Figure 12Z:
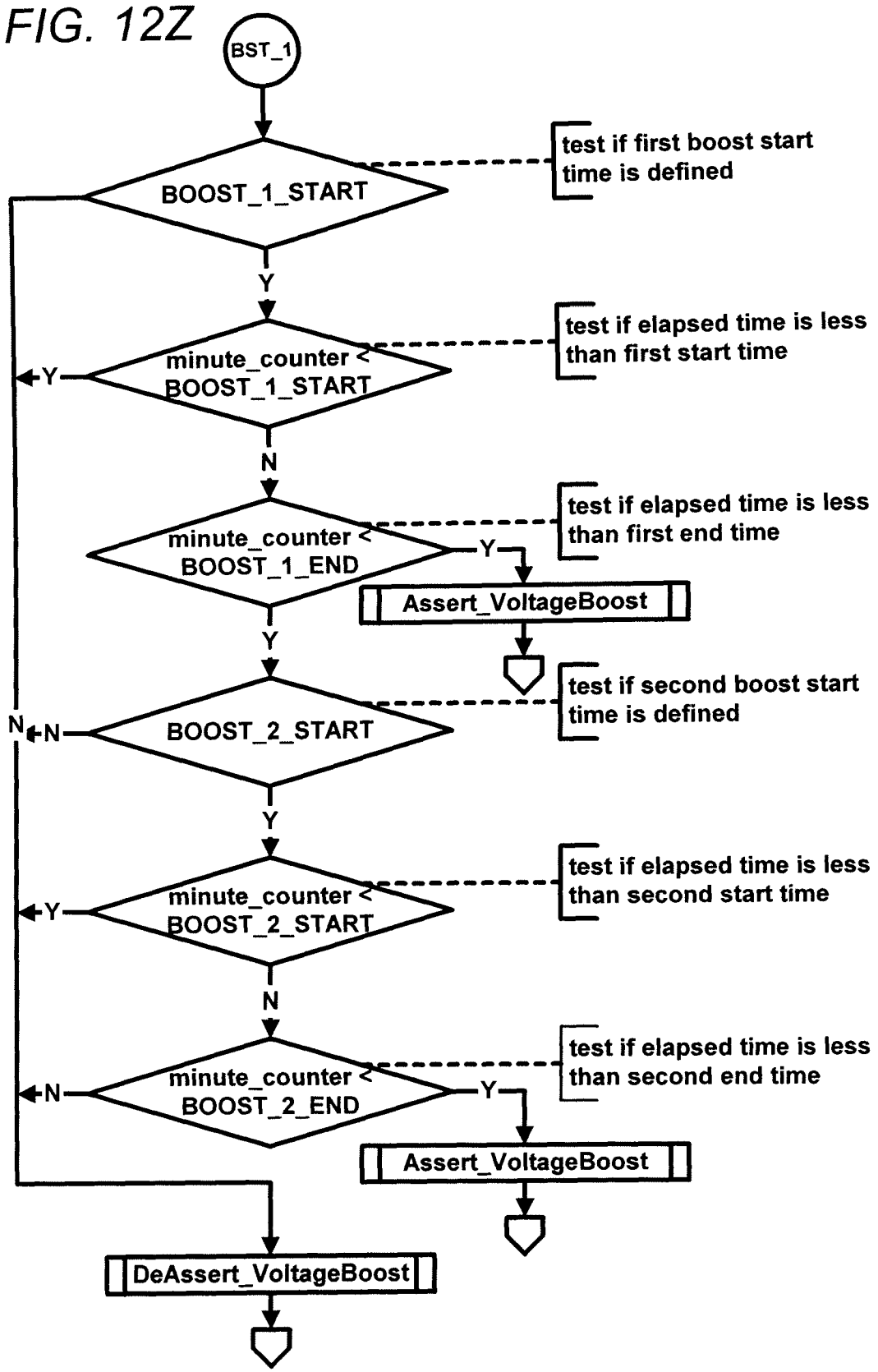
Figure 12A:
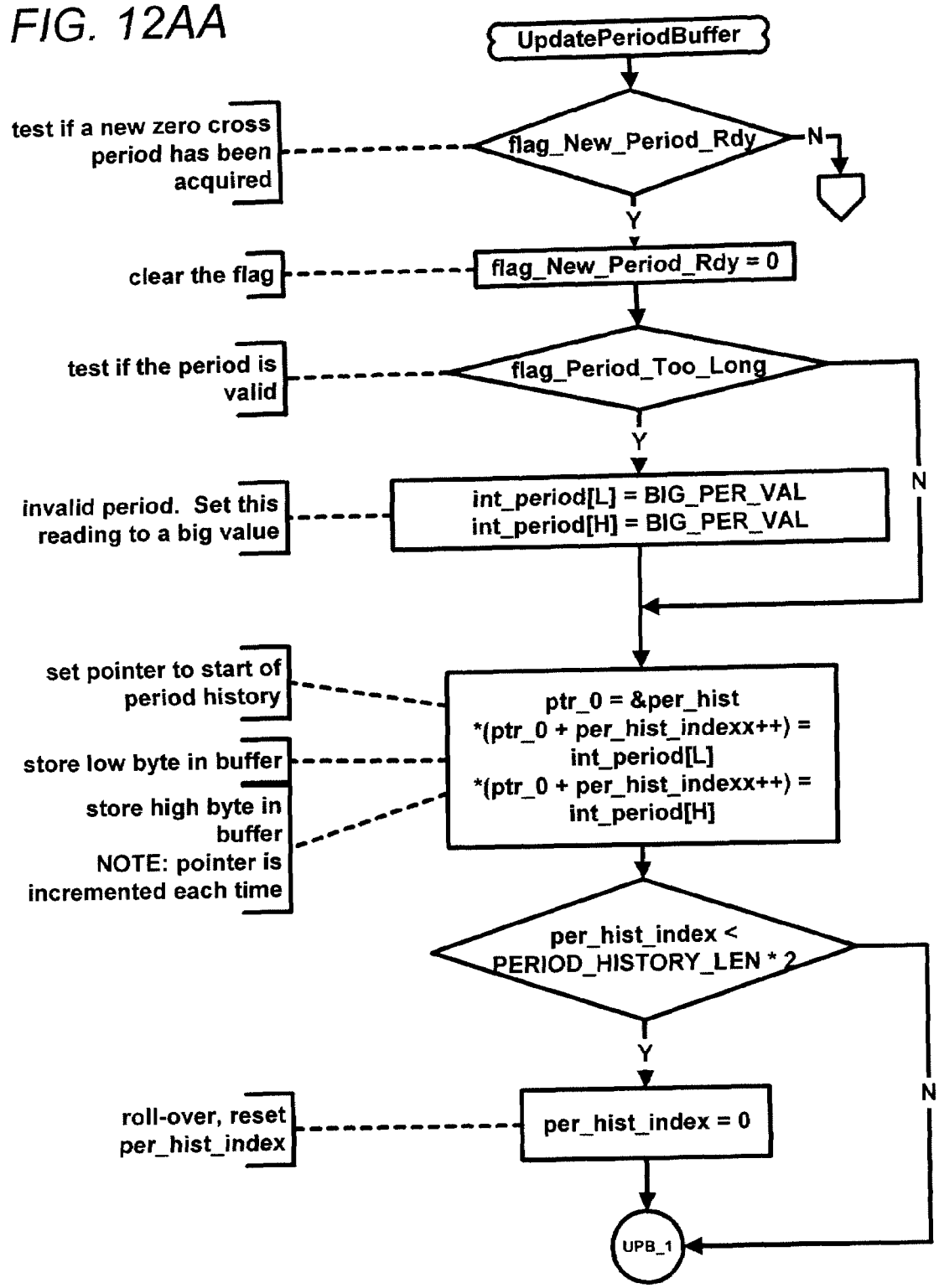
Figure 12A:
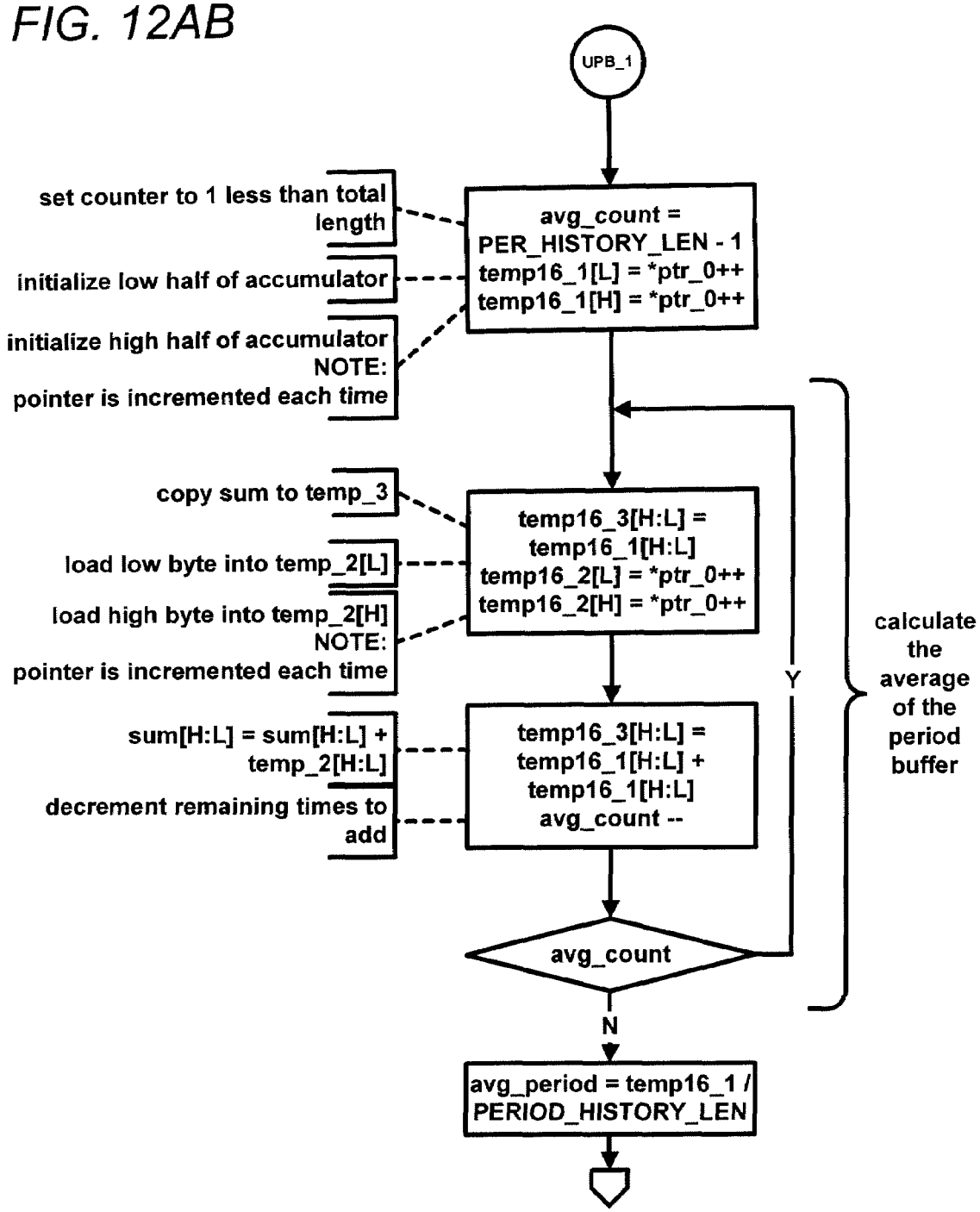
Figure 12A:
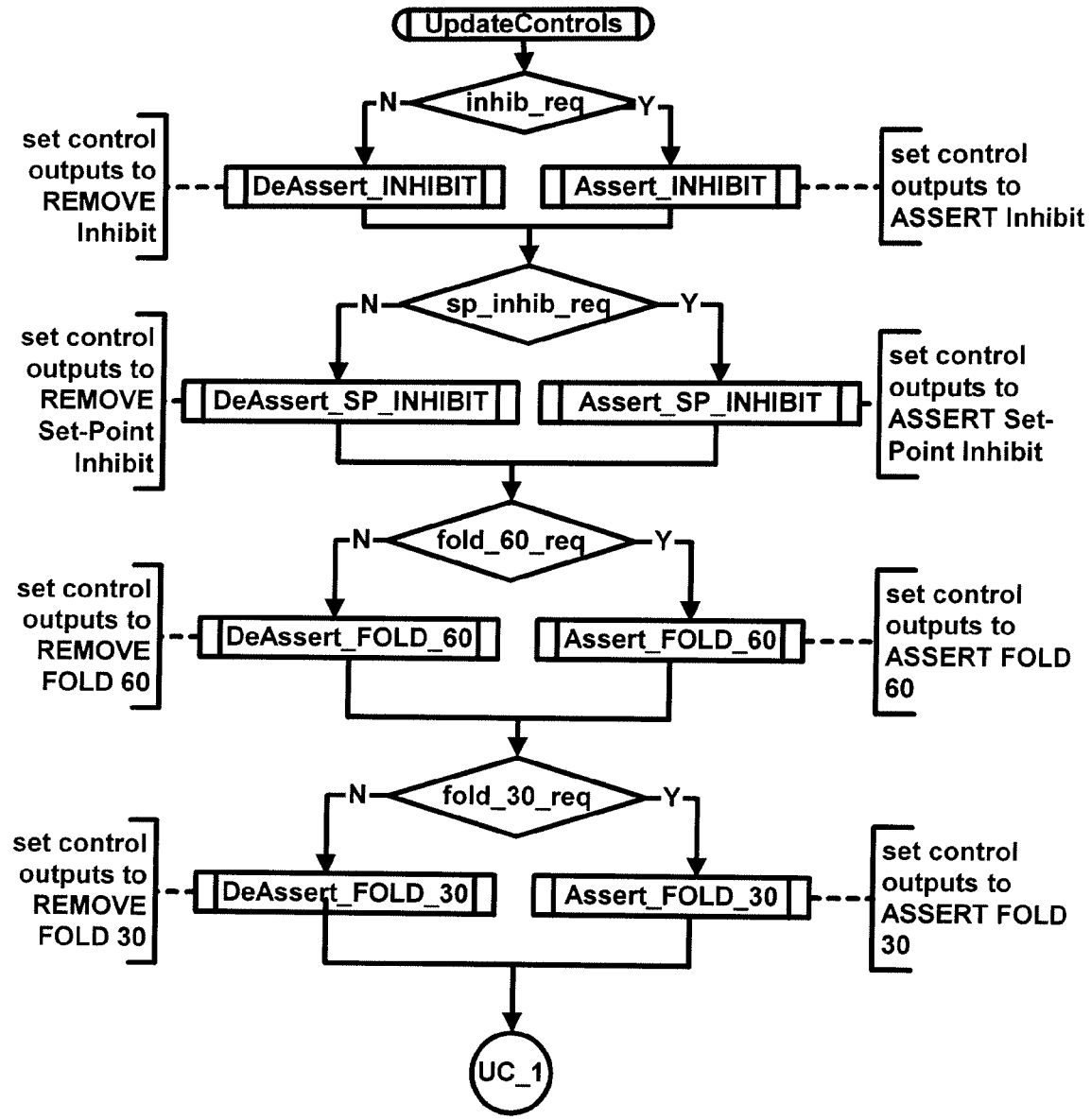
Figure 12A:
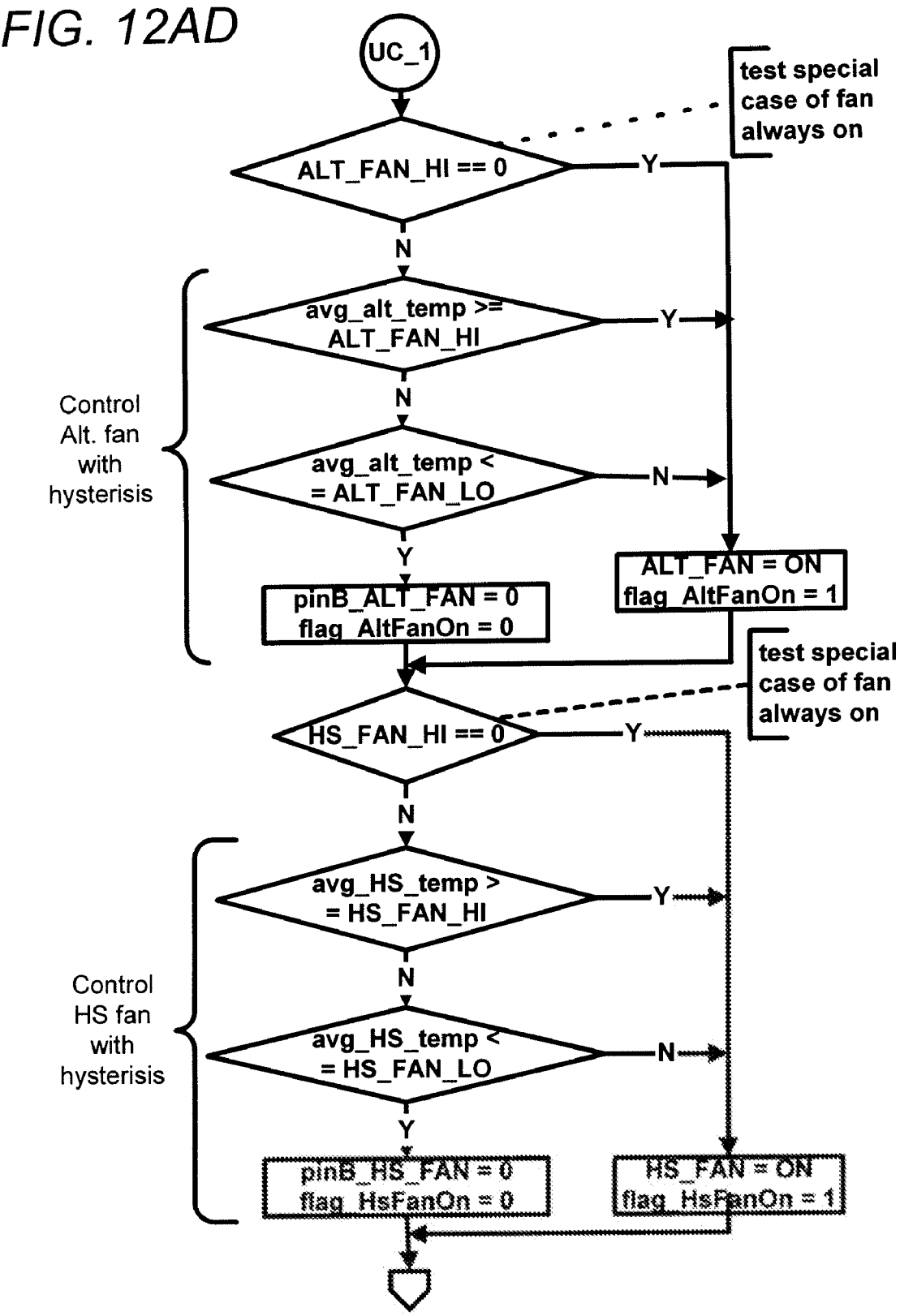
Figure 12A:
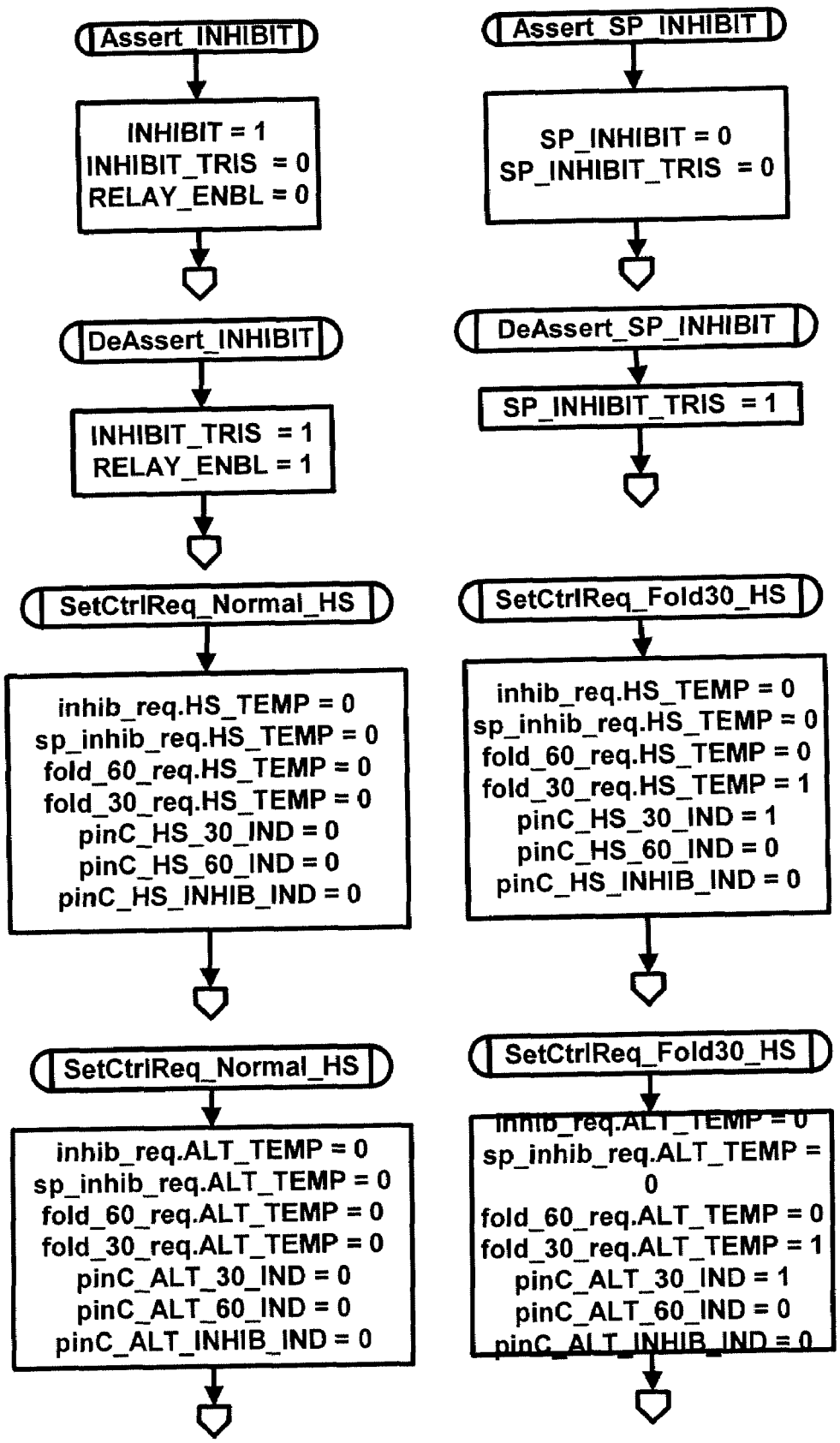
Figure 12A:
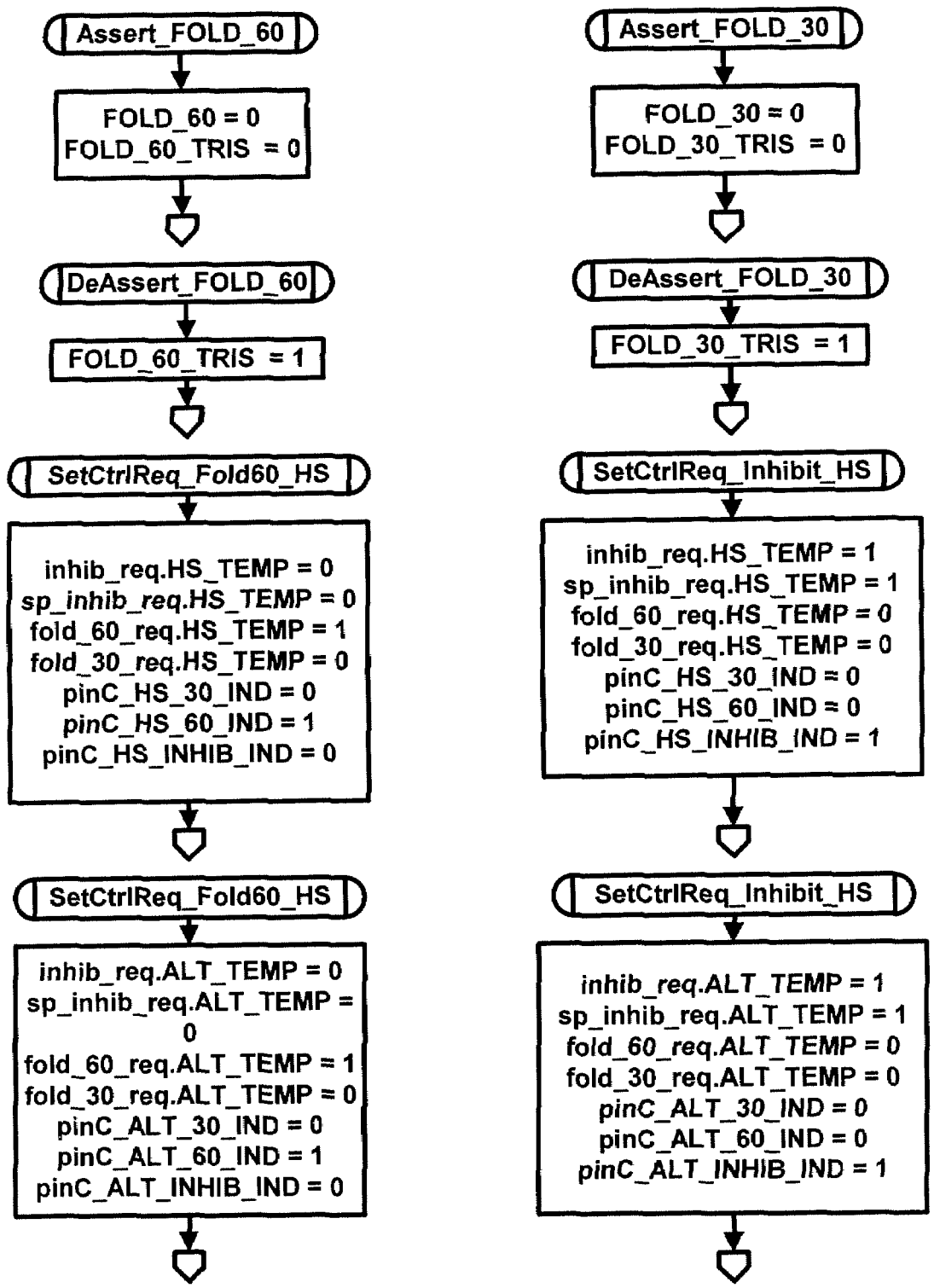
Figure 12A:
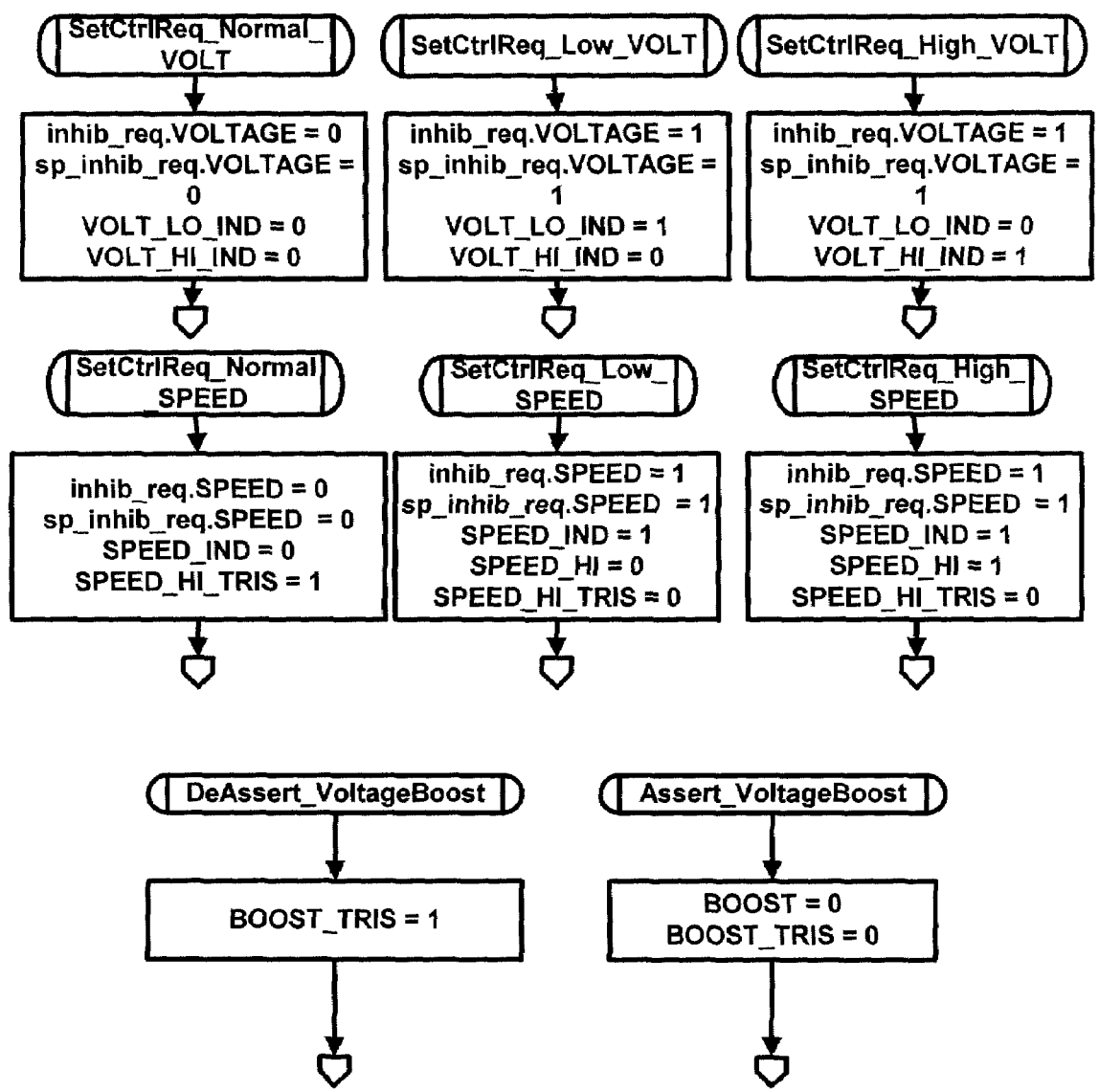

A flowchart of the program executed by microcontroller 248 is provided in FIGS. 12A -12AG. In general, the program is composed of interrupt initiated and time sequenced threads and routines, as follows:

Interrupts

ISR_ExtInt_1: OVER-VOLTAGE

This interrupt is the response to detection of an over-voltage condition by over voltage detect circuit 258 (FIG. 9B) as indicated by signal OVER_VOLT. This is an error condition and all inhibits are asserted e.g. microcontroller 248 produces the INHIBIT signal.

ISR_ExtInt_0: ZERO-CROSS

This interrupt is the response to a zero-cross of the alternator phase input going through zero volts. A signal indicative of the zero-cross is suitably applied to the microcontroller, (ZC_SIG, FIG. 4). The period of the zero-cross is monitored to indicate engine speed.

ISR_Timer_0: ZERO-CROSS TIMER ROLL-OVER

This interrupt is the response to an internal counter, Timer_0, incremented in accordance with an internal clock and reset upon zero crossings (the zero-cross counter) rolling over. This is an error condition indicating that the speed of the engine is too low.

ISR_Timer_2: TIME-BASE

This interrupt is the response to the general system delay. It is a repetitive event that maintains delays within the firmware.

Threads and Routines

UpdatePeriodBuffer

This thread is responsible for buffering each zero-cross period. Each time a new period is read, a flag indicating whether the new value is valid is tested, if set, store a "full-count". The value is stored in the buffer and the average is calculated. A flag is set for the other threads to indicate that the average has been updated.

GetAnalogInputs

This thread is responsible for sampling all of the analog channels. Each channel is acquired through the on-chip Analog-to-Digital converter. The readings are stored in a buffer for each channel. The average of each buffer is calculated for use by other threads. A flag is set for the other threads to indicate that the averages have been updated.

TestAnalog

This routine tests if the analog averages have been updated. If so, a series of bounds checking is performed for the output of switching bridge 112 (rail voltage, VRO), the heatsink temperature and the alternator temperature.

TestVoltage

This routine tests a signal representative of the average rail voltage (VRO) (e.g. V_SENSE FIG. 6) of the system against a series of limits to declare one of the following conditions: too low, normal and too high.

TestAlternatorTemp

This routine tests the average alternator temperature against a series of limits to declare one of the following conditions: normal, current limit level 1 (e.g. FOLD_30), current limit level 2 (e.g. FOLD_60), and system inhibit.

TestHeatSinkTemp

This routine tests the average heatsink temperature against a series of limits to declare one of the following conditions: normal, current limit level 1 (e.g. FOLD_30), current limit level 2 (e.g. FOLD_60) and system inhibit.

TestPeriod

This routine tests the average period of the alternator (as determined by the period between successive zero crossings) against a series of limits to declare one of the following conditions: too low, normal and too high.

BoostControl

This routine tests the elapsed time against the specified boost start and end times. The elevated charging voltage signal applied to nominal connection point 610, (for reducing sulfation in the battery) is controlled by this routine UpdateControls This routine is responsible for controlling the output of the processor based on faults declared from the various tests. This routine is also in control of the fans for the heatsink and the alternator.

TestEndStartUp

This routine is responsible for holding the system from running until all faults are cleared from the various tests.

Figure 10A:
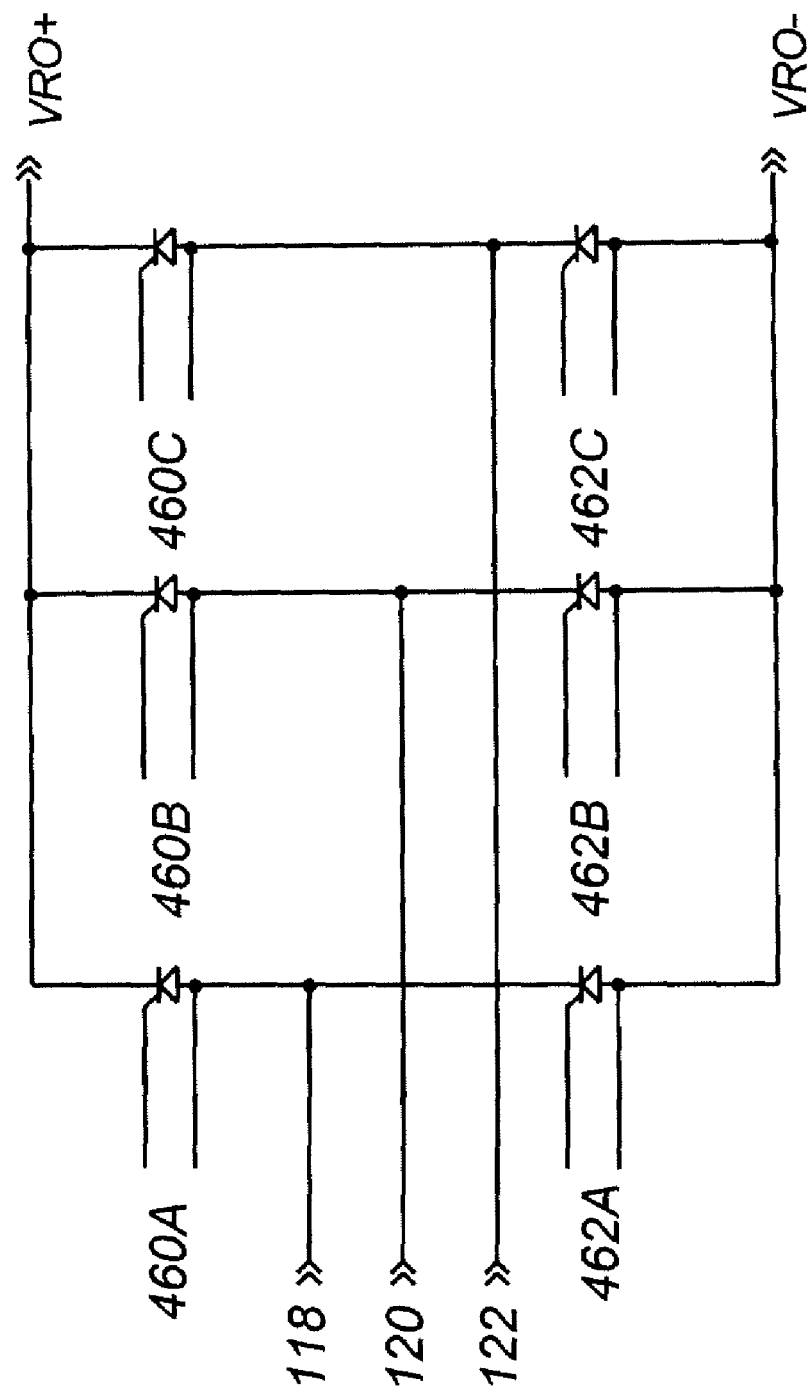
FIGS. 10A and 10B (collectively referred to as FIG. 10) are simplified schematics of a switching bridge suitable for use in conjunction with the controller of FIG. 2A.

Referring now to FIG. 10A As previously noted, switching bridge 112, in response to control signals from controller 110, selectively provides conduction paths between the various phases of the AC signal from alternator 102 and a load 106. Controller 110 selectively generates control signals to switching bridge 112 to produce a regulated output signal at a predetermined voltage. FIG. 10 depicts a conventional 3 phase, fully controlled SCR bridge. The salient features of this circuit include:

A 3 wire connection to the (three-phase) alternator. Whether the windings are joined as a "Delta" or "Wye" as shown here, only 3 output wires are required for operation. Alternatively, in the "Wye" alternator configuration, neutral may be exported from the alternator depending upon application requirements (e.g. split supply operation).

Conduction to the output requires that 2 SCRs are in conduction. There are therefore conduction losses due to the voltage drop across 2 SCRs.

Because of the rolling nature (120 degrees apart) of the phase voltages generated by the alternator, the correct SCR must be fired in the correct order to control conduction properly. Thus, there is only one solution for the order of the SCR triggers for a given alternator phase order and alternator rotation direction. The directionality is brought about by the fact that if the rotation of the alternator is reversed, so too is the phase order of the outputs, necessitating reversal of the SCR trigger timings.

Figure 10B:
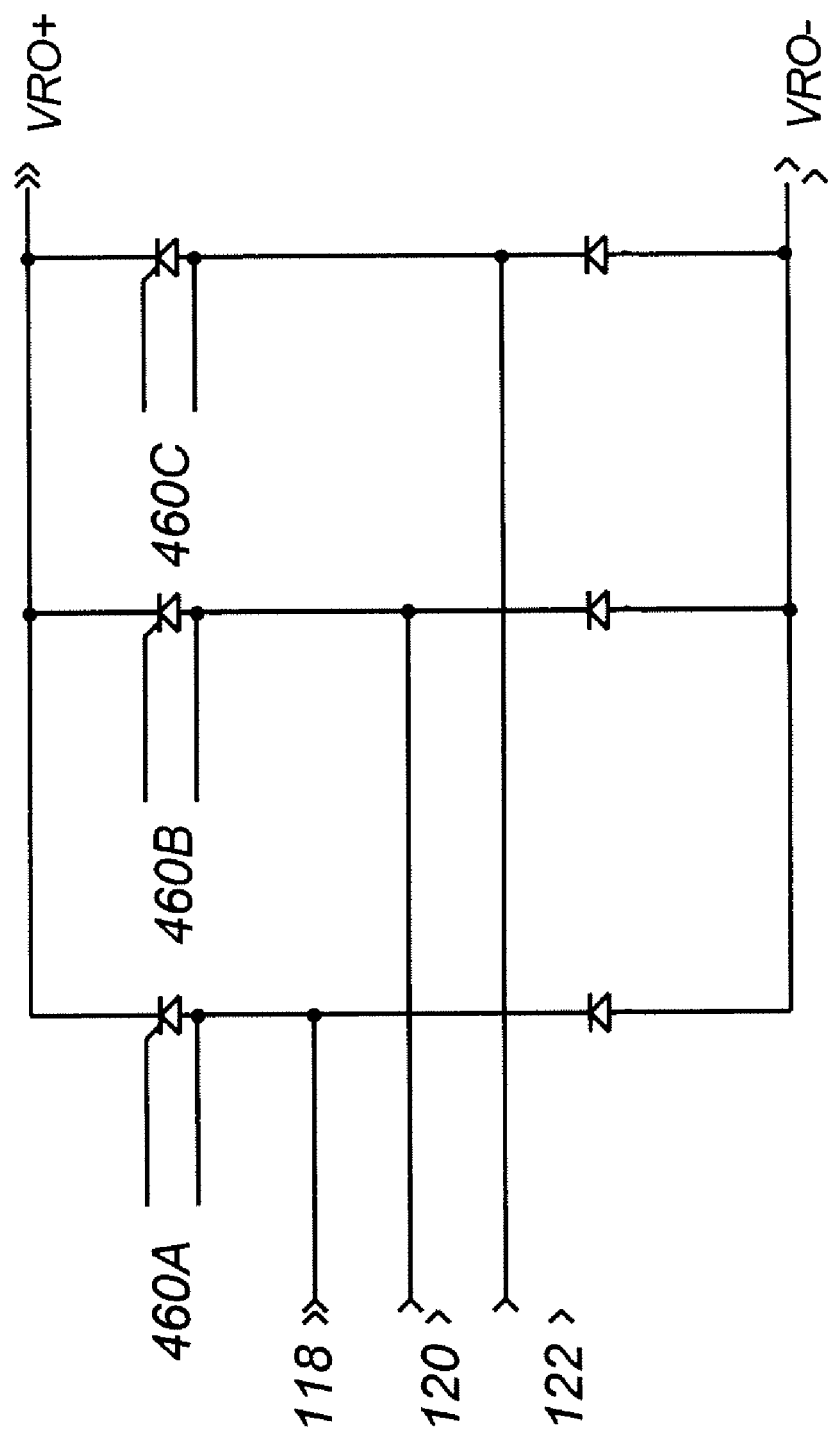

Referring to FIG. 10B, an alternative bridge may be comprised of single SCRs paired with diodes. This embodiment results in more ripple in the output, but has the advantage of having less heat loss due to the forward voltage of the diodes typically being less than that of an SCR.

Figure 11A:
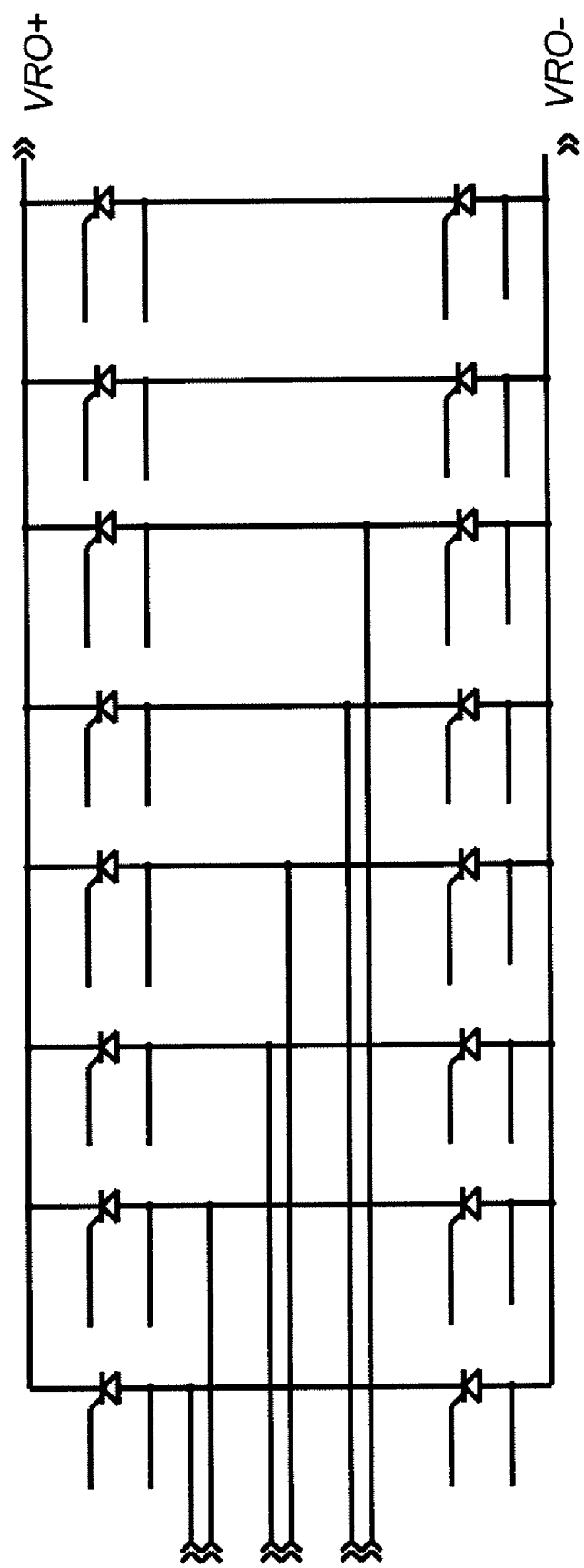
FIGS. 11A and 11B (collectively referred to as FIG. 11) are simplified schematics of an alternative switching bridge suitable for use in conjunction with the controller of FIG. 2A.

FIG. 11A depicts an alternative 3 phase fully controlled SCR bridge. Significantly, all windings in the alternator are completely separate, with no common connections. Further, 4 SCRs are utilized to form an independent full wave bridge for each individual winding. Six wires are required to connect the alternator to the bridge. While seeming a disadvantage over 3 wires in a conventional 3 phase bridge, higher power circuits may benefit by the division of currents into multiple conductors. Such an embodiment of a fully controlled SCR bridge has particular utility in connection with embodiments of alternator 102 employing multiple winding coils connected in parallel.

Figure 11B:
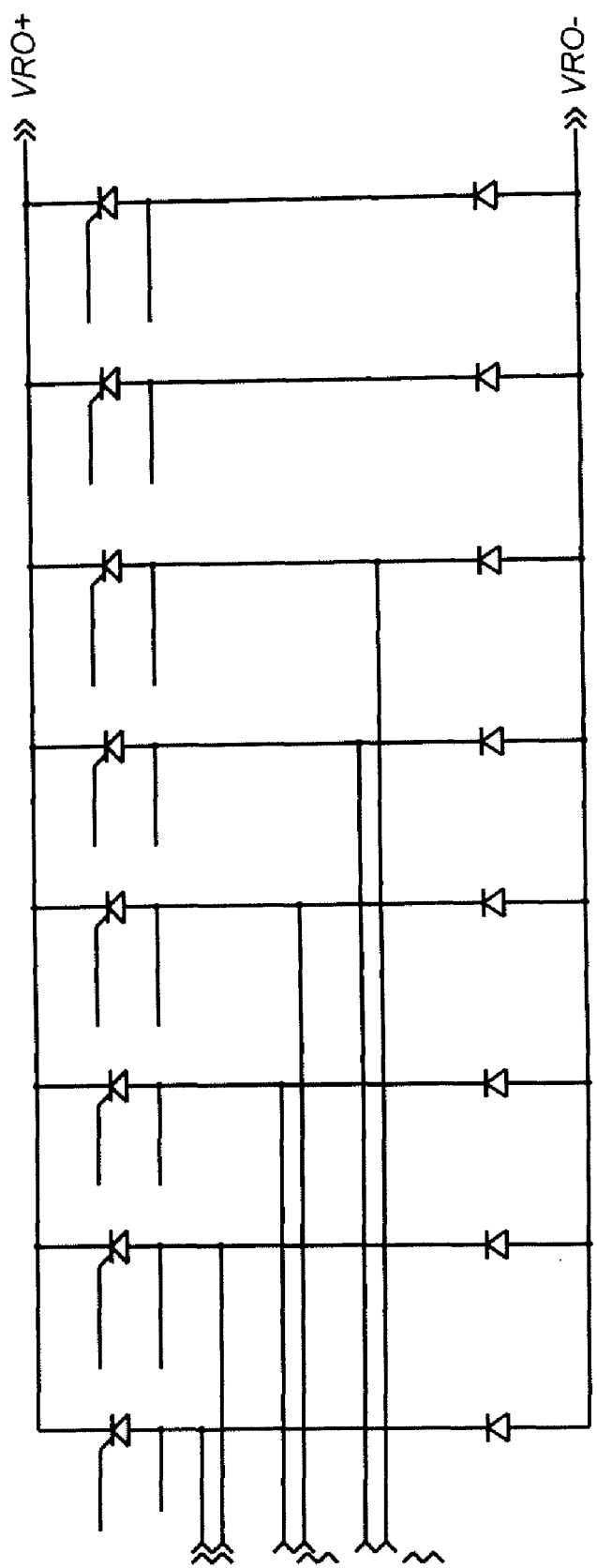

FIG. 11B depicts an alternative 3 phase partially controlled SCR bridge. Like the embodiment shown in FIG. 11A, the SCR bridge of FIG. 11B has particular utility in connection with alternators having all windings in the alternator completely separate, with no common connections. However, 6 diodes are used instead of SCRs such that 2 SCRs and 2 diodes are utilized to form an independent full wave bridge segment for each individual winding.

The features of this arrangement are:

As in the embodiment of FIG. 11A, six wires are required to connect the alternator to the bridge. Again, while seeming a disadvantage over 3 wires in a conventional 3 phase bridge, higher power circuits may benefit by the division of currents into multiple conductors.

Lower losses due to lower conduction drop. Typically a diode has lower conduction drop than a SCR. Since only one SCR and one diode are involved in the current path to the output, the conduction losses will be lower than for 2 SCRs.

In both FIG. 11A and 11B, each of the individual full wave bridge segments function independently. While the trigger signals for each bridge must be timed correctly to conduct the required current, the need for timing coordination due to phase rotation is eliminated. Thus there is no system-wide requirement to trigger the SCRs in the correct order. Moreover, because of this timing independence, the alternator windings may be connected to any of the bridges arbitrarily. Further, the polarity of connection between an individual winding and each bridge may be arbitrary as well, since both SCRs within each bridge may be triggered simultaneously and only the device with the proper polarity for conduction will do so. This eases installation complexity and avoids connection errors. Further, the alternator may rotate in either direction without reassigning the SCR triggers.

It should be noted that the control circuitry previously disclosed for conventional 3 phase controlled bridges, will control the alternative configuration of FIG. 11B, without any modification. Most of the differences is in lifting the restrictions as to which winding is associated with which bridge connection to assure proper operation, and the lifting of the alternator rotation direction restrictions, etc.

Figure 16:
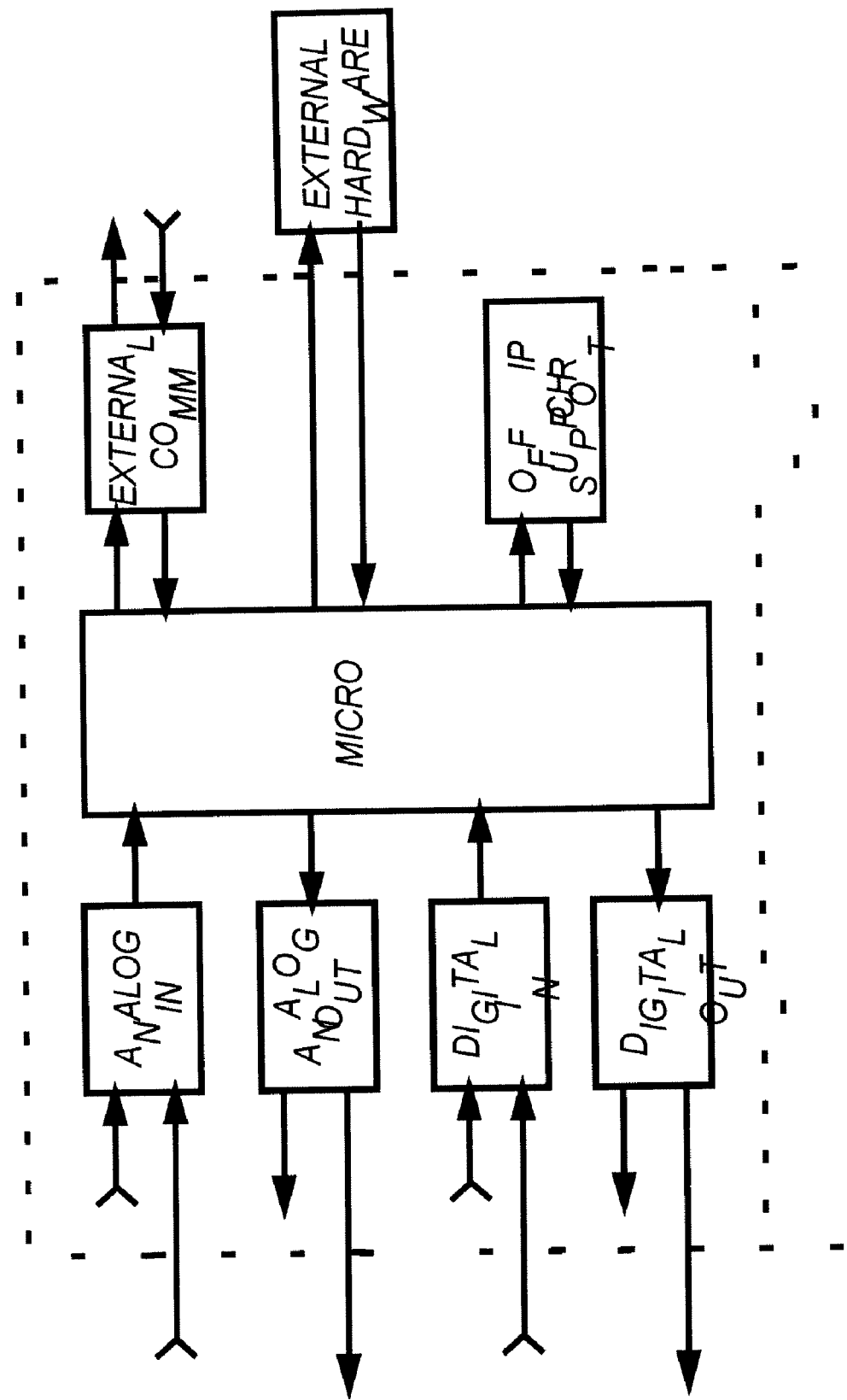
FIG. 16 is a block schematic of a microcontroller suitable for use in the controller of FIG. 2A.

Referring now to FIG. 16, the general form of microcontroller 248 has many inputs and outputs. Inputs and outputs can be analog or digital, and reflect communications to external stand-alone computing apparatus, interface to off-chip support devices, or interface to off-board hardware. Examples of analog inputs include, for example signals indicative of temperatures, voltages, and current. Examples of temperatures measured are alternator, heat sink, battery and ambient. Examples of voltage sense are VRO and the voltage at energy storage device (e.g. battery) 108. Examples of current are controller output current (CUR_SIG) and battery current. Analog output examples include variable current limit and variable voltage boost level. Example digital inputs include over-voltage (OVER_VOLT) from 258, zero-cross (ZC_SIG) from 214, alternator fan tachometer, heat sink fan tachometer to ensure that the fans are not stalled (e.g. water fording operations). Example digital outputs include fixed current limit (e.g. FOLD_60), fixed voltage boost, heat sink fan control, inhibit of SCR firing, relay output circuit enable, control of several on-board indicators such as: speed error, voltage error, alternator temperature conditions, heat sink temperature conditions, alternator fan control, heat sink fan control. Examples of alternator speed errors are low speed (e.g. engine cranking but not yet started), and high speed (e.g. engine over-speed). Example VRO voltage errors are low voltage and high voltage determined by comparing V_SENSE with preprogrammed set points. Examples of alternator temperatures include current limit reduction of 30% (FOLD_30) due to elevated temperature, current limit reduction of 60% (FOLD_60) due to further elevated temperature, and system inhibit due to damaging (destructive) temperature of the alternator. Examples of heat sink temperatures include current limit reduction of 30% (FOLD_30) due to elevated temperature, current limit reduction of 60% (FOLD_60) due to further elevated temperature, and system inhibit due to damaging (destructive) temperature of the heat sink. Examples of communications to external stand-alone computing apparatus could include RS232, Universal Serial Bus, Fire-Wire. Examples of off-chip support devices include non-volatile memory, additional input-output capabilities, additional analog-to-digital converters, additional digital-to-analog converters, standalone real-time-clock. Examples of off-board hardware include display module, key-pad and status indicators.

As previously noted there is a need for a compact high power alternator wherein a desired output voltage can be achieved by changing the number of turns of the phase pole coil, that is relatively easy to wind, and minimizes the consequence of short circuits, while at the same time facilitating cooling. In accordance with various aspects of the present invention this is achieved by employing a predetermined number of pole phase coils, preferably equal to the number of magnetic poles, with pole phase coil wound with enough turns [of a relatively small diameter wire] to generate the required output voltage of the alternator and a fraction of the output current equal to 1 divided by the number of magnetic poles and connecting the individual pole phase coils in parallel, preferably employing conducting phase rings 138. Use of conducting phase rings 138 not only greatly simplifies assembly of alternator 102, but also facilitates cooling of the windings.

Referring now to FIG. 17A, B and C alternator 102 preferably comprises: a front endplate 1702, an outer cylinder 1704, a rear endplate 1706, output terminals 126 (one for each phase), to which respective individual conducting cables can then be attached to transmit phase output to the control 100. As best seen in FIG. 17B (detailing the view along a section A-A in FIG. 17A), alternator 102 includes a cylindrical rotor (not shown, for ease of illustration) with permanent magnets disposed on its interior surface, a stator 1708 and a respective conducting phase ring 138 for each phase. Stator is disposed concentrically within the rotor casing, and suitably comprises a soft magnetic core, and conductive windings. The core is generally cylindrical width an axially crenellated outer peripheral surface with a predetermined number of equally spaced teeth and slots. The conductive windings (formed of a suitably insulated electrical conductor, such as varnished copper motor wire), are wound through a respective slot, outwardly along the side face of the core around a predetermined number of teeth, then back through another slot. The portion of the windings extending outside of the crenellation slots along the side faces of the core are referred to herein as end turns. Rotation of the rotor about the stator causes magnetic flux from the rotor magnets to interact with and induce current in the stator windings.

Output terminals 126 and fusible links 124 are positioned radially about conducting phase rings 138. Conducting phase rings 138 are made of a suitable conductive material e.g. brass or plated copper. The conducting phase rings may be formed of rod stock or punched from a sheet of appropriate material. In the preferred embodiment the conducting phase ring is continuous e.g. a single piece which would necessitate soldering or brazing together the ends of a formed conducting phase ring. Conducting phase rings 138 are fastened to non-conducting conducting phase ring mounting structure 1712 preferably made of a high impact resistant and chemically stable material e.g. polyamide-imide, so that each conducting phase ring, one for each phase output, are isolated electrically from each other and rear endplate 1706. Conducting phase rings 138 are positioned in air passage 1710 to maximize exposure to air flow produced by alternator 102 and directly over stator 1708.

FIG. 17C detailing the view along section B-B shows output terminal assembly 126 which is comprised of a threaded conducting stud 1716, preferably a highly conductive corrosion resistant material (e.g. brass or plated copper) along with an electrically non-conductive bushing 1714, preferably a high impact resistant and chemically stable material (e.g. polyamide-imide), to electrically isolate the output terminal from alternator rear endplate 1706. The threaded conducting stud 1716 in the preferred embodiment has an incorporated shoulder 1720, to act as a seat from inside alternator rear endplate 1706 to which nut 1718 can be tightened, capturing the assembly in rear endplate 1706.

Fusible link 124 is made of a suitable material e.g. a calculated diameter and length of wire (preferably plated copper) that will melt when subjected to loads calculated to be destructive to alternator 102, control 100 or electrical systems being powered by said equipment. In the preferred embodiment fusible link 124 is soldered or brazed to both the threaded conducting stud 1716 and conducting phase ring 138. An alternate method to secure the fusible link is to attach a suitable lug to the end of fusible link 124 which is then fastened to stud 1716 mechanically by means of a threaded nut.

Referring now to FIG. 17D detailing partial section view C-C (FIG. 17A). Conducting phase rings 138 are fastened to structure 1712. The conducting phase rings are exposed to airflow 1722, cooling conducting phase rings 138. Stator 1708 is housed within outer cylinder 1704 and fastened to rear endplate 1706. Conductors 1724 exit stator 1708 and are soldered or brazed to their respective conducting phase rings. Conductors 1724 in the preferred embodiment are exposed to airflow 1722. In certain cases it may be desirable to sheath conductors 1724 with a thin walled electrically isolating material 1726 e.g. Nomex to protect against grounding.

Referring now to FIG. 17 E. An alternate method of producing conducting phase ring 138 is accomplished by forming it of rectangular stock such that suitable surfaces are presented for drilling and tapping holes 1728. The end of fusible link 124, can in this embodiment, be attached with a suitable lug 1730 for fastening by, e.g. a threaded fastener 1732 to conducting phase ring 138. Equally, conductor 1724 can also be equipped with a similar lug and fastened to conducting phase ring 138 using fastener 1734. Conducting phase ring 138 is in turn secured in a similar manner to rear endplate 1706 using an appropriate structure similar to 1712.

Figure 18A:
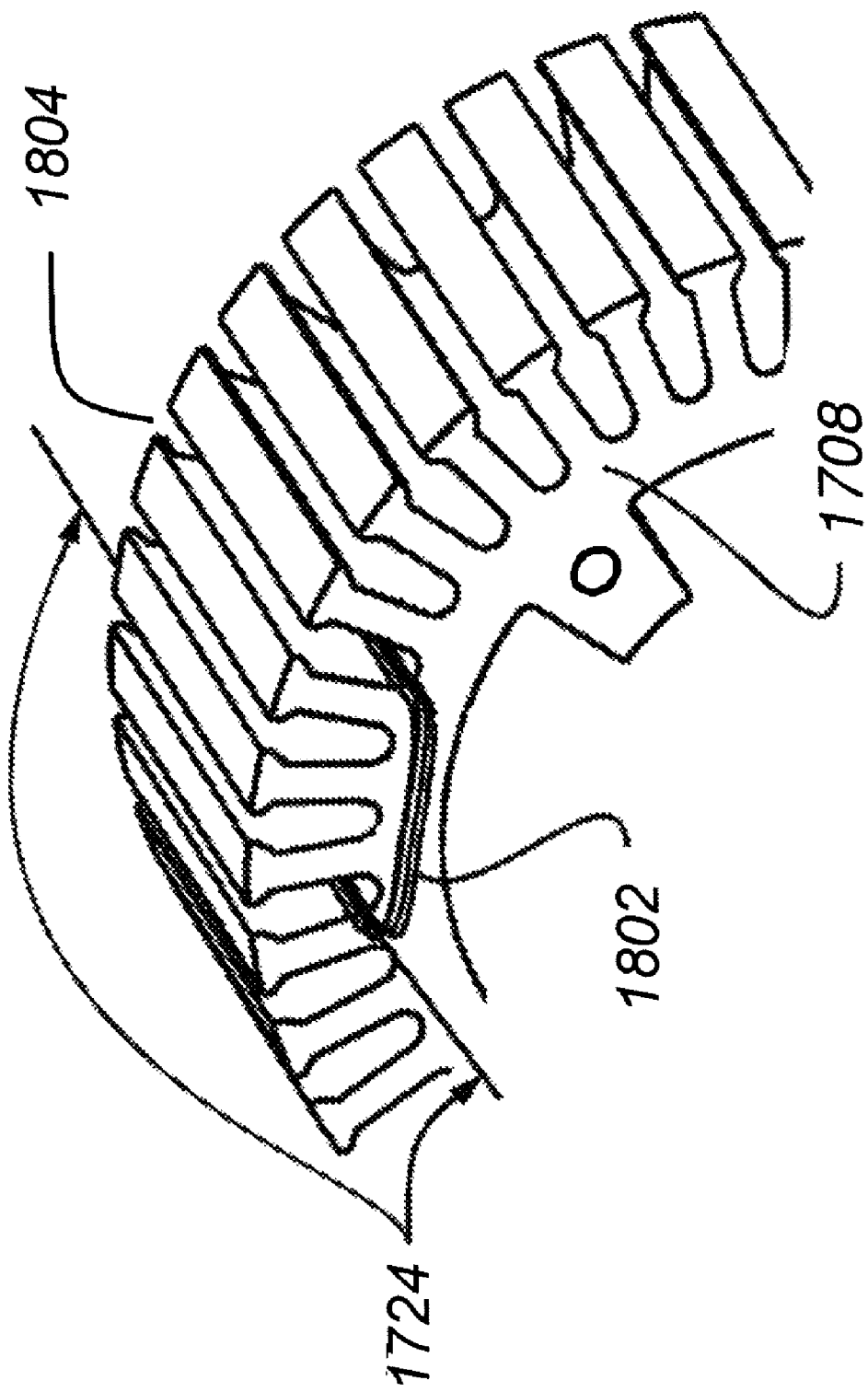
FIG. 18A is a diagram showing an individual pole phase coil.

Referring now to FIG. 18A. An individual pole phase coil 1802 is wound in slots 1804 of stator 1708. The number of turns of conductor 1724 comprising coil 1802 is equal to the number of turns required to generate the rated output voltage of one phase of the alternator. The output current of the individual phase coil is equal to 1 divided by the number of magnetic poles of the alternator. Thus, the individual pole phase coil is made up of a relatively large number of turns of relatively small wire.

This construction results in a number of advantages, both during construction of the alternator and during operation of the alternator.

1. Because the individual pole phase coil is made up of a relatively large number of turns, small changes in design voltage can be accomplished by changing the number of turns. For example, a particular 12 pole alternator wound in a conventional manner with all of the pole phase coils connected in series may require 1.0417 turns of conductor equal to wire gage 6.285 to produce 14 VDC (after proper rectification), 300 amperes at 1940 rpm. Neither the number of turns nor the equivalent wire gage is practical numbers for production. By constructing the example alternator with the pole phase coils connected in parallel, each individual pole phase coil would be 12.5 turns of 17 gage wire. (As a note, half turns can be constructed by terminate one end of the individual pole phase coil, say the start, on one side of the stator lamination stack, and the other end, say the finish, at the other side of the stator lamination stack. This construction is illustrated in FIG. 18A) Further to this example, increasing the original design to 1.0833 turns (again, an impractical number) would reduce the rpm to 1894. This could be accomplished in the alternate construction by increasing each parallel pole phase coil to 13 turns. The relatively small cross sectional area of the conductors provides for easier winding of the coils.

2. A short circuit between turns of an individual pole phase coil results in most of the power being generated in the alternator flowing in the shorted coils. Because the coils are constructed of a relatively large number of turns of relatively small cross sectional area conductors, the shorted turns will very quickly melt and clear the short circuit. The decrease in output power resulting from one pole phase coil opening up is approximately 1/(number of magnetic poles+number of phases). For example the power output reduction of a 12 pole, three-phase alternator with one pole phase coil shorted and then self cleared is approximately 3%.

3. Referring to example 3 above, a short circuit between turns of an individual pole phase coil will typically clear in less than two seconds. Damage to the alternator drive system is eliminated, the engine continues operation with no additional load and the alternator continues to produce power to the connected load.

Figure 18B:
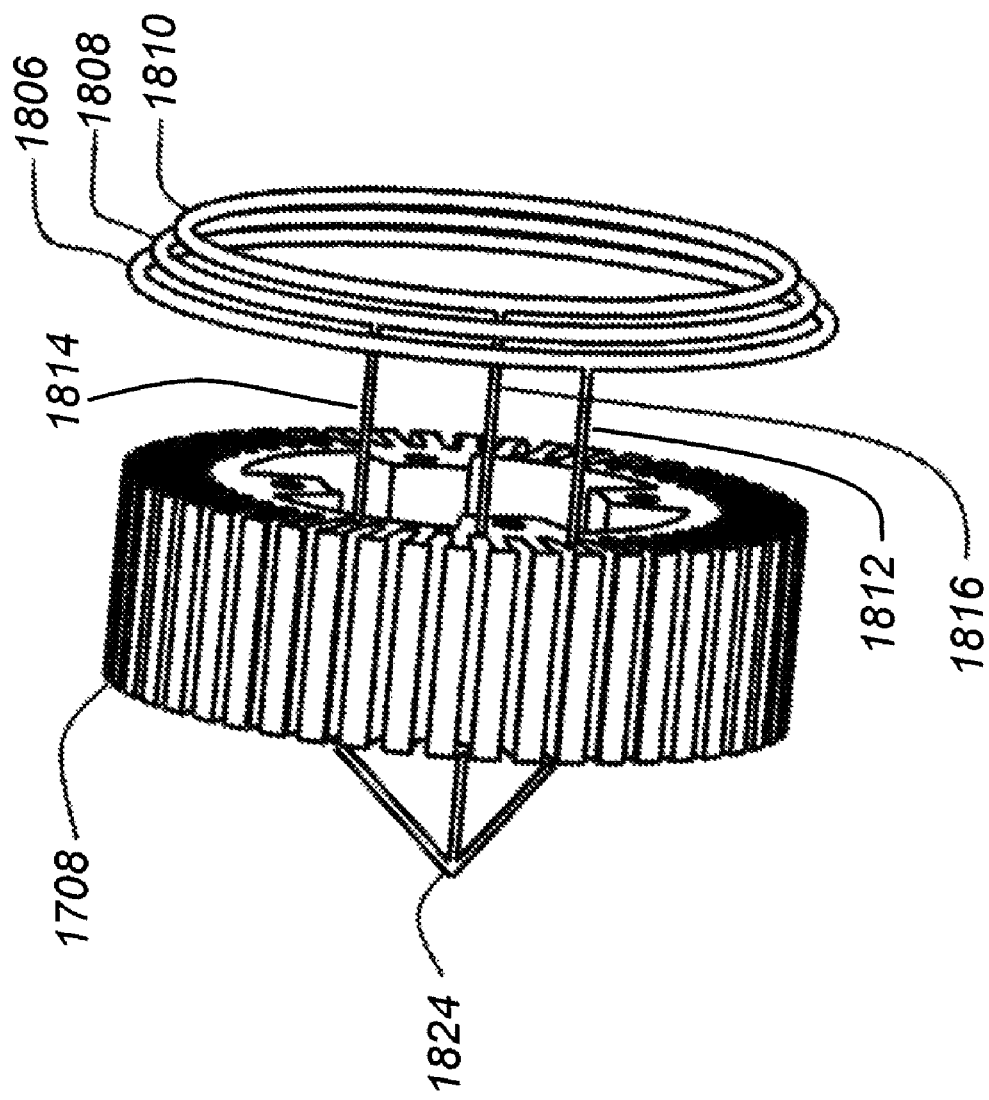
FIG. 18B is a simplified perspective view of the stator core, and the conducting phase rings of the alternator of FIG. 17A, illustrating the connections between the conducting phase rings and respective groups of windings (winding end turns omitted).

Referring now to FIG. 18B conducting phase rings 138 are individually identified as A ring 1806, B ring 1808 and the C ring 1810. Three individual pole phase coil conductors, A phase 1812, B phase 1814 and C phase 1816 are illustrated without their respective coils for clarity. Each of the three pole phase coils that make up a pole phase coil group is, in this illustration connected in a "Wye" connection 1824. As noted earlier, the use of a "Delta" connection can also be implemented using phase collector rings.

Figure 18C:
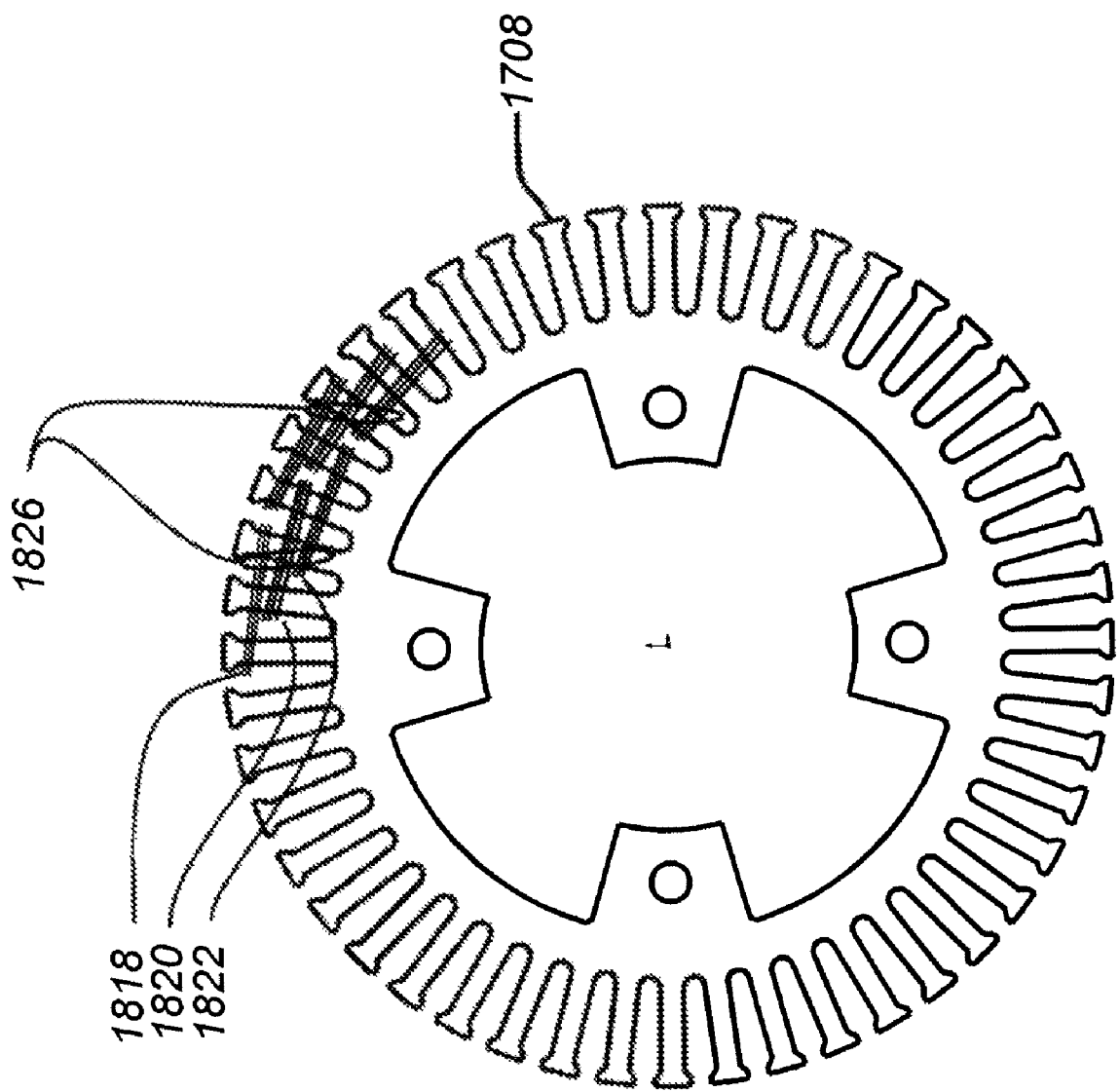
FIG. 18C is a side view of a stator with respective pole groups of windings wound thereon.

Referring now to FIG. 18C three individual pole phase coils of a three phase alternator comprise an A pole phase coil 1818, B pole phase coil 1820 and C pole phase coil 1822 which collectively make up a pole phase coil group 1826. There is one pole phase coil group for each pole of an alternator (e.g. 12 pole phase coil groups in a 12-pole alternator).

Figure 18D:
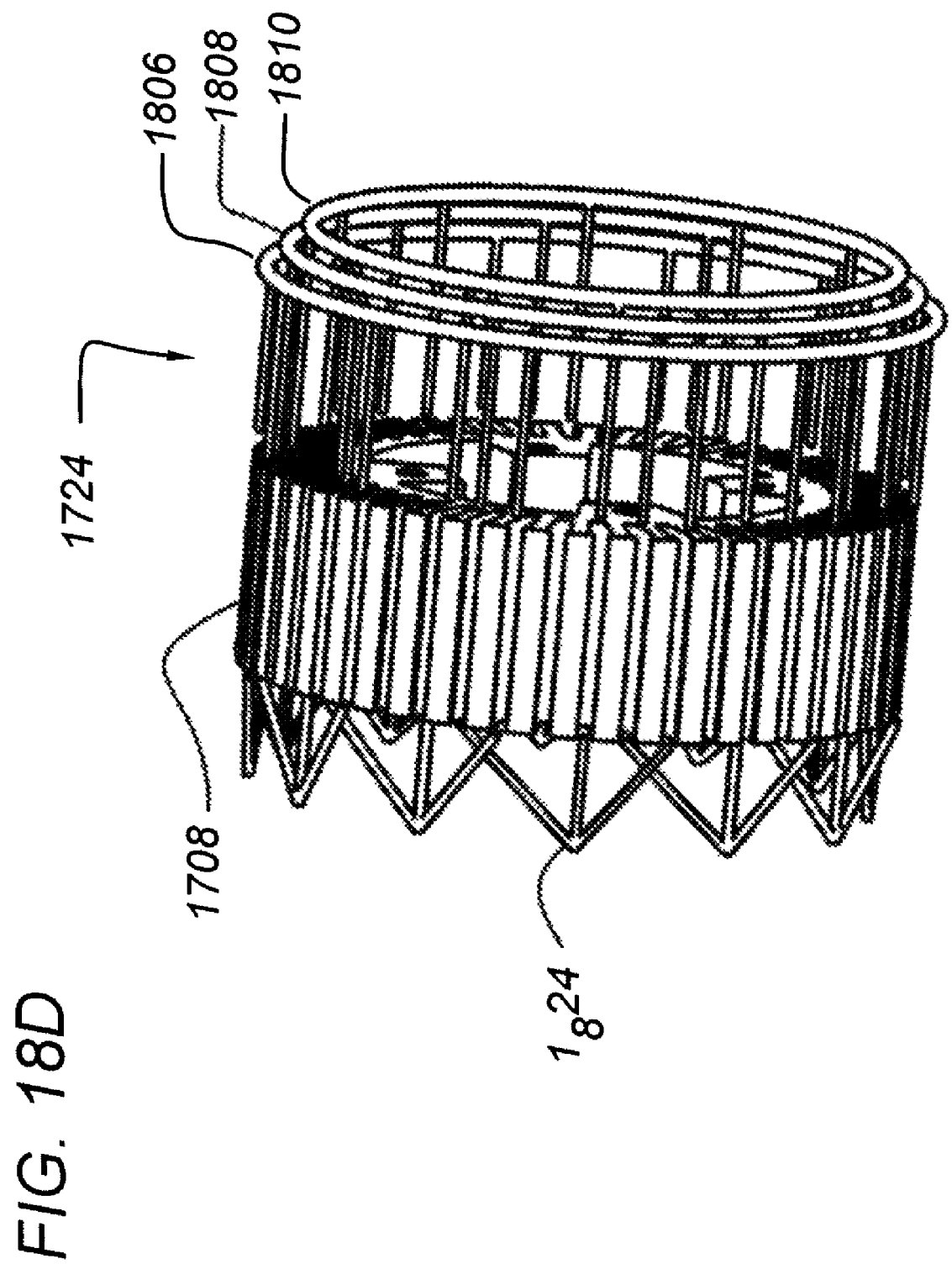
FIG. 18D perspective view of the stator core, and the conducting phase rings of the alternator of FIG. 17A, illustrating all the connections between the conducting phase rings and all the respective groups of windings (winding end turns omitted).

4. Referring now to FIG. 18D, all the pole phase coil conductors 1724 of a 12 pole alternator are illustrated attached to their respective conducting phase ring 1806, 1808 and 1810. The "Wye" connection 1824 of each pole group is also shown. For clarity the coils themselves are not shown. FIG. 18D in part illustrates the challenge presented in gathering the individual phase coil conductors in an efficient manner that does not impede cooling. With phase coil conductors leaving the phase coil end turn at 90 degrees to the face of stator 1708, the end turns are exposed to the greatest air flow possible which in turn offers the best possible cooling of said end turns.

Although the present invention has been described in conjunction with various exemplary embodiments, the invention is not limited to the specific forms shown, and it is contemplated that other embodiments of the present invention may be created without departing from the spirit of the invention. Variations in components, materials, values, structure and other aspects of the design and arrangement may be made in accordance with the present invention as expressed in the following claims.

What is claimed is:

1. A generator comprising:
   a stator, wherein an outer peripheral surface of the stator is axially crenellated with a predetermined number of teeth and slots;
   an output terminal electrically coupled to a fusible link;
   an electrically conductive phase ring coupled to the fusible link; and
   a pole phase coil conductor, electrically coupled to the phase ring and to a winding of insulated wiring disposed around at least one of the teeth of the stator.

2. The generator as disclosed in claim 1, further comprising:
   a second and third output terminal respectively electrically coupled to a second and third fusible link;
   a second and third electrically conductive phase ring respectively coupled to the second and third fusible links; and
   a second and third pole phase coil conductor, respectively electrically coupled to the second and third phase rings and to a second and third windings of insulated wiring respectively disposed around teeth of the stator.

3. The generator as disclosed in claim 2, wherein the winding, the second winding, and the third winding are electrically coupled in one of a wye configuration and a delta configuration.

4. The generator as disclosed in claim 3, wherein the electrical wye coupling is exposed to a cooling fluid.

5. The generator as disclosed in claim 3, wherein the electrical delta coupling is exposed to a cooling fluid.

6. The generator as disclosed in claim 2, wherein the phase ring, the second phase ring, and the third phase ring are exposed to a cooling fluid.

7. The generator as disclosed in claim 1, wherein a pole phase coil conductor is disposed to as to exit the stator in a direction substantially orthogonal from a face surface of the stator.

8. The generator as disclosed in claim 1, wherein:
   the winding of insulated wiring comprises at least two turns of windings disposed around the at least one tooth of the stator; and
   the insulated wiring is selected from a predetermined gauge, wherein an internal short circuit within the winding between two or more turns in the winding produces sufficient heat to melt the wiring and clear the internal short.

9. A generator comprising:
   a plurality of output terminals respectively electrically coupled to a plurality of fusible links;
   a plurality of electrically conductive phase rings respectively coupled to the plurality of fusible links; and a plurality of pole phase coil conductors, respectively electrically coupled to the plurality of phase rings, and respectively electrically coupled to a plurality of windings of insulated wiring respectively disposed around a plurality of teeth of the stator.

10. The generator as disclosed in claim 9, wherein a cooling fluid is exposed to at least one of:
  the plurality of output terminals;
  the plurality of fusible links;
  the plurality of electrically conductive phase rings;
  the plurality of pole phase coil conductors, and
  the plurality of windings of insulated wiring.

11. The generator as disclosed in claim 9, wherein the plurality of windings are electrically coupled in one of a wye configuration and a delta configuration.

12. The generator as disclosed in claim 11, wherein the electrical wye coupling is exposed to a cooling fluid.

13. The generator as disclosed in claim 11, wherein the electrical delta coupling is exposed to a cooling fluid.

14. The generator as disclosed in claim 9, wherein a pole phase coil conductors are disposed to as to exit the stator in a direction substantially orthogonal from a face surface of the stator.

15. The generator as disclosed in claim 9, wherein:
  the plurality of windings of insulated wiring respectively comprise at least two turns of windings disposed around at least one tooth of the plurality of teeth of the stator; and
  the insulated wiring is selected from a predetermined gauge, wherein an internal short circuit in one of the plurality of windings produces sufficient heat to melt the insulated wiring and clear the internal short circuit.

16. A generator comprising:
  a first, second and third phase ring, respectively coupled to first, second, and third output terminals through respective fusible links;
  a first, second, and third phase coil, each phase coil:
    respectively electrically coupled to the first, second, and third phase ring through respective first, second, and third phase coil conductors; and
    comprising a plurality of windings of insulated wiring respectively disposed around a plurality of teeth of a stator; and
  wherein the first, second, and third phase coils are disposed about the plurality of the teeth of the stator so as to produce electrical current in three predetermined phases.

17. The generator as disclosed in claim 16, wherein a cooling fluid is exposed to at least one of:
  the first, second and third phase rings;
  the first, second, and third output terminals;
  the first, second, and third phase coils; and
  the first, second, and third phase coil conductors, and the plurality of windings of insulated wiring.

18. The generator as disclosed in claim 16, wherein the first, second, and third phase coil conductors are disposed to as to exit the stator in a direction substantially orthogonal from a face surface of the stator.

19. The generator as disclosed in claim 16, wherein:
  the winding of insulated wiring comprises at least two turns of windings disposed around the at least one tooth of the stator; and
  the insulated wiring is selected from a predetermined gauge, wherein an internal short circuit within the winding between two or more turns in the winding produces sufficient heat to melt the wiring and clear the internal short.

20. The generator as disclosed in claim 16, wherein the plurality of windings are electrically coupled in one of a wye configuration and a delta configuration.

* * * * *